(12) United States Patent
Uno et al.

(10) Patent No.: US 8,310,661 B2
(45) Date of Patent: Nov. 13, 2012

(54) CABLE INSTALLED STATE ANALYZING METHOD AND CABLE INSTALLED STATE ANALYZING APPARATUS

(75) Inventors: Kazushi Uno, Kawasaki (JP); Fumio Takei, Kawasaki (JP); Takeo Kasajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/273,576

(22) Filed: Oct. 14, 2011

(65) Prior Publication Data

US 2012/0033206 A1 Feb. 9, 2012

Related U.S. Application Data

(63) Continuation of application No. PCT/JP2009/071313, filed on Dec. 22, 2009.

(30) Foreign Application Priority Data

Apr. 27, 2009 (JP) ................................. 2009-107515

(51) Int. Cl.
*G01N 21/00* (2006.01)
(52) U.S. Cl. ...................................... 356/73.1
(58) Field of Classification Search ............. None
See application file for complete search history.

(56) References Cited

U.S. PATENT DOCUMENTS

| 4,823,166 | A |   | 4/1989  | Hartog |            |
|-----------|---|---|---------|--------|------------|
| 5,245,199 | A | * | 9/1993  | Okitsu | 250/559.44 |
| 6,160,614 | A | * | 12/2000 | Unno   | 356/73.1   |

FOREIGN PATENT DOCUMENTS

| JP | 62-110160    | 5/1987  |
|----|--------------|---------|
| JP | 2-123304     | 5/1990  |
| JP | 3-16019      | 2/1991  |
| JP | 5-11840      | 1/1993  |
| JP | 5-53020      | 3/1993  |
| JP | 5-173024     | 7/1993  |
| JP | 7-12655      | 1/1995  |
| JP | 9-89529      | 4/1997  |
| JP | 2002-267242 A1 | 9/2002  |
| JP | 2003-14554 A1  | 1/2003  |
| JP | 2003-57126 A1  | 2/2003  |
| JP | 2007-121219 A1 | 5/2007  |
| JP | 2007-318415 A1 | 12/2007 |
| JP | 2008-282123 A1 | 11/2008 |

OTHER PUBLICATIONS

"Fujitsu Develops Technology Enabling Real-time Multiple-Point Temperature Measurement;" Fujitsu Limited; Apr. 4, 2008; (6 Sheets)/p. 3 of specification.
Search Report for International Application No. PCT/JP2009/071313 dated Mar. 29, 2010.

* cited by examiner

*Primary Examiner* — Tu Nguyen
(74) *Attorney, Agent, or Firm* — Kratz, Quintos & Hanson, LLP

(57) ABSTRACT

An image of an installed state of an optical fiber is captured by a camera. The optical fiber is provided with position marks at fixed intervals, the position marks each indicating a distance from a predetermined position and a direction of the optical fiber. An installed state analyzing apparatus performs image processing on the captured image and analyzes the installed state of the optical fiber by using the optical fiber installation tools and the position marks.

15 Claims, 41 Drawing Sheets

FIG. 16A
FIG. 16B
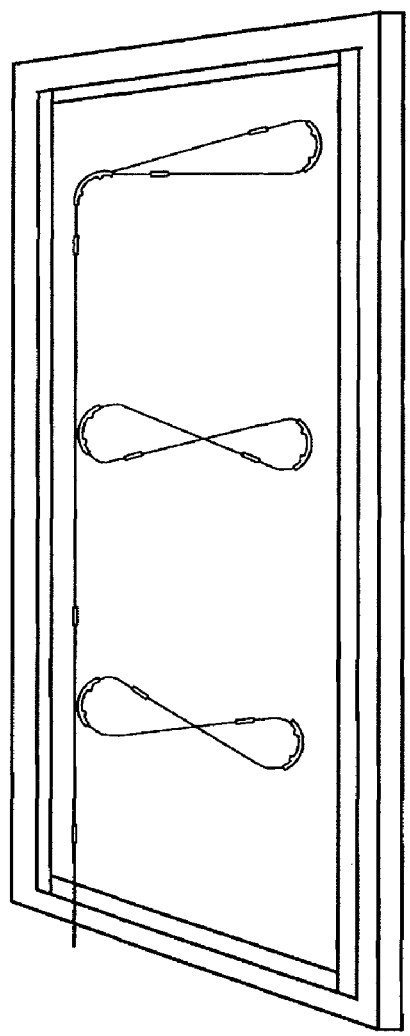
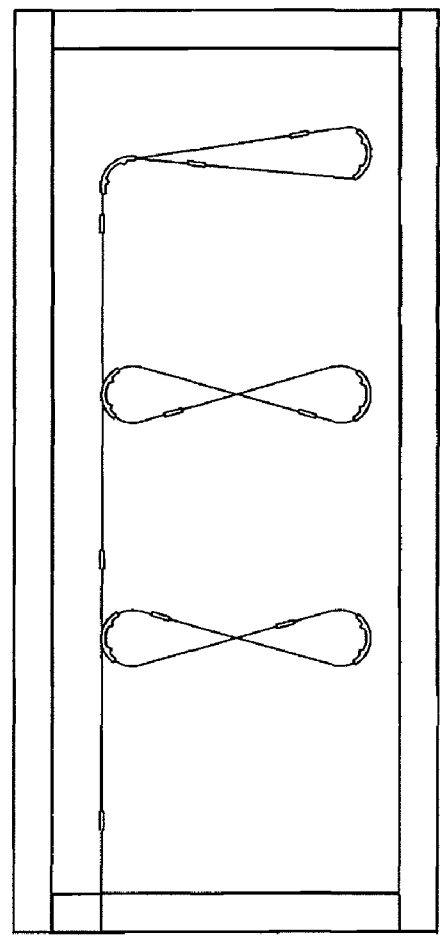

| AREA | NUMBER IN VERTICAL DIRECTION | NUMBER IN HORIZONTAL DIRECTION |
|---|---|---|
| B0 | 0 | 0 |
| B1 | 0 | 0 or 1 or 2 |
| B2 | 1 | 0 |
| B3 | 0 | 2 or 3 |
| B4 | 0 | 1 |
| B5 | 1 | 0 |
| B6 | 0 | 1 |
| B7 | 0 or 1 | 0 |
| B8 | 0 | 0 |

| AREA | NUMBER IN VERTICAL DIRECTION | NUMBER IN HORIZONTAL DIRECTION |
|---|---|---|
| B0 | 0 or 1 | 0 |
| B1 | 1 | 0 |
| B2 | 0 | 1 |
| B3 | 0 | 0 |
| B4 | 0 | 0 |
| B5 | 0 | 1 or 2 |
| B6 | 1 | 0 |
| B7 | 0 | 1 or 2 |
| B8 | 1 | 0 |
| B9 | 0 | 0 |
| B10 | 0 | 1 |
| B11 | 0 | 0 |
| B12 | 0 or 1 | 0 |
| B13 | 1 | 0 |

| AREA | NUMBER IN VERTICAL DIRECTION | NUMBER IN HORIZONTAL DIRECTION |
|---|---|---|
| B0 | 2 | 0 |
| B1 | 1 | 0 |
| B2 | 1 | 0 |
| B3 | 0or1 | 0 |
| B4 | 0 | 0 |

FIG. 47

|  |  | RACK C | RACK B | RACK A |
|---|---|---|---|---|
| CASSETTE | INLET PORTION (LENGTH) | 287300 | 285600 | 283900 |
|  | OUTLET PORTION (LENGTH) | 288900 | 287200 | 285500 |
| MODEL 3 | SCol 1 (LENGTH) | 287800 | 286100 | 284400 |
|  | xCol 1 | 0.1036 | 0.1036 | 0.1036 |
|  | zCol 1 | 0.27 | 0.258 | 0.287 |
|  | SCol 2 (LENGTH) | 288400 | 286700 | 285000 |
|  | xCol 2 | 0.457 | 0.467 | 0.445 |
|  | zCol 2 | 0.0514 | 0.0414 | 0.0594 |
|  | xHook 5 | 0.08 | 0.08 | 0.08 |
|  | zHook 5 | 0.075 | 0.073 | 0.077 |
|  | xHook 6 | 0.577 | 0.577 | 0.58 |
|  | zHook 6 | 0.075 | 0.065 | 0.083 |
| MODEL 1 | xHook 1 | 0.11 | 0.11 | 0.11 |
|  | zHook 1 | 1.705 | 1.705 | 1.705 |
|  | xHook 2 | 0.341 | 0.341 | 0.341 |
|  | zHook 2 | 1.705 | 1.705 | 1.705 |
|  | xHook 3 | 0.58 | 0.58 | 0.58 |
|  | zHook 3 | 1.705 | 1.705 | 1.705 |
| MODEL 2 | SCol 4 (LENGTH) | 288060 | 286360 | 284660 |
|  | xCol 4 | 0.364 | 0.364 | 0.364 |
|  | zCol 4 | 1.29 | 1.301 | 1.305 |
|  | SCol 3 (LENGTH) | 288100 | 286400 | 284700 |
|  | xCol 3 | 0.3178 | 0.3178 | 0.3178 |
|  | zCol 3 | 1.245 | 0.225 | 1.26 |
|  | xHook 4 | 0.341 | 0.341 | 0.341 |
|  | zHook 4 | 1.105 | 1.111 | 1.12 |

FIG. 48

| MODEL | AREA | RACK A | RACK B | RACK C |
|---|---|---|---|---|
| MODEL 3 | S1_start | 287762 | 286063 | 284360.5 |
| F1 | F1 | 287780.5 | 286081.5 | 284379 |
| MODEL 1 | S1 | 287943.5 | 286244.7 | 284541.8 |
|  | S2 | 287991.7 | 286292.9 | 284590 |
|  | S3 | 288014.8 | 286316 | 284613.1 |
| F3 | F3 | 288018.5 | 286319.7 | 284616.8 |
| MODEL 2 | S1 | 288078.5 | 286379 | 284678.5 |
| F4 | F4 | 288088.9 | 286386.4 | 284685.9 |
| MODEL 1 | S4 | 288145.8 | 286447.8 | 284744.3 |
|  | S5 | 288149.7 | 286451.7 | 284748.2 |
|  | S6 | 288173.6 | 286475.6 | 284772.1 |
| F2 | F2 | 288221.8 | 286523.8 | 284820.3 |
| MODEL 3 | S2 | 288384.3 | 286685.3 | 284982.8 |
|  | S3 | 288388 | 286689 | 284986.5 |
|  | S4 | 288437.7 | 286738.7 | 285036.5 |
|  | out | 288452.6 | 286753.6 | 285051.3 |

FIG. 49

| FIBER LENGTH | METER MARK | TEMPERATURE | x(m) | z(m) | Sort | AVERAGE |
|---|---|---|---|---|---|---|
| 404.4 | 286246.5 | 22.91 | 0.092801 | 1.72116 | 0 | 1 |
| 404.5 | 286256.5 | 22.982 | 0.103738 | 1.682246 | 0 | 1 |
| 404.6 | 286266.4 | 23.034 | 0.133046 | 1.710084 | 0 | 1 |
| 404.7 | 286276.4 | 23.061 | 0.094746 | 1.723007 | 0 | 1 |
| 404.8 | 286286.4 | 23.065 | 0.101196 | 1.683104 | 0 | 1 |
| 404.9 | 286296.4 | 23.045 | 0.144631 | 1.7286 | 0 | 0 |
| 405 | 286306.3 | 23.007 | 0.244381 | 1.7286 | 0 | 0 |
| 405.1 | 286316.3 | 22.954 | 0.344122 | 1.728393 | 0 | 0 |
| 405.2 | 286326.3 | 22.893 | 0.3646 | 1.63919 | 1 | 0 |
| 405.3 | 286336.3 | 22.833 | 0.3646 | 1.53944 | 1 | 0 |
| 405.4 | 286346.2 | 22.78 | 0.3646 | 1.439689 | 1 | 0 |
| 405.5 | 286356.2 | 22.742 | 0.3646 | 1.339939 | 1 | 0 |
| 405.6 | 286366.2 | 22.726 | 0.3646 | 1.240189 | 1 | 0 |
| 405.7 | 286376.2 | 22.737 | 0.3646 | 1.140439 | 1 | 0 |
| 405.8 | 286386.1 | 22.779 | 0.317559 | 1.108268 | 0 | 0 |
| 405.9 | 286396.1 | 22.852 | 0.317418 | 1.208012 | 1 | 0 |
| 406 | 286406.1 | 22.955 | 0.317437 | 1.307762 | 1 | 0 |
| 406.1 | 286416.1 | 23.083 | 0.317456 | 1.407513 | 1 | 0 |
| 406.2 | 286426 | 23.23 | 0.317475 | 1.507263 | 1 | 0 |
| 406.3 | 286436 | 23.39 | 0.317494 | 1.607013 | 1 | 0 |
| 406.4 | 286446 | 23.552 | 0.317513 | 1.706763 | 1 | 0 |
| 406.5 | 286456 | 23.707 | 0.383581 | 1.7286 | 0 | 0 |
| 406.6 | 286465.9 | 23.845 | 0.483331 | 1.7286 | 0 | 0 |
| 406.7 | 286475.9 | 23.958 | 0.583073 | 1.728399 | 0 | 2 |
| 406.8 | 286485.9 | 24.037 | 0.557872 | 1.696794 | 0 | 2 |
| 406.9 | 286495.9 | 24.078 | 0.597586 | 1.689262 | 0 | 2 |
| 407 | 286505.8 | 24.076 | 0.585709 | 1.727899 | 0 | 2 |
| 407.1 | 286515.8 | 24.031 | 0.557084 | 1.699359 | 0 | 2 |

CABLE INSTALLED STATE ANALYZING METHOD AND CABLE INSTALLED STATE ANALYZING APPARATUS

CROSS-REFERENCE TO RELATED APPLICATION

This application is a continuation of the prior International Patent Application No. PCT/JP2009/071313 filed Dec. 22, 2009, the entire contents of which are incorporated herein by reference.

FIELD

The embodiments discussed herein relate to an installed state analyzing method and an installed state analyzing apparatus for a cable such as an optical fiber or an electric cable.

BACKGROUND

In recent years, an operation way has been increasingly employed in which a large number of computers (servers and the like) are installed in a single room and are managed collectively, as in the case of a data center for managing and operating customer information, a computer center for handling a large amount of jobs of its own company, or the like (hereinafter, these centers are collectively referred to as "data centers").

In a data center, a large number of racks are installed in a room and multiple computers are housed in each of the racks. Under such circumstances, a large amount of heat is generated from the computers to raise the temperature inside each of the racks, which is a factor for causing a malfunction or a breakdown. To prevent this, while the computers are being cooled by cool air inside the room taken into each rack by a fan or the like, the temperature inside the room is controlled by using an air conditioner so as to prevent the temperature inside the room from rising due to the heat released from the racks.

In this regard, in order to save power consumption in a data center while avoiding a malfunction or breakdown of computers due to the heat, it is preferably to measure a temperature distribution in the data center when needed and to control an air conditioning facility and the like appropriately according to the measurement result. To measure the temperature distribution inside the data center, it may be possible to install a large number of temperature sensors such as temperature sensors IC or thermocouples inside and outside the racks, for example. In this case, however, a huge number of temperature sensors may be needed. Thus, it produces a problem of an increase in costs required for installation and maintenance work of the temperature sensors. In addition, a rate of occurrence of failures rises with an increase in the number of temperature sensors, which brings about another problem of a lack of sufficiently high reliability.

For this reason, it has been heretofore proposed to use an optical fiber as temperature sensors in order to measure temperatures of a large number of positions (measurement points) in a data center, a factory, office or the like.

PATENT DOCUMENT 1: Japanese Laid-open Patent Publication NO. 2003-14554
PATENT DOCUMENT 2: Japanese Laid-open Patent Publication NO. 2003-57126
PATENT DOCUMENT 3: Japanese Laid-open Patent Publication NO. S62-110160
PATENT DOCUMENT 4: Japanese Laid-open Patent Publication NO. H07-12655
PATENT DOCUMENT 5: Japanese Laid-open Patent Publication NO. H02-123304
PATENT DOCUMENT 6: Japanese Laid-open Patent Publication NO. 2002-267242
PATENT DOCUMENT 7: Japanese Laid-open Patent Publication NO. H05-11840
PATENT DOCUMENT 8: Japanese Laid-open Patent Publication NO. H09-89529
PATENT DOCUMENT 9: Japanese Laid-open Patent Publication NO. 2008-282123
NON-PATENT DOCUMENT 1: Fujitsu Laboratories Ltd., PRESS RELEASE "Fujitsu Develops Technology Enabling Real-time Multiple-Point Temperature Measurement" on 4 Apr., 2008

A temperature measurement apparatus using an optical fiber as sensors (hereinafter, referred to as an optical fiber temperature measurement apparatus) detects a temperature distribution in a length direction of the optical fiber. For this reason, when an optical fiber is laid inside a data center, an office or a factory, it is importance to know where and how the optical fiber is laid, and to associate each measurement point recognized by the optical fiber temperature measurement apparatus with an actual measurement point.

When the number of measurement points is small, it may be possible to create data by associating measurement points recognized by the optical fiber temperature measurement apparatus under the condition where the optical fiber is heated, with their respective actual measurement points. When the number of measurement points is large, however, the above method is not realistic, because requiring a huge length of working time. In addition, even though the equipment in the data center is changed depending on a demand which changes from time to time, the above method cannot easily respond to the change in the equipment.

SUMMARY

According to one aspect, there is provided an cable installed state analyzing method of analyzing an installed state of a cable routed between multiple installation tools and provided with multiple position marks at predetermined intervals, the position marks each indicating a distance from a reference point, the cable installed state analyzing method including: acquiring positions of the position marks and the installation tools; classifying the multiple installation tools into a plurality of groups, and determining a basic model matched to each of the groups by comparing an arranged state of the installation tools and an installed state of the cable between the installation tools with multiple preset basic models; and analyzing an installed route of the cable by using the basic models and the position marks.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 16A is a view illustrating an example of an image before image geometry correction conversion, and FIG. 16B is a view illustrating an example of an image after the image geometry correction conversion;

FIG. 47 is a diagram illustrating optical fiber lengths and X-Z coordinates at an inlet portion and an outlet portion of each cassette, the positions of position marks, and the positions of the optical fiber installation tools in racks A, B, and C;

FIG. 48 is a diagram illustrating an optical fiber length at a starting section of each of regions inside and outside a model in each rack;

FIG. 49 is a diagram illustrating measured temperature at each of measurement points and the X-Z coordinates of the measurement point in association with each other, where the measurement points are set at intervals of 10 cm in the length direction of the optical fiber;

DESCRIPTION OF EMBODIMENTS

Hereinafter, a cable installed state analyzing method and an installed state analyzing apparatus according to an embodiment will be described by taking as an example a temperature measurement using an optical fiber in a data center.

Figure 1:
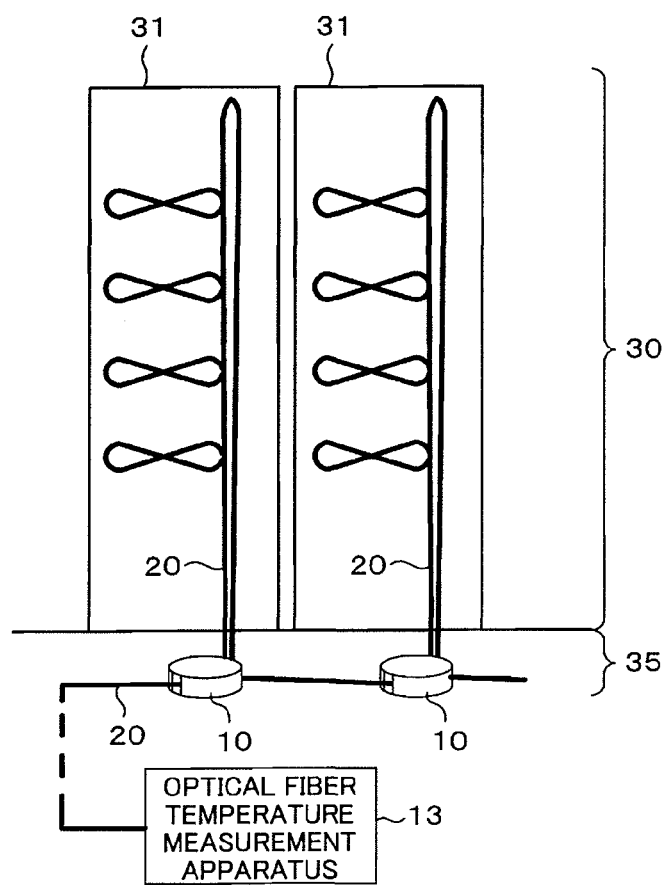
FIG. 1 is a schematic diagram illustrating an installation example of an optical fiber in a data center.

FIG. 1 is a schematic diagram illustrating an installation example of an optical fiber in a data center. An inside of a computer room in the data center is divided into an equipment installation area 30 and a free access floor 35. In the equipment installation area 30, there are installed a large number of racks (server racks) 31, in each of which multiple computers (servers: not illustrated) are housed.

The free access floor 35 is provided under a floor of the equipment installation area 30. Electric cables, network cables and the like connected to the racks 31 are arranged in the free access floor 35 in which the temperature is kept almost constant with supply of cool air from an air conditioner. Vent holes (grilles) are provided under the floor of the equipment installation area 30, and the cool air is supplied from the free access floor 35 to the vicinities of inlet ports of the racks 31 via the vent holes. The cool air is let into the racks 31 to cool the computers inside the racks 31.

Figure 2:
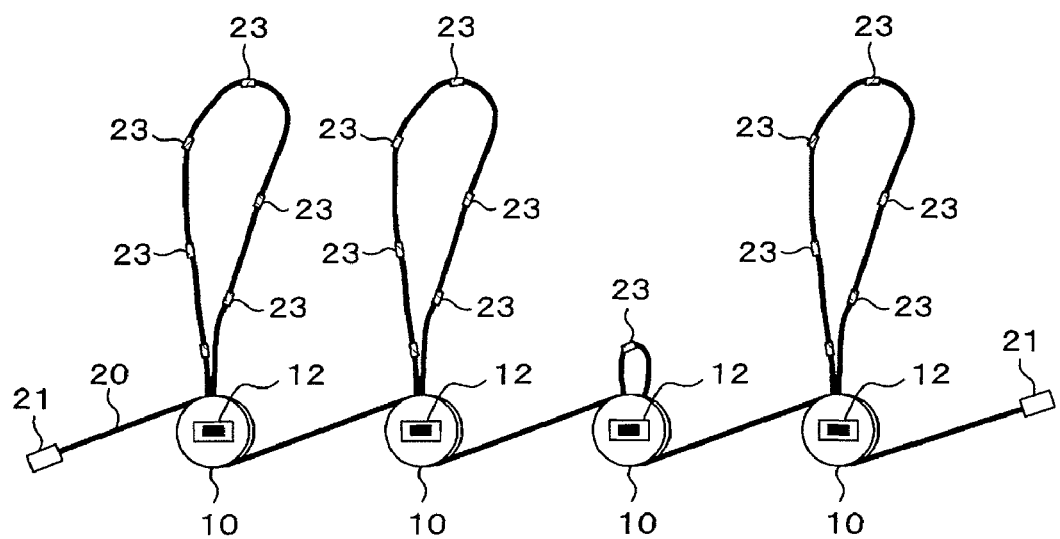
FIG. 2 is a view illustrating an optical fiber to which optical fiber pre-rolled cassettes are attached.

As illustrated in FIG. 2, multiple optical fiber pre-rolled cassettes (hereinafter, simply referred to as "cassettes") 10 are attached to a single optical fiber 20. The optical fiber 20 is to be connected to a fiber temperature measurement apparatus 13 (see FIG. 1) or other optical fibers (not illustrated) via optical connectors 21 arranged on both ends of the optical fiber 20. Each of the cassettes 10 is provided with a unique identifier (such as a barcode) 12. By use of the identifier 12, the cassette and the rack 31 are easily associated with each other.

Each cassette 10 houses the optical fiber 20 with predetermined positions of the optical fiber 20 aligned with an inlet portion thereof (cassette inlet portion) and an outlet portion thereof (cassette outlet portion), respectively, and with the optical fiber 20 therebetween wound in the same direction around a cylindrical member from the side near the inlet portion and the outlet portion. The length of the optical fiber 20 between the inlet portion and the outlet portion is set to, for example, 10 m. The optical fiber 20 drawn out of the cassette 10 by a necessary length from a turn-round point side of the optical fiber 20, and is then installed. Moreover, the length of the optical fiber 20 between the cassettes 10 is set according to the distance between the racks 31. Here, the length of the optical fiber 20 between the cassettes 10 is assumed to be set at 1 m.

The optical fiber 20 is provided with meter marks each indicating a distance from a reference point (for example, the position of the optical connector 21) and arranged in the longitudinal direction at pitches of 20 cm, for example. In addition, the optical fiber 20 between the inlet portion and the outlet portion of each cassette 10 is provided with position marks 23 at pitches of 50 cm, for example, in addition to the meter marks.

Each of the position marks 23 is formed of a combination of multiple colors such as cyan, magenta, and yellow. The position marks 23 each may make it possible to identify the distance of the optical fiber 20 from the inlet portion of the cassette 10 and the direction of the optical fiber 20 (which side of the position mark 23 indicates the cassette inlet portion side is determined). The optical fiber 20 in each cassette 10 is provided with no position marks 23 with the same color combination, but is provided with the position marks (color codes) 23 with color combinations different depending on the distances from the cassette inlet portion. Here, in order to make the position mark 23 detectable even when the optical fiber 20 is twisted, each position mark (each color) 23 is provided to entirely surround the optical fiber 20 in a circumferential direction.

Figure 3:
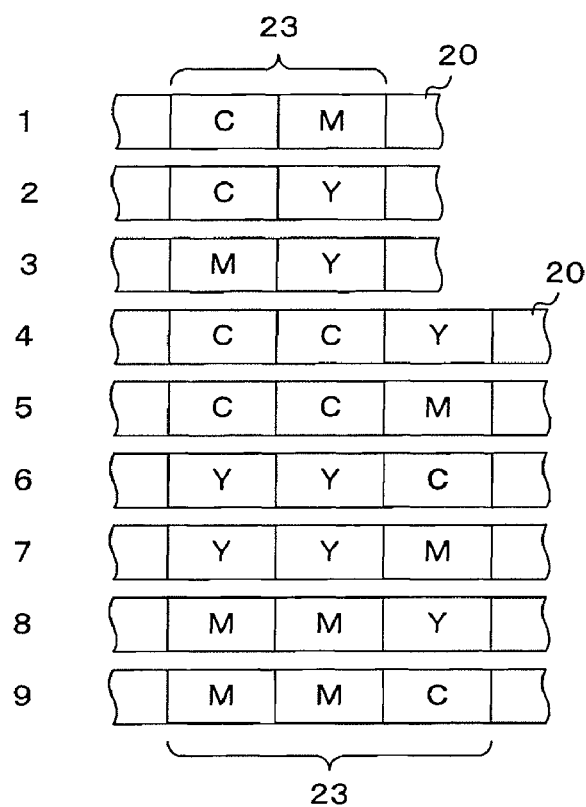
FIG. 3 is a diagram illustrating an example of position marks (color codes)

FIG. 3 illustrates first to ninth position marks (color codes) 23 as one example. In FIG. 3, C denotes cyan, M denotes magenta, and Y denotes yellow. In addition, the left side of FIG. 3 indicates the cassette inlet portion side. For example, the first position mark 23 is arranged in a position at a distance of 50 cm from the cassette inlet portion in the length direction of the optical fiber 20, and the second position mark 23 is arranged in a position at a distance of 1 m from the cassette inlet portion in the length direction of the optical fiber 20. As the same applies to the following, the third to ninth position marks 23 are arranged, at pitches of 50 cm, in positions at distances of 1.5 m to 4.5 m from the cassette inlet portion in the length direction of the optical fiber 20.

Incidentally, the position marks 23 are provided by using combinations of multiple colors in the present embodiment, but another method (for example, by giving barcodes) may be used to provide the position marks 23. Here, what is important is that information on each position mark 23 is acquired by image recognition to be described later.

In the example illustrated in FIG. 1, the cassettes 10 are arranged in the free access floor 35 in which the temperature is kept almost constant by the air conditioner, and the optical fiber 20 is drawn out of the cassettes 10 and laid inside the racks 31 in the equipment installation area 30. For this reason, portions having the constant temperature (the temperature of the free access floor 35) cyclically appear in a temperature distribution in the length direction of the optical fiber 20, which is obtained by the optical fiber temperature measurement apparatus 13. These portions at the constant temperature correspond to the positions of the cassettes 10, respectively, and thereby the optical fiber temperature measurement apparatus 13 may recognize the positions of the cassettes 10 (the positions in the length direction of the optical fiber) from the temperature distribution. Additionally, if the measurement temperatures inside the racks 31 are corrected by using the temperature of the free access floor 35 as a reference, the accuracy of the measurement temperatures inside the racks 31 may be further improved.

Figure 4:
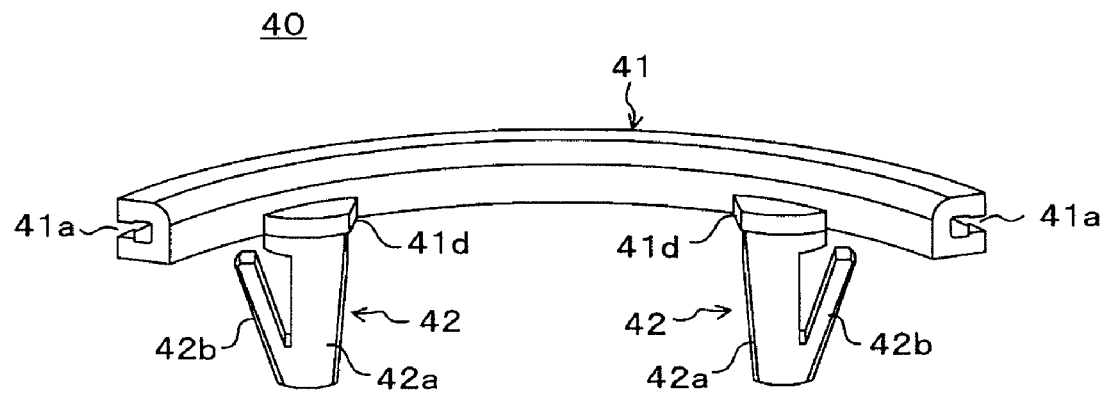
FIG. 4 is a perspective view illustrating an example of an optical fiber installation tool.
Figure 5:
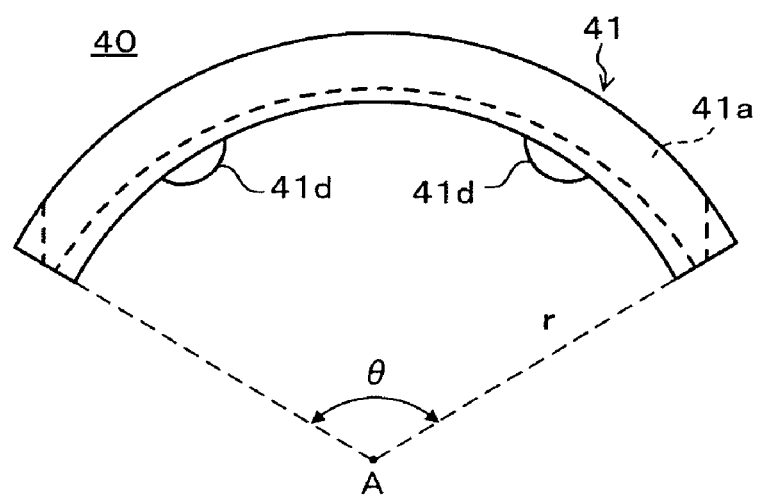
FIG. 5 is a top view illustrating the example of the optical fiber installation tool.

The optical fiber 20 is laid inside the rack 31 by using optical fiber installation tools with a predetermined shape. FIG. 4 is a perspective view illustrating an example of the optical fiber installation tool, and FIG. 5 is a top view of the same example.

An optical fiber installation tool 40 is formed by injection-molding of a plastic (resin), and includes a fiber guide portion 41 and a hook portion 42. As is apparent from FIG. 4, the fiber guide portion 41 has a shape of a thin rod having an almost-rectangular cross section and being curved along an arc of a circle centered at a point A (center of curvature) with a radius r. As illustrated in FIG. 5, an angle θ formed between two straight lines connecting the center of curvature A to both ends of the fiber guide portion 41 is larger than 90° and smaller than 180° (90°≦θ≦180°). In the present embodiment, θ is assumed to be set to 120°. In addition, the radius of curvature r of the fiber guide portion 41 is assumed to be approximately 22.5 mm.

A groove 41a is formed in an outer circumferential surface of the fiber guide portion 41 to extend in a circumferential direction. The fiber guide portion 41 is configured to curve the optical fiber 20 in an arc form with the optical fiber 20 placed inside the groove 41a. A width (open width) of the groove 41a is set slightly larger than the diameter of the optical fiber 20, and one to several optical fibers 20 may be placed inside the groove 41a.

On the lower side of the fiber guide portion 41, pedestal portions 41d are provided at positions symmetrical with respect to the center of the fiber guide portion 41 in the longitudinal direction (the mid point of the arc), and hook portions 42 are provided below the pedestal portions 41d. The hook portions 42 each include a supporting shaft portion 42a and a hinge portion (elastic portion) 42b. Each of the supporting shaft portions 42a is formed in a rod-like shape, and extends downward approximately perpendicular to a circle centered at the point A and including, as a part of the circumference, the fiber guide portion 41 (the center axis of the fiber guide portion 41). Since the supporting shaft portion 42a is thick and has low elasticity, the supporting shaft portion 42a is hardly deformed even when a stress is applied thereto.

On the other hand, each of the hinge portions 42b extends obliquely upward from a lower end of the supporting shaft portion 42a. Since the hinge portion 42b is thin and has high elasticity, the hinge portion 42b is elastically deformed in a direction toward or away from the supporting shaft portion 42a when a stress is applied thereto. An upper end of the hinge portion 42b is located at a position slightly lower than an upper end (base end) of the supporting shaft portion 42a.

Figure 6:
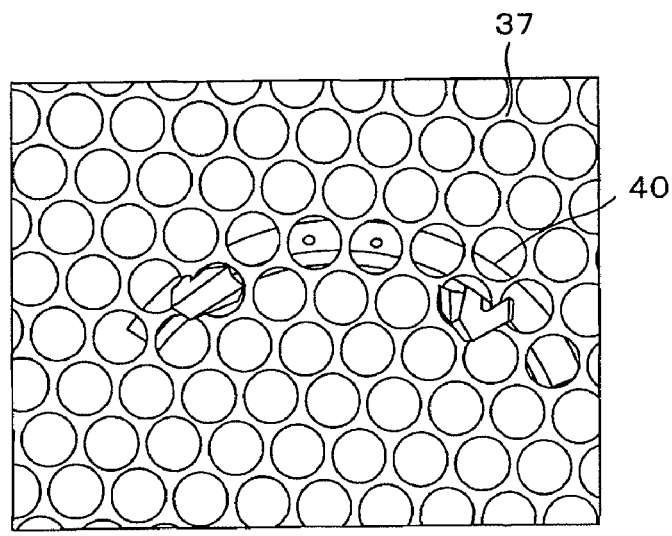
FIG. 6 is a view illustrating that the optical fiber installation tool is attached to a rack.

FIG. 6 is a view illustrating that the optical fiber installation tool 40 is attached to the rack 31. A door on a back side of the rack 31 is provided with an air inlet for letting in cool air inside the room, and a door on a front side of the rack 31 is provided with an air outlet for releasing heat generated inside the rack 31. Punching metals, for example, are arranged in the air inlet and the air outlet.

As illustrated in FIG. 6, the optical fiber installation tool 40 is fixed with the hook portions 42 of the optical fiber installation tool 40 inserted in opening portions of a punching metal 37 and with the punching metal 37 nipped between the tip ends of the hinge portions 42b and the fiber guide portion 41. When the hinge portion 42b comes into contact with the punching metal 37 in the process of inserting the hook portion 42 into the opening portion of the punching metal 37, the hinge portion 42b is elastically deformed to become narrower. Then, after the hinge portion 42b passes through the opening portion, the hinge portion 42b returns to its original shape owing to the elasticity, and the punching metal 37 is nipped between the tip end of the hinge portion 42b and the fiber guide portion 41, as described above.

Figure 7A:
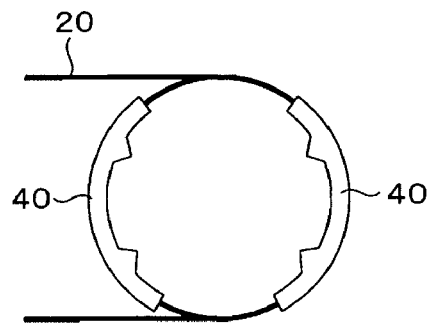
FIGS. 7A to 7C are views illustrating installation examples of optical fibers.
Figure 7B:
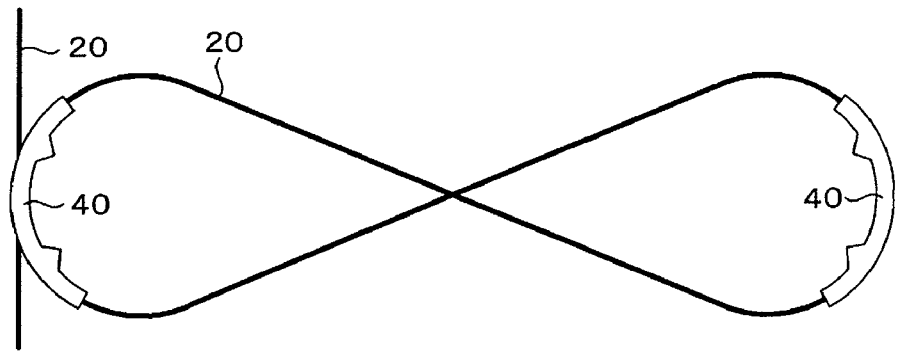
Figure 7C:
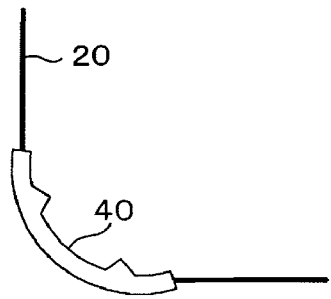

FIGS. 7A to 7C are views illustrating exemplary installed states of optical fibers. FIG. 7A illustrates an example in which two optical fiber installation tools 40 are placed to be opposed and close to each other, and an optical fiber 20 is laid in a circular form (coil form) between the optical fiber installation tools 40 by making use of the elastic tension of the optical fiber 20. FIG. 7B illustrates an example in which two optical fiber installation tools 40 are placed to be opposed to each other at a distance, and an optical fiber 20 is laid in the form of a figure eight between the optical fiber installation tools 40. FIG. 7C illustrates an example in which a laying direction of an optical fiber 20 is bent at 90° by using an optical fiber installation tool 40.

As illustrated in FIGS. 7A to 7C, optical fibers 20 may be laid in various layouts by using two or more optical fiber installation tools 40 with the same shape.

Figure 8A:
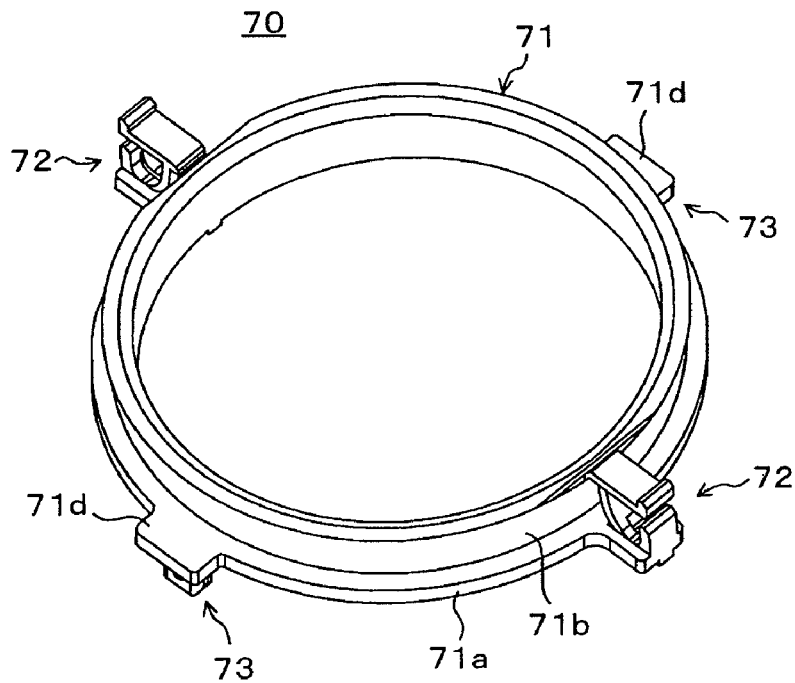
FIGS. 8A and 8B are perspective views both illustrating another example of an optical fiber installation tool.
Figure 8B:
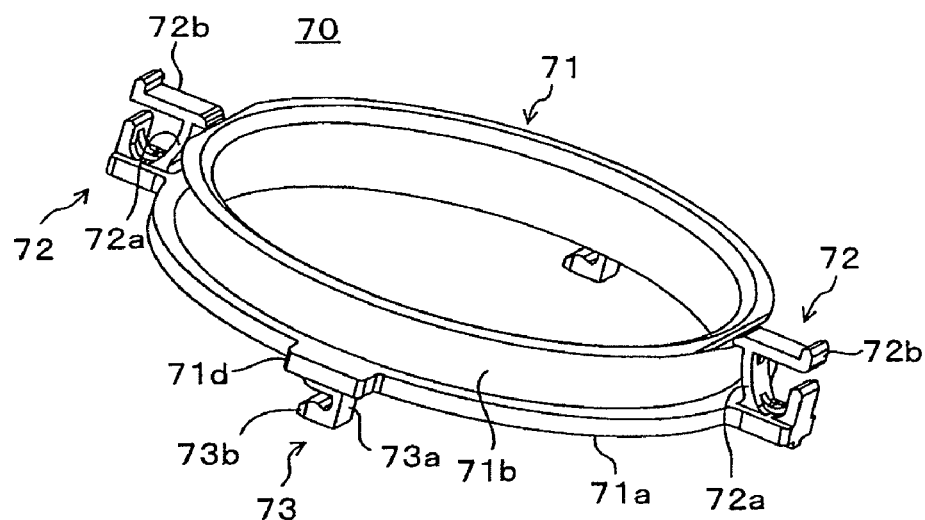
Figure 9:
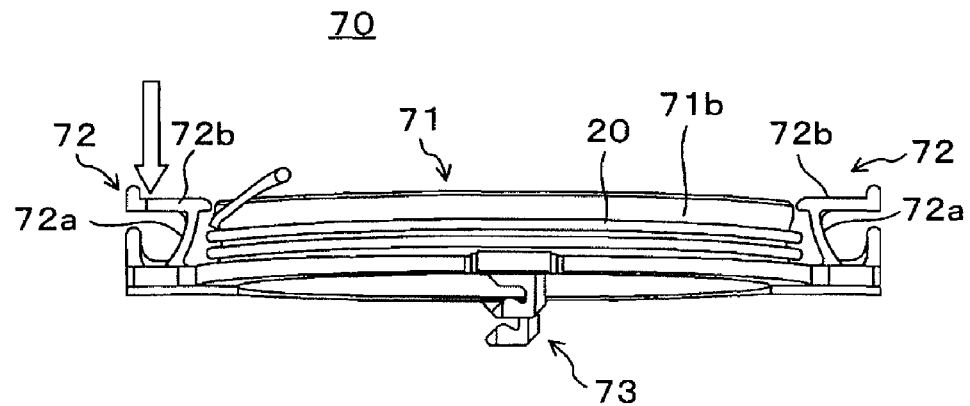
FIG. 9 is a perspective view illustrating that an optical fiber is placed in the optical fiber installation tool illustrated in FIGS. 8A and 8B.

FIGS. 8A and 8B are perspective views both illustrating another example of an optical fiber installation tool. Moreover, FIG. 9 is a perspective view illustrating that an optical fiber is placed in the optical fiber installation tool of the example.

An optical fiber installation tool 70 includes: a fiber guide portion 71 formed in a ring form (hollow ring); clamp portions (falling prevention portions) 72 for holding the optical fiber 20 on a circumferential surface of the fiber guide portion 71; and hook portions 73 for fixing the optical fiber installation tool 70 to a supporting member such as a punching metal. The optical fiber installation tool 70 is also formed integrally by injection-molding of a resin as is the case with the optical fiber installation tool 40 illustrated in FIG. 4.

The fiber guide portion 71 includes a base portion 71a in a ring form, and an inner wall portion 71b formed along an inner side (closer to the ring center) of the base portion 71a. An outer circumferential surface (fiber supporting surface) of the inner wall portion 71b is slightly recessed toward the ring center, and an optical fiber 20 is placed along the outer circumferential surface of the inner wall portion 71b as illustrated in FIG. 9. Here, the outer circumferential surface (fiber supporting surface) of the inner wall portion 71b is set to have a radius of 22.5 mm.

As illustrated in FIGS. 8A and 8B, the clamp portions 72 are arranged respectively at two positions where the fiber guide portion 71 intersects with a straight line (first straight line) passing through the center point (ring center) of the fiber guide portion 71. These clamp portions 72 each include an elastic spring portion 72a including a lower end connected to the base portion 71a, and a handle portion 72b connected to an upper end of the spring portion 72a. As illustrated in FIG. 9, there is almost no space between a tip end of the handle portion 72b and an upper end of the inner wall portion 71b in a normal state. When the handle portion 72b is pressed down by a finger, however, the spring portion 72a is deformed and a space for allowing the optical fiber 20 to pass therethrough is formed between the tip end of the handle portion 72b and the upper end of the inner wall portion 71b. When the finger is taken away from the handle portion 72, the spring portion 72a returns to its original state owing to the elasticity and closes the space between the handle portion 72b and the upper end of the inner wall portion 71b.

As illustrated in FIG. 8A, the hook portions 73 are arranged respectively at two positions where the fiber guide portion 71 intersects with a straight line (second straight line) orthogonal to the straight line (first straight line) connecting the two clamp portions 72 to each other. These hook portions 73 each include a supporting shaft portion 73a extending approximately vertically downward from a pedestal portion 71d of the fiber guide portion 71; and a hinge portion 73b extending horizontally from a lower end of the supporting shaft portion 73a, as illustrated in FIG. 8B. The optical fiber installation tool 70 is fixed in a way that a supporting member such as a punching metal is nipped between the hinge portion 73b and the pedestal portion 71d (fiber guide portion 71).

Figure 10:
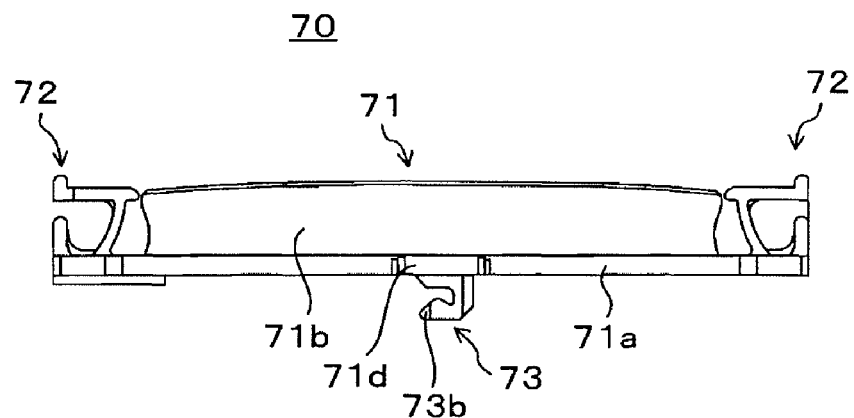
FIG. 10 is a view illustrating that the optical fiber installation tool illustrated in FIGS. 8A and 8B is viewed from an infinite distance on a straight line connecting two hooks in the optical fiber installation tool.

In order to reduce the number of mold blocks for injection-molding, it is important that a space is seen between the fiber guide portion 71 and the clamp portion 72 (the tip end of the handle portion 72b), and also that a space is seen between the pedestal portion 71d (fiber guide portion 71) and the hinge portion 73b, when the optical fiber installation tool 70 is viewed from an infinite distance on the straight line connecting the two hook portions 73, as illustrated in FIG. 10.

Figure 11:
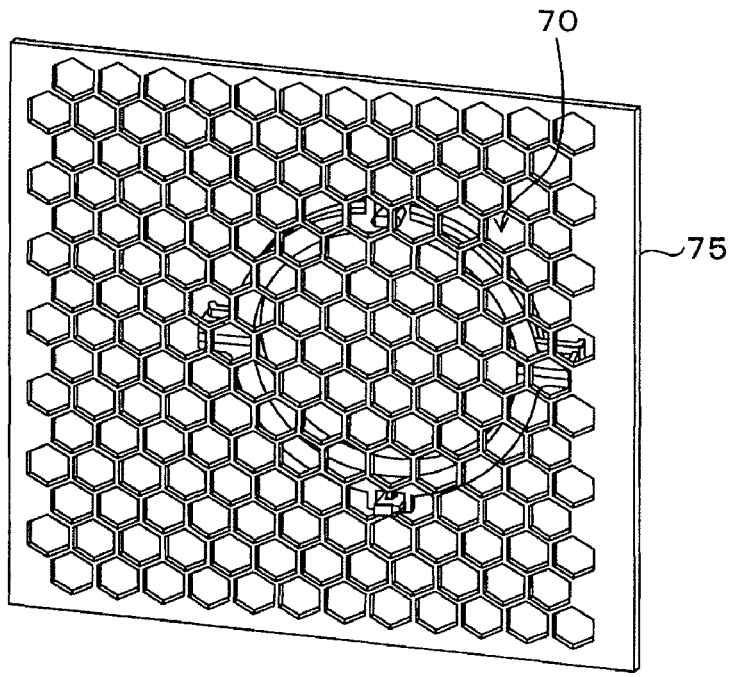
FIG. 11 is a schematic diagram (part 1) illustrating that the optical fiber installation tool illustrated in FIGS. 8A and 8B is attached to a punching metal.
Figure 12:
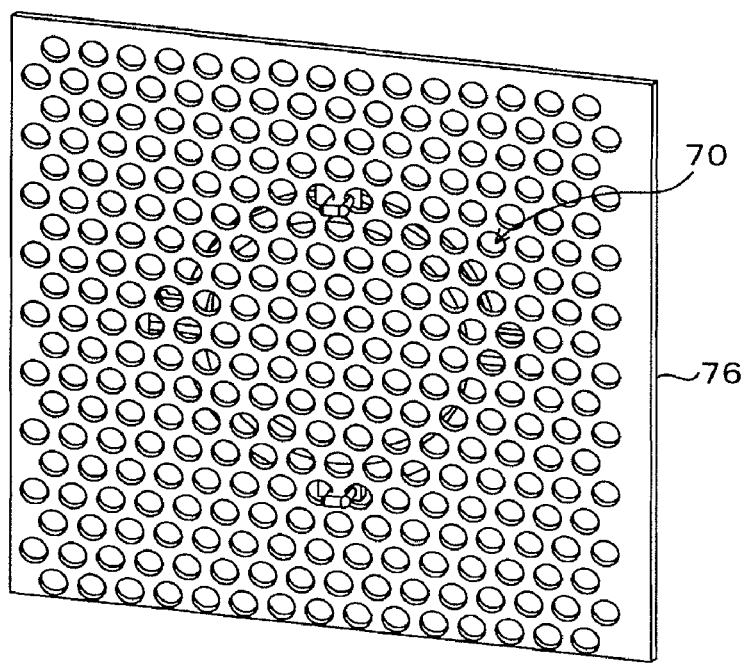
FIG. 12 is a schematic diagram (part 2) illustrating that the optical fiber installation tool illustrated in FIGS. 8A and 8B is attached to a punching metal.

FIG. 11 is a schematic diagram illustrating that the optical fiber installation tool 70 is attached to a punching metal 75 including opening portions in a hexagonal shape. FIG. 12 is a schematic diagram illustrating that the optical fiber installation tool 70 is attached to a punching metal 76 including opening portions in a circular shape.

The optical fiber installation tool 70 can also be applied to various installed states of optical fibers, such as a case of laying an optical fiber in a circular form, a case of laying an optical fiber in the form of a figure eight and a case of bending the laying direction of an optical fiber at 90°.

Figure 13:
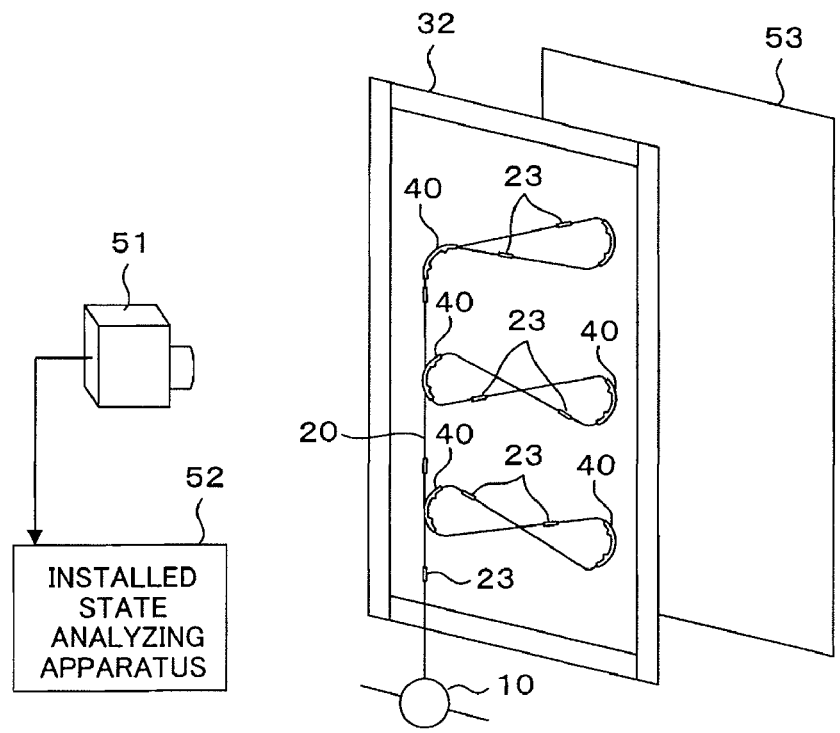
FIG. 13 is a schematic diagram illustrating an optical fiber laid on a rack door, and a camera and an installed state analyzing apparatus which are for use in installed state analysis.
Figure 14:
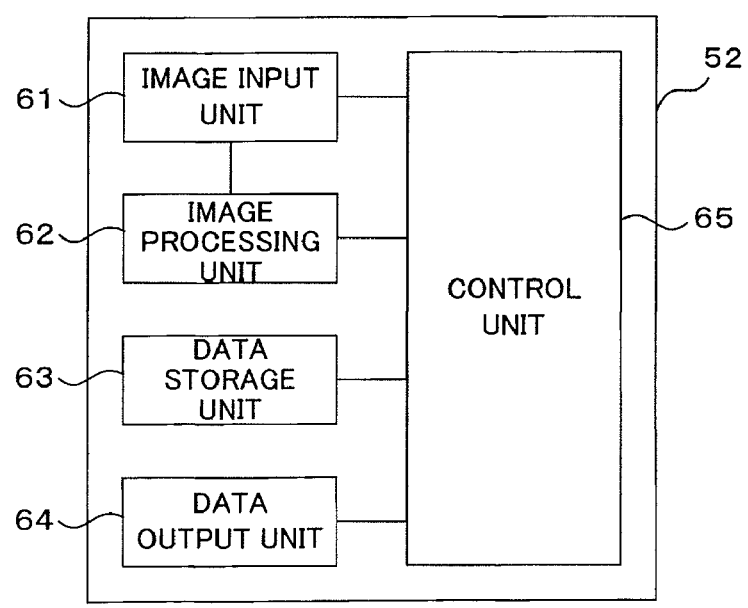
FIG. 14 is a block diagram illustrating a configuration of the installed state analyzing apparatus.

FIG. 13 is a schematic diagram illustrating an optical fiber laid on a rack door, and a camera and an installed state analyzing apparatus which are for use in installed state analysis. FIG. 14 is a block diagram illustrating a configuration of the installed state analyzing apparatus.

In this example, as illustrated in FIG. 13, an optical fiber 20 drawn out of a cassette 10 is laid on a rack door 32 (air inlet side or air outlet side door) in a predetermined route by using optical fiber installation tools 40. An optical fiber 20 laid inside the rack is provided with position marks 23 as described above. In addition, an optical fiber installation tool 40 is arranged at every position where the laying direction of the optical fiber 20 is changed, and the optical fiber 20 is laid almost linearly between optical fiber installation tools 40. Here, as illustrated in FIG. 13, the optical fiber 20 is laid in such a manner as to make a round trip on the left side of the door 32 from bottom to top and vice versa and to make a round trip approximately horizontally (in the width direction of the door 32) at each predetermined position.

As illustrated in FIG. 14, an installed state analyzing apparatus 52 includes an image input unit 61, an image processing unit 62, a data storage unit 63, a data output unit 64 and a control unit 65 to control these image input unit 61, image processing unit 62, data storage unit 63 and data output unit 64.

Figure 15:
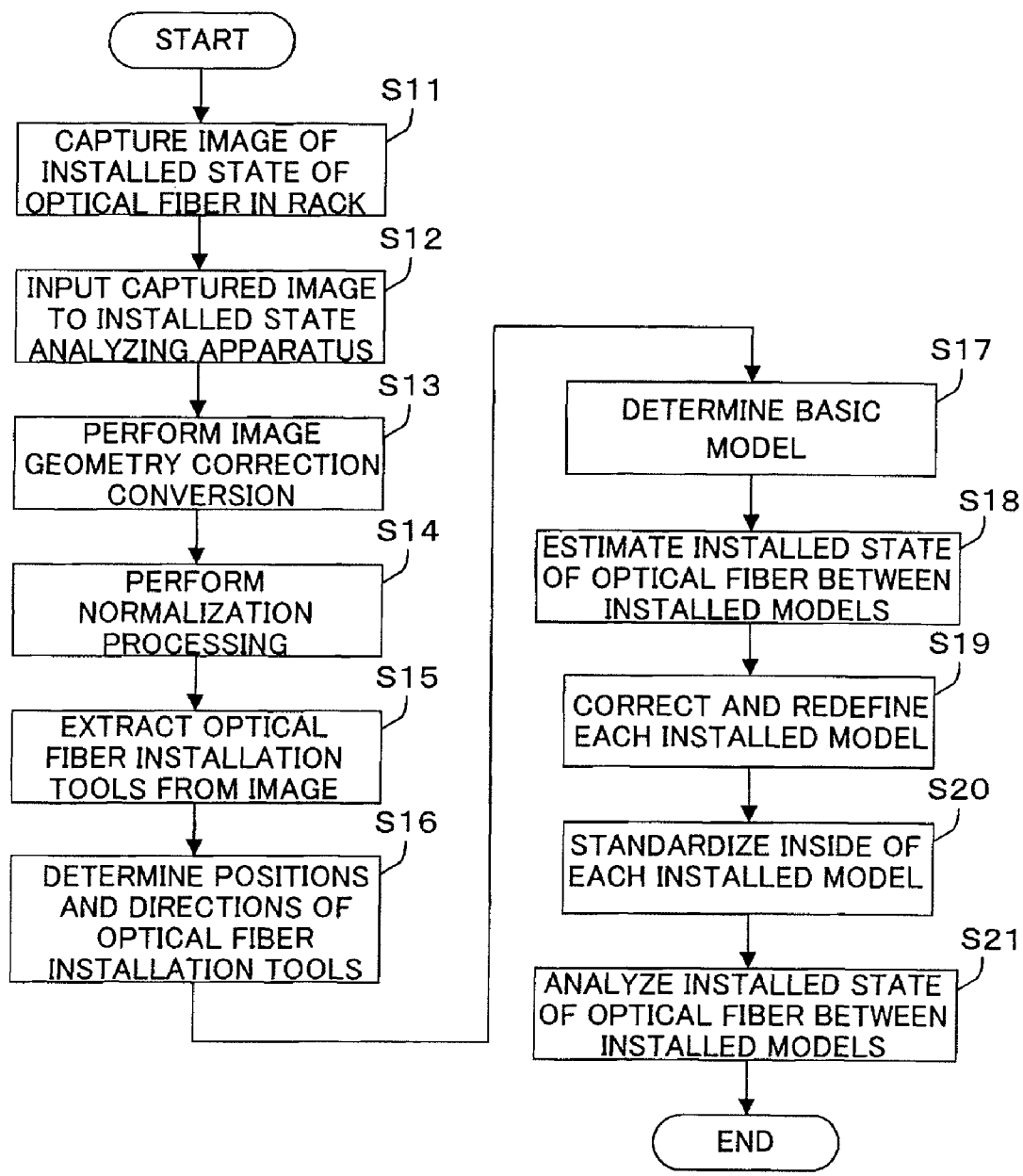
FIG. 15 is a flowchart illustrating a cable (optical fiber) installed state analyzing method according to an embodiment.

FIG. 15 is a flowchart illustrating a cable (optical fiber) installed state analyzing method according to an embodiment.

Firstly, in step S11, an image of the rack door (punching metal) 32 on a side where the optical fiber 20 is laid is captured by using a camera (color image pickup device) 51. For example, as illustrated in FIG. 13, the image of the entire rack door 32 is taken by the camera 51 with a shading curtain 53 placed on the back side of the rack door 32 (on the side opposite to the surface where the optical fiber 20 is laid). Here, the shading curtain 53 is for making the optical fiber 20, the optical fiber installation tools 40 and the position marks 23 more recognizable in image recognition processing to be described later. For this reason, it is preferable that the color of the shading curtain 53 is different from the colors used in the optical fiber 20, the optical fiber installation tools 40 and the position marks 23.

Next, in step S12, the image of the rack captured by the camera 51 is inputted into the installed state analyzing apparatus 52 (image input unit 61) in association with the identifier (see FIG. 2) of the cassette 10 used for the rack. The image captured by the camera 51 is not always an image of the rack door 32 captured exactly in front of the rack door 32. For this reason, in step S13, the image processing unit 62 performs image geometry correction conversion on the inputted image by using techniques such as warping, thereby converting the image into an image in which the door 32 is viewed from a position exactly in front. For instance, the image processing unit 62 performs image recognition processing to detect a frame (outer frame) of the door 32, and performs image processing so that the corners of the rectangular formed by the frame each become at 90° correctly.

FIGS. 16A and 16B schematically illustrate an example of an image before the image geometry correction conversion (FIG. 16A) and an example of an image after the image geometry correction conversion (FIG. 16B). Here, specific color or shape marks (hereinafter, simply called "specific marks") may be arranged at four corners of the shading curtain 53, and the image processing unit 62 may extract the specific marks from a captured image, and perform image processing to locate the specific marks at four corners of a rectangular parallelepiped.

After that, in step S14, the image processing unit 62 cuts out an image within a predetermined range, for example, an image within the frame (or the image within a rectangular range formed by connecting the specific marks), from the image after the image geometry correction conversion. Then, the image processing unit 62 converts (normalizes) the cut-out image into an image in a predetermined size by using a technique such as bilinear or bicubic interpolation.

Figure 17A:
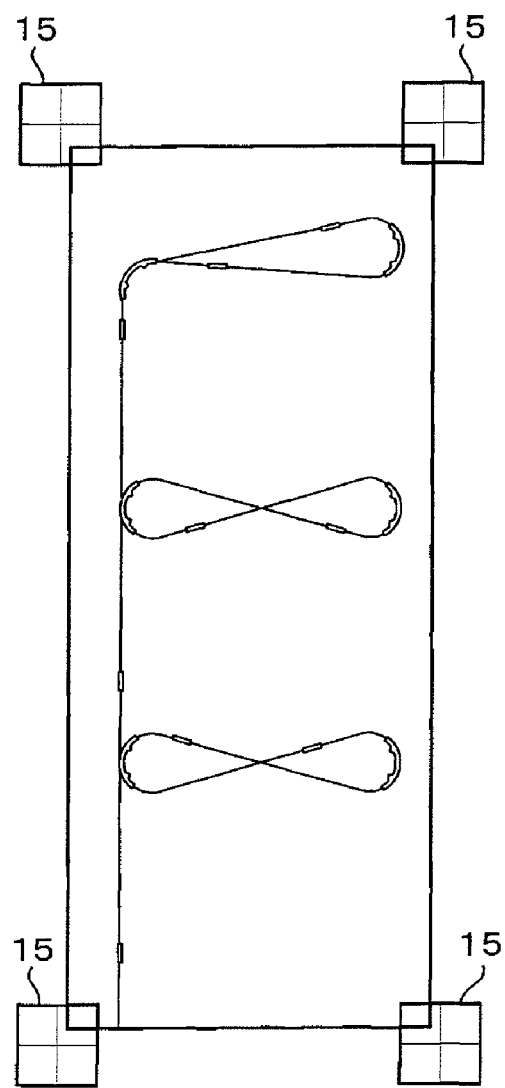
FIG. 17A is a schematic diagram illustrating an image within the frame cut out of the image after the image geometry correction conversion.
Figure 17B:
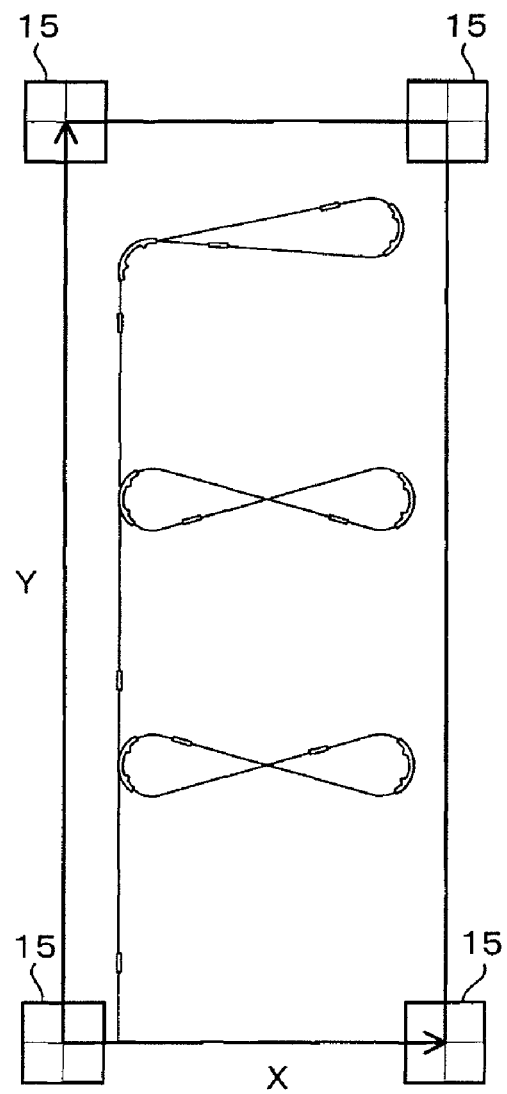
FIG. 17B is a schematic diagram illustrating an image after the normalization processing.

FIG. 17A is a schematic diagram illustrating an image within the frame cut out from the image after the image geometry correction conversion, and FIG. 17B is a schematic diagram illustrating an image after the normalization processing. Here, in FIGS. 17A and 17B, reference numerals 15 schematically represent the capacity of an image buffer of the image processing unit 62. The image after the normalization processing is mapped to orthogonal coordinates with the lateral direction set on an X axis direction and with the vertical direction set on a Y axis direction, for example.

Next, in step S15, the image processing unit extracts the optical fiber installation tools 40 from the normalized image by using color filtering and pattern matching techniques, and obtains the installation position (coordinates) and the direction of each of the optical fiber installation tools 40 in step S16.

Then, the control unit 65 determines a basic model on the basis of the arranged state of each of the optical fiber installation tools 40 in step S17.

Figure 18:
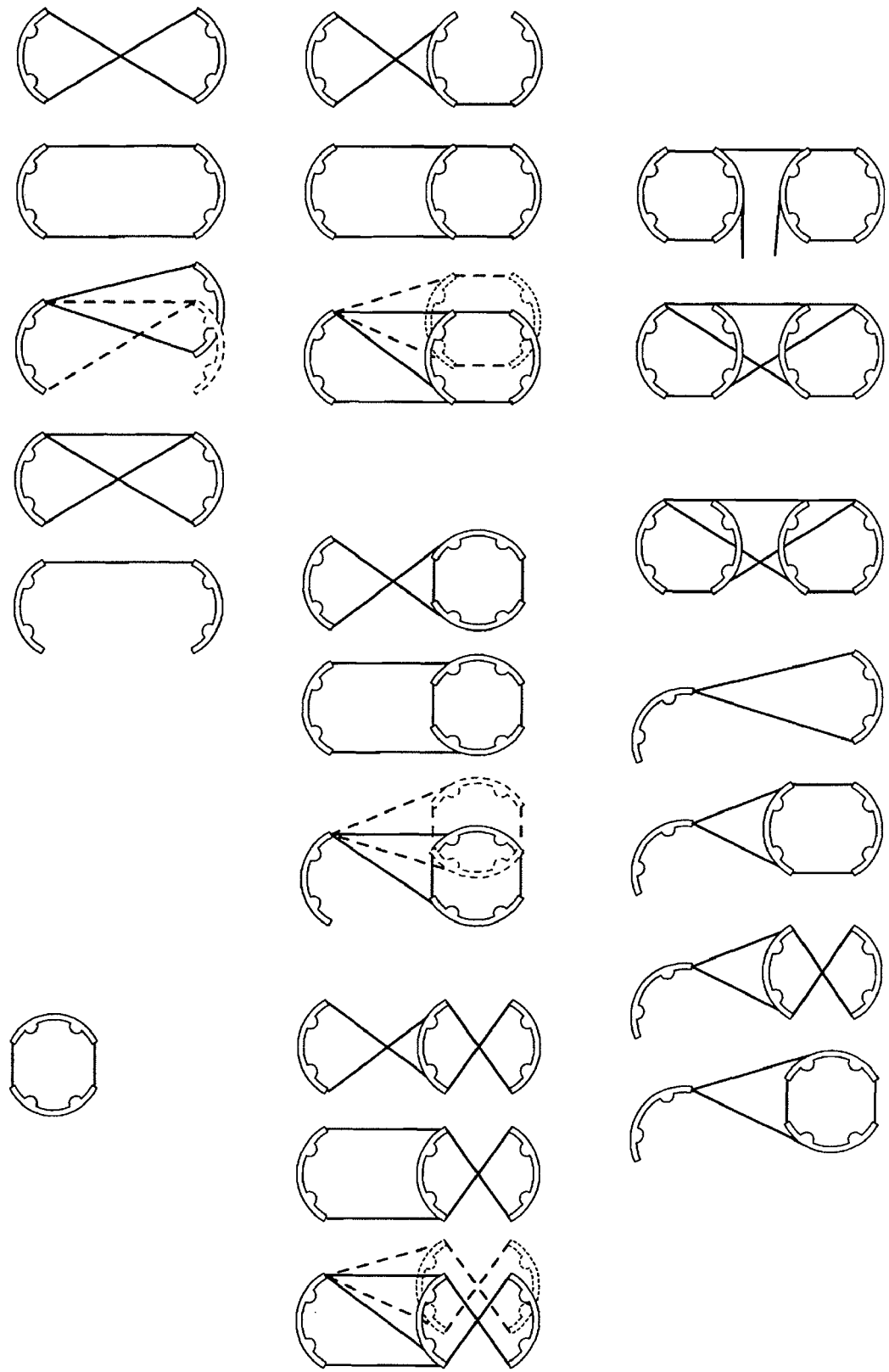
FIG. 18 is a diagram illustrating examples of preset basic models of arrangements of optical fiber installation tools and installed states of optical fibers (part 1)
Figure 19:
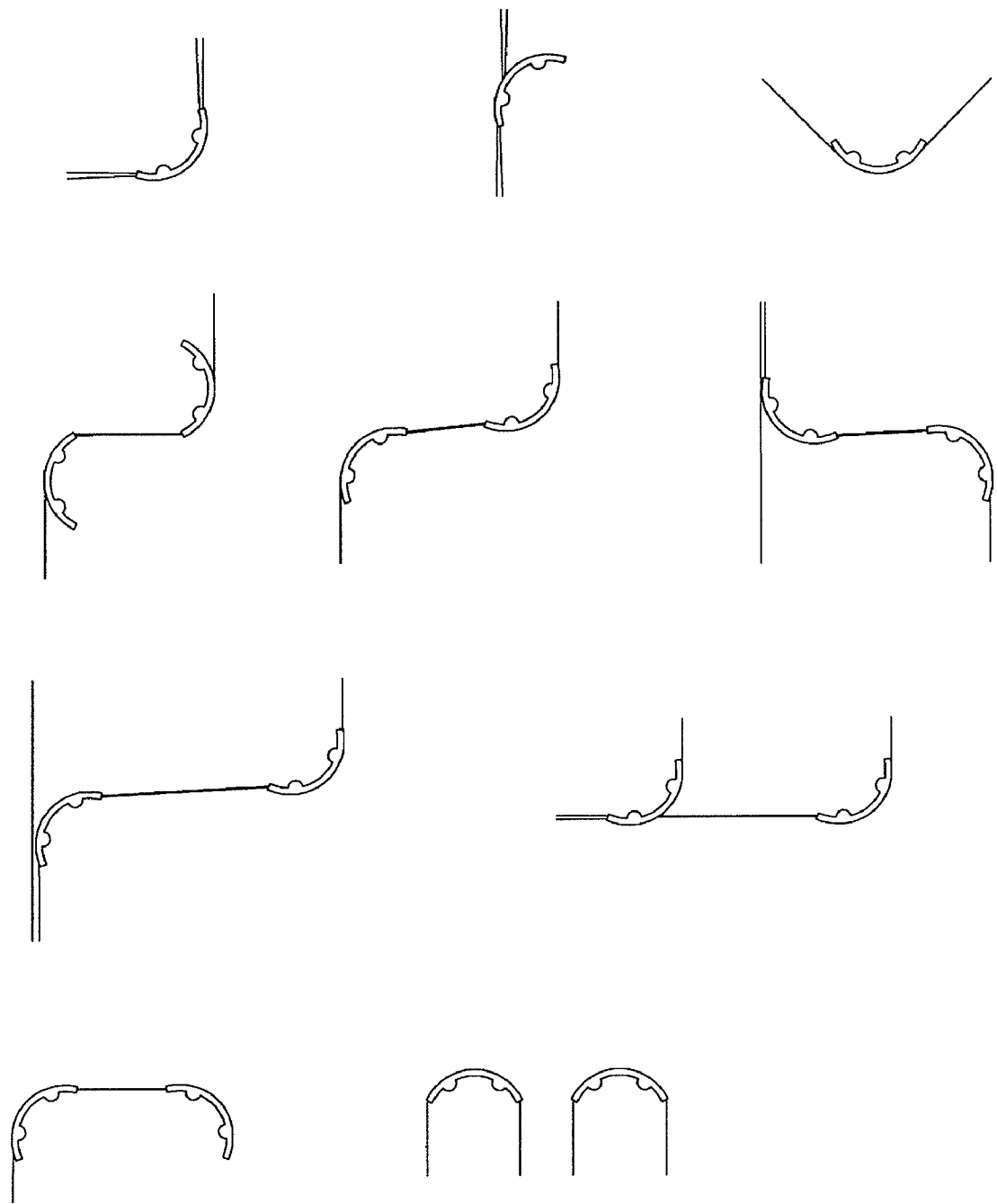
FIG. 19 is a diagram illustrating examples of preset basic models of arrangements of optical fiber installation tools and installed states of optical fibers (part 2)

FIGS. 18 and 19 are diagrams illustrating examples of preset basic models each including an arrangement of optical fiber installation tools and an installed state of an optical fiber. Note that the optical fiber installation tools 40 are supposed to be used in the layout of any of the basic models illustrated in FIGS. 18 and 19. Here, data of the basic models are stored in advance in the data storage unit 63.

As is clear from FIGS. 18 and 19, when two or more optical fiber installation tools 40 are placed away from each other in the lateral direction (X axis direction) and an optical fiber 20 is routed between these optical fiber installation tools 40, these optical fiber installation tools 40 are not largely displaced from each other in a height direction (Y axis direction).

Figure 20:
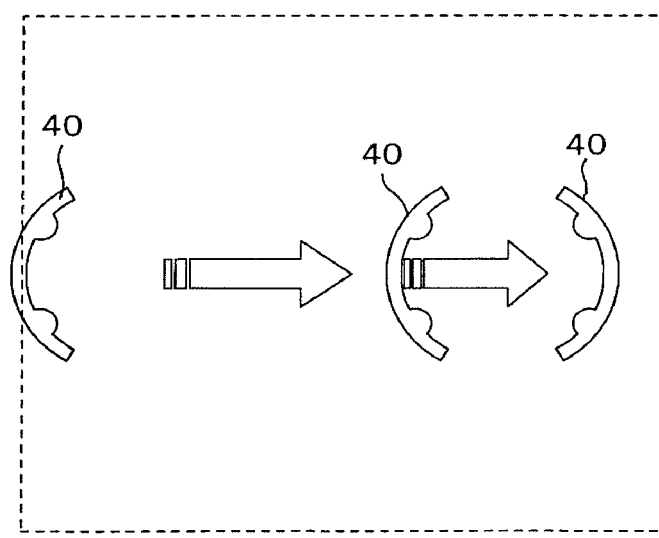
FIG. 20 is schematic diagram illustrating the process of cutting out an image with a certain width from a normalized image.

The control unit 65 controls the image processing unit 62 to cut out an image with a certain width from the normalized image by cutting in a direction parallel to the X axis, as schematically illustrated in FIG. 20. Then, the optical fiber installation tool 40 placed far left is selected as a reference from the optical fiber installation tools 40 extracted from the image, and all the optical fiber installation tools 40 placed on the right side of the optical fiber installation tool 40 of the reference are extracted. Then, the position and direction of each of these optical fiber installation tools 40 are detected, and a matched basic model is extracted by comparing the detection result with the preset basic models.

Here, as is clear from FIGS. 18 and 19, some of the basic models include the same arrangement of the optical fiber installation tools 40 but different installed states of the optical fibers. In this case, all these basic models are extracted. In addition, there is no basic model in which two optical fiber installation tools 40 are displaced largely in the Y axis direction, as described above. For this reason, here, an optical fiber installation tool 40 located at a distance equal to or longer than one optical fiber installation tool from the reference optical fiber installation tool 40 in the height direction (Y axis direction) is excluded from the extraction target.

Thereafter, the control unit 65 controls the image processing unit 62 to again cut out an image with the certain width from the normalized image by cutting in the direction parallel to the X axis, excluding the region where the optical fiber installation tools 40 already associated with the basic model are arranged. Then, in the same manner as described above, the optical fiber installation tool 40 placed far left is selected as a reference from the optical fiber installation tools 40 extracted from the cut-out image, and all the optical fiber installation tools 40 placed on the right side of the optical fiber installation tool 40 of the reference are extracted. Then, the position and direction of each of these optical fiber installation tools 40 are detected, and the matched basic model is extracted by comparing the detection result with the preset basic models. In this way, multiple optical fiber installation tools 40 detected in the image recognition processing are classified into multiple groups, and each group is associated with at least one basic model.

Figure 21:
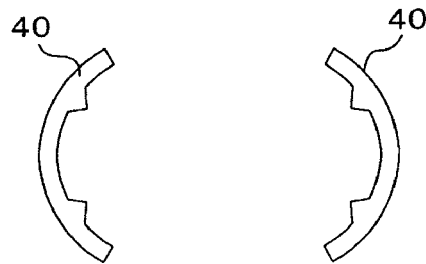
FIG. 21 is a diagram illustrating an example in which two optical fiber installation tools are placed to be opposed to each other at a distance in a horizontal direction.
Figure 22:
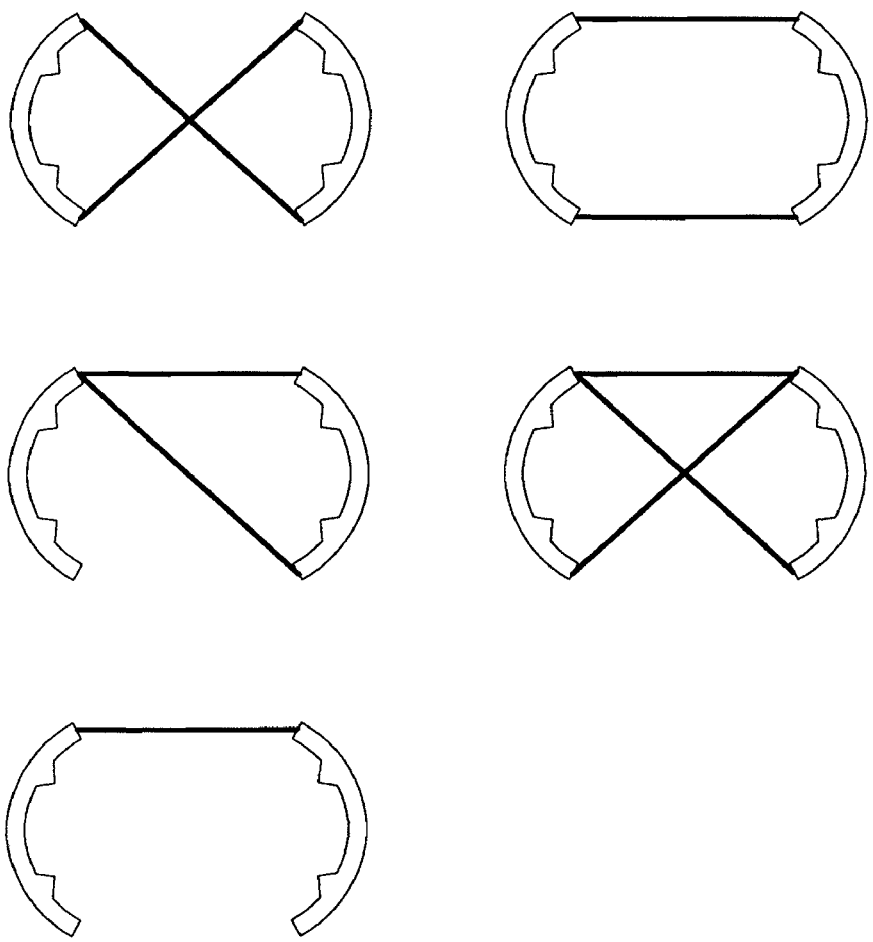
FIG. 22 is a diagram illustrating five kinds of basic models extracted from the example in FIG. 21.
Figure 23:
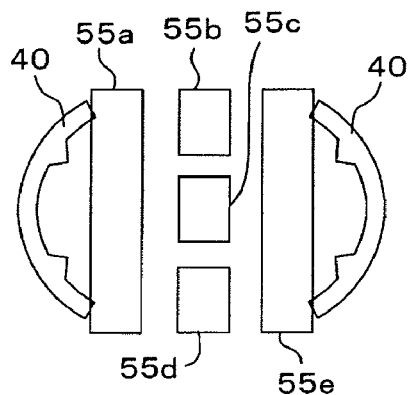
FIG. 23 is a diagram illustrating areas where to detect the number of optical fibers in the example illustrated in FIG. 21.

Next, the control unit 65 of the installed state analyzing apparatus 52 narrows down to one basic model for each group. For example, when two optical fiber installation tools 40 are placed to be opposed to each other at a distance in the horizontal direction (X axis direction) as illustrated in FIG. 21, five kinds of basic models illustrated in FIG. 22 are extracted in the above step. In this case, as illustrated in FIG. 23, the control unit 65 controls the image processing unit 62 to detect how many optical fibers are present in each of five areas (area 55a to 55e in the model indicated by rectangles in the drawing) between the two optical fiber installation tools 40, by performing image recognition (for example, edge detection). Specifically, the control unit 65 sets up five buffers (counters) for the five areas 55a to 55e in FIG. 23, and writes the number of optical fibers detected by the image recognition to each of the buffers.

Figure 24A:
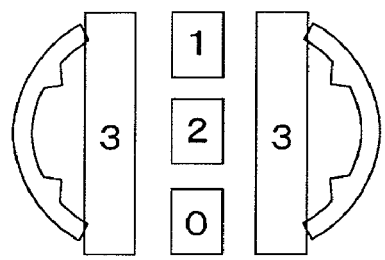
FIGS. 24A and 24B are diagrams illustrating values of buffers and a basic model determined based on the values in the example illustrated in FIG. 21 (part 1)
Figure 24B:
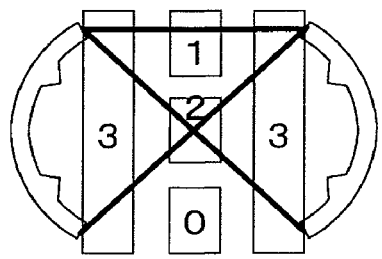
Figure 25A:
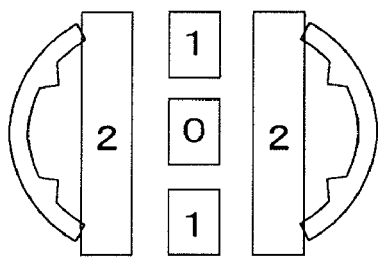
FIGS. 25A and 25B are diagrams illustrating values of buffers and a basic model determined based on the values in the example illustrated in FIG. 21 (part 2)
Figure 25B:
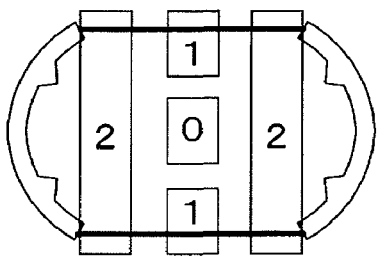

For example, when numbers are written to the buffers as illustrated in FIG. 24A, the model illustrated in FIG. 24A is regarded as a basic model illustrated in FIG. 24B. In another example, when numbers are written to the buffers as illustrated in FIG. 25A, the model illustrated in FIG. 25A is regarded as a basic model illustrated in FIG. 25B.

Figure 26:
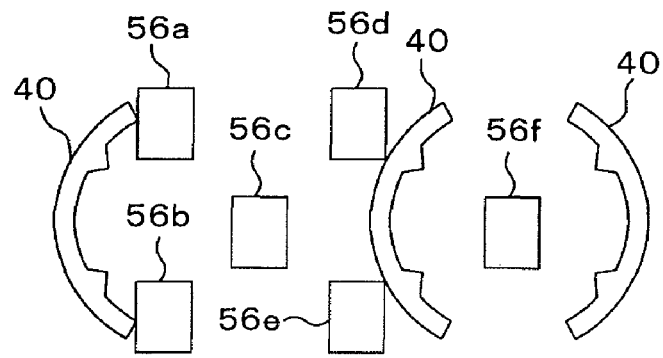
FIG. 26 is a diagram illustrating an example in which three optical fiber installation tools are arranged in a lateral direction.
Figure 27A:
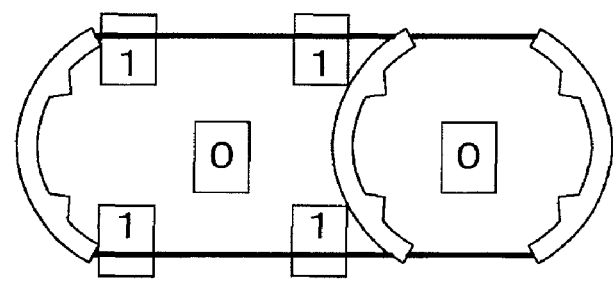
FIGS. 27A and 27B are diagrams illustrating values of buffers and basic models determined based on the values in the example illustrated in FIG. 26.
Figure 27B:
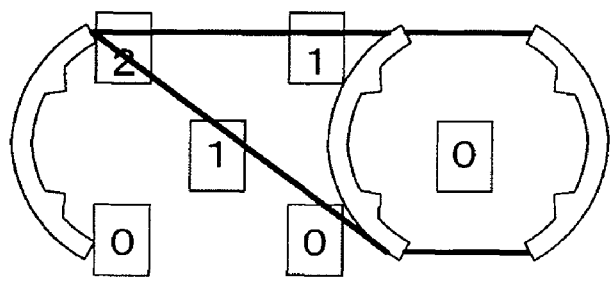

FIG. 26 illustrates an example in which three optical fiber installation tools 40 are arranged in the lateral direction. In this case, the control unit 65 sets up six buffers for areas 56a to 56f indicated by rectangles in FIG. 26, and writes the number of optical fibers detected by the image recognition to each of the buffers. FIGS. 27A and 27B illustrate the numbers written to the buffers and the basic model determined by the numbers, respectively. In this way, the basic models are determined for all the optical fiber installation tools 40 placed in the rack 31. Hereinafter, an actual optical fiber installed state associated with a basic model is referred to as an "installed model."

Subsequently, in step S18, the control unit 65 estimates an installed state of an optical fiber between installed models. Here, it is assumed that the position of an input and output section of an optical fiber is determined in advance for each basic model, and that the position of an input and output section of an installed model is determined if a basic model is determined.

The control unit 65 sets up buffers (counters) for the positions (areas) of input and output sections of an installed model, and writes the number of optical fibers detected in the image recognition by the image processing unit 62 to each of the buffers.

Figure 28A:
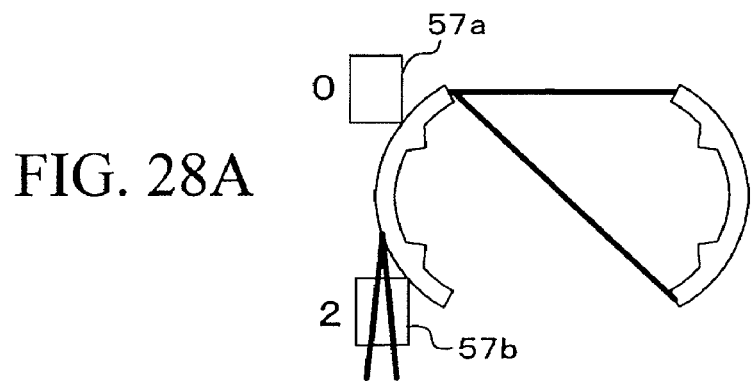
FIGS. 28A to 28D are diagrams illustrating a process of determining the number of optical fibers running through an input and output section of an installed model.

For example, it is assumed that the basic model illustrated in FIG. 28A is a model placed in the uppermost position in a rack, and that this basic model is determined in advance to have one input and output section at a position on the left lower side of the model. In the installed model matched with this basic model, the number of optical fibers running through a left upper area 57a is zero, and the number of optical fibers running through a left lower area 57b is an even number. For example, when the value of the buffer for the area 57b is 1, it is considered that two optical fibers overlap with each other and therefore are detected as one fiber. Thus, the control unit 65 corrects the value of the buffer for the area 57b in the installed model by replacing the value with two.

Figure 28B:
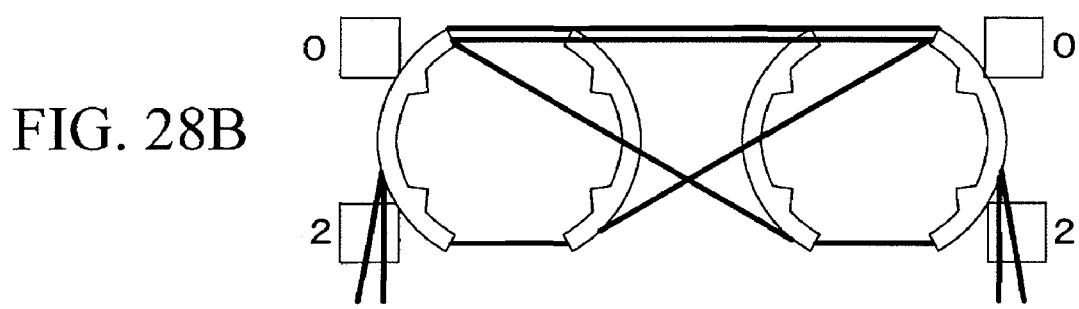

The basic model illustrated in FIG. 28B is also a model placed in the uppermost position in a rack. This basic model is determined in advance to have two input and output sections on the left lower side and the right lower side of the model, and to have an even number as the number of optical fibers running through each of the input and output sections.

Figure 28C:
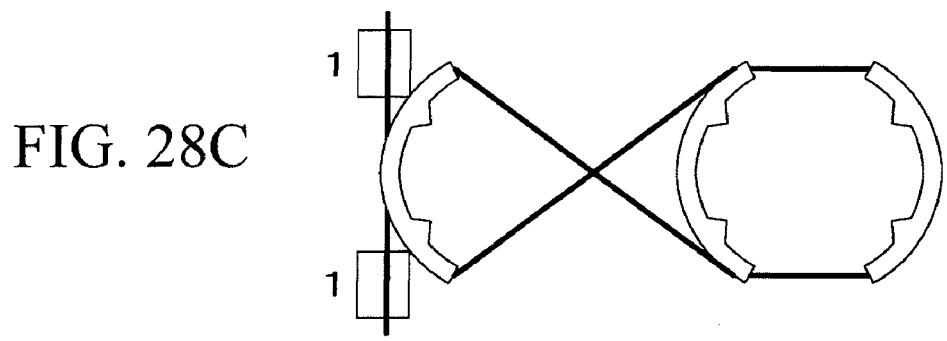
Figure 28D:
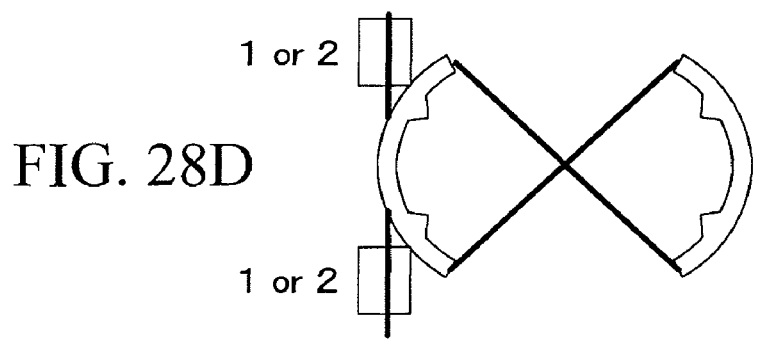

The basic models illustrated in FIGS. 28C and 28D are models placed below the uppermost position in a rack. These basic models are each determined in advance to have two input and output sections on the left lower side and the left upper side of the model, and to have an equal number as the numbers of optical fibers running through the respective input and output sections. The control unit 65 sets up buffers for the respective areas of the input and output sections of the installed model matched with the basic model, and writes the number of optical fibers detected by image recognition to each of the buffers. Then, in reference to the basic model, the control unit 65 corrects the value written in the buffer if necessary.

Figure 29A:
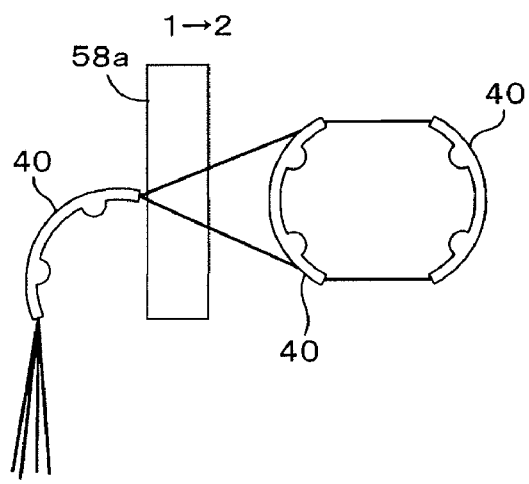
FIGS. 29A to 29C are diagrams illustrating an example of a method for correcting and redefining of installed models.

Next, in step S19, the installed model is corrected and redefined. For example, the basic model illustrated in FIG. 29A is a model placed in the uppermost position in a rack, and the number of optical fibers in the input and output section on the left lower side is an even number. However, it is assumed that a result of image recognition to detect the number of optical fibers running through an area 58a in the installed model matched with this basic model illustrates that the number of optical fibers is one. In this case, the image processing unit 62 is considered to erroneously detect the number because the optical fibers overlap with each other. Accordingly, in this case, the control unit 65 corrects (increments) the value written in the buffer for the area 58a to two.

Figure 29B:
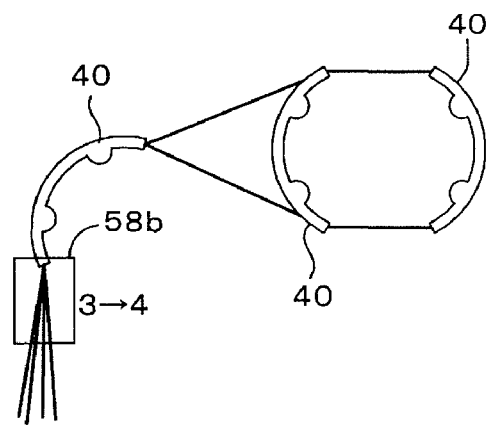

On the other hand, it is assumed that a result of image recognition to detect the number of optical fibers running through an area 58b (the input and output section of the model) illustrates that the number of optical fibers is three, as illustrated in FIG. 29B. However, since the number of optical fibers in the input and output section of this model is determined as an even number as described above, the control unit 65 corrects (increments) the value written in the buffer for the area 58b to four.

Figure 29C:
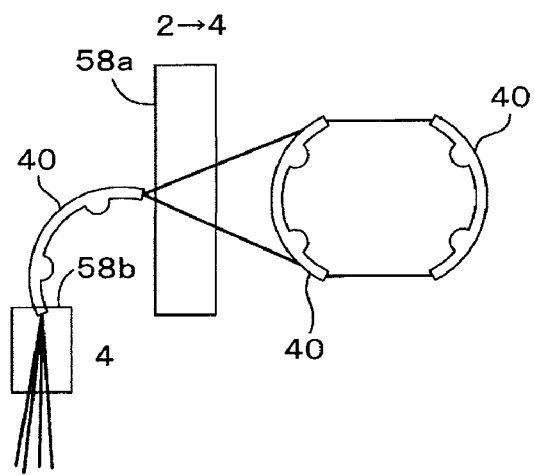

Thereafter, the control unit 65 compares the values written in the buffers for the areas 58a and 58b with each other. In this example, the values written in the buffers for the areas 58a and 58*b* are different from each other, and accordingly the control unit 65 equalizes the values written in the buffers for the areas 58*a* and 58*b* to the larger value. In other words, the control unit 65 makes both the values written in the buffers for the areas 58*a* and 58*b* equal to four as illustrated in FIG. 29C. In this way, the correction and redefinition of the installed model are completed. Here, in this step, if the position marks 23 provided to the optical fiber are detected, the number of optical fibers running through the input and output section (area 58*b*) may be more accurately determined by using the information (distance and direction between the position marks).

Next, in step S20, the installed state of the optical fiber in the installed model is standardized. Here, it is assumed that the optical fiber installation tools 40 and the optical fiber 20 are detected (image recognition), and that the basic model matched with this installed model is already determined, as illustrated in FIG. 30A, for example.

Firstly, the control unit 65 controls the image processing unit 62 to determine the center coordinates of the optical fiber installation tool 40 placed far left among the optical fiber installation tools 40 present in the installed model, and to define temporarily orthogonal coordinates (X-Y coordinates) having the origin at the center coordinates of the optical fiber installation tool 40.

Figure 30A:
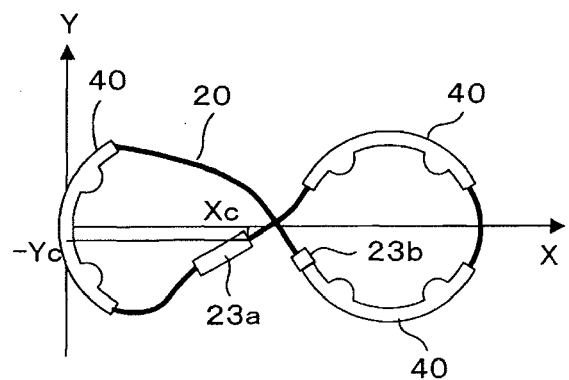
FIGS. 30A to 30C are diagrams illustrating a process of standardizing the installed state of an optical fiber in an installed model.

Here, it is assumed that the optical fiber installation tools 40, the optical fiber 20 and a position mark 23*a* are detected by image recognition as illustrated in FIG. 30A. In this example, another position mark 23*b* is also present in the installed model, but this position mark 23*b* is partly hidden in the optical fiber installation tool 40. When the image processing unit 62 may not detect a position mark accurately, the image processing unit 62 ignores the position mark.

Figure 30B:
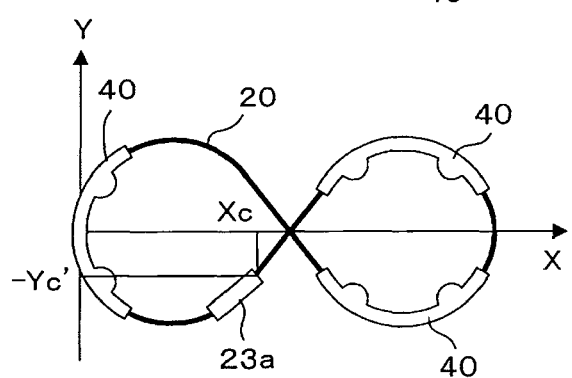

Subsequently, the control unit 65 controls the image processing unit 62 to replace the optical fiber 20 in the installed model with a combination of an arc (a part of the circumference of a circle or an oval having the center at the center of curvature of each optical fiber installation tool 40) and a straight line extending from each end of the arc in a direction tangential to the end as illustrated in FIG. 30B. Then, the control unit 65 controls the image processing unit 62 to rearrange the position mark 23 on the optical fiber 20 in the replaced model. Here, it is assumed that the position mark 23*a* (the front end or tail end of the position mark) is located at the position of Xc, −Yc, as illustrated in FIG. 30A. The image processing unit 62 performs the image processing as described above to replace the optical fiber 20 in the model with a simple form including arcs and straight lines, and to arrange the position mark 23*a* at a position of a point Xc, −Yc' on the optical fiber 20 after the replacement, as illustrated in FIG. 30B. In this way, the installed model is standardized.

Figure 30C:
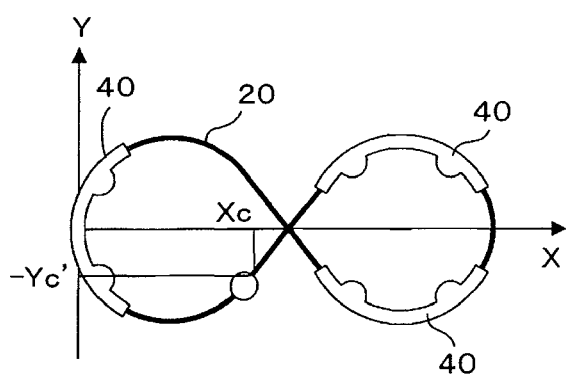

FIG. 30C illustrates an example of the model thus standardized. If the optical fiber in the installed model is replaced with simple arcs and straight lines, the coordinates (X-Y coordinates) of a certain position on the optical fiber in the installed model may be obtained through algebra calculation using the distance from the position mark 23*a* (distance in the length direction of the optical fiber). Note that, the optical fiber between the optical fiber installation tools 40 may be more approximated to a group of straight lines as described later, and then the coordinates of a certain position on the optical fiber in the installed model may be obtained through algebra calculation using the distance from the position mark 23*a* (distance in the length direction of the optical fiber).

Next, in step S21, the control unit 65 controls the image processing unit 62 to analyze a connection state of the optical fiber between the installed models. This step uses the number of optical fibers 20 running through the input and output section in each model and the position marks 23 provided to the optical fiber 20.

Figure 31:
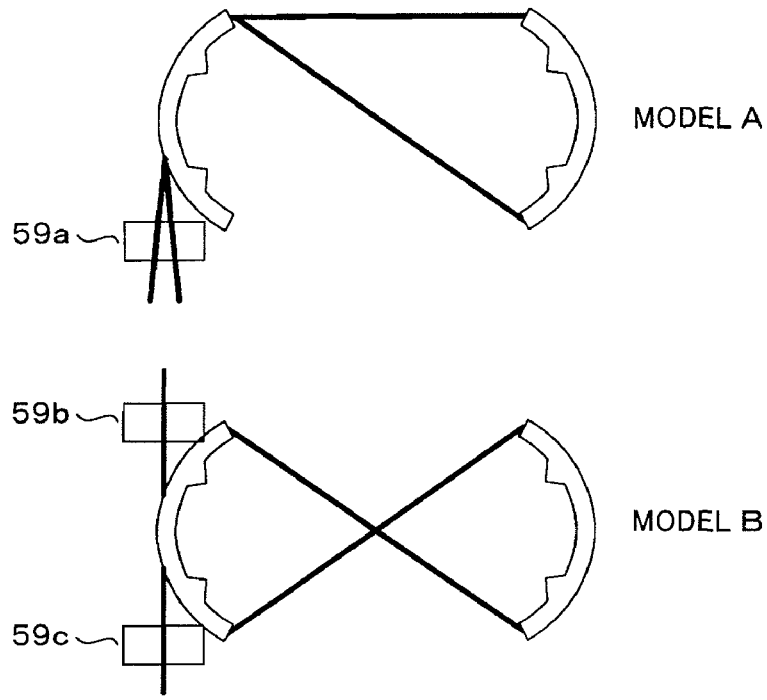
FIG. 31 is a diagram illustrating a process of analyzing the installed state of the optical fiber between the installed models.

In FIG. 31, a model A is a model placed at the uppermost position and a model B is a mode placed below the model A. The number of optical fibers running through an input and output section (area 59*a*) in the model A is assumed to be determined as two in the steps performed earlier.

Here, it is assumed that both the numbers of optical fibers running through a left upper input and output section (area 59*b*) and a left lower input and output section (area 59*c*) in the model B are one. In this case, since the number of optical fibers connecting the model A and the model B to each other is one, the other one optical fiber connected to the model A is connected to a model below the model B while bypassing the model B. Instead, if both the numbers of optical fibers running through the areas 59*b* and 59*c* of the model B are two, the optical fiber running through the model B are all connected to the model A. In this case, the optical fiber running through a model below the model B is not connected to the model A without running through the model B.

In this way, for each of the installed models in the rack, the installed states of the optical fiber between the installed models are analyzed in the order from top to bottom, for example, and thereby the installed state of the optical fiber in the entire rack is figured out. Here, in order to more accurately analyze the installed state of the optical fiber between the installed models, the number of optical fibers running through a predetermined area between models may be measured by image recognition. In addition, use of position marks may enable more accurate analysis for the installed state of the optical fiber between the installed models.

When the installed state of the optical fiber between the installed models is figured out as described above, the optical fiber between the installed models may be standardized. To be more specific, assuming that the optical fiber is laid linearly between installed models, the coordinates (X-Y coordinates) of a certain position on the optical fiber between the installed models may be obtained by using the distance from a position mark between the installed models. Even for an installed model in which no position mark is detected, the coordinates of a certain position on the optical fiber in the installed model may be obtained by using the distance from a position mark between the installed models.

Figure 32:
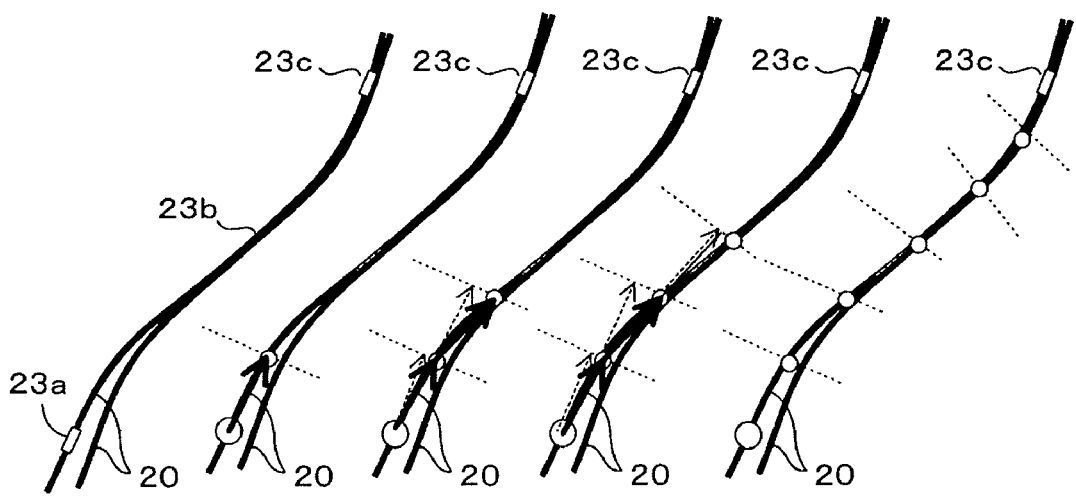
FIG. 32 is a diagram illustrating an example of a method for standardizing the optical fiber between the installed models.

Note that, if an error becomes too large with the replacement of the installed state of the optical fiber between the installed models with one straight line, the optical fiber between the installed models may be replaced with a group of straight lines. FIG. 32 is a diagram illustrating an example of the method of standardizing the optical fiber between the installed models. FIG. 32 illustrates a process of standardization proceeding from the left to the right.

For example, it is assumed that two optical fibers 20 are laid non-linearly between installed models, as illustrated in FIG. 32. Then, it is assumed that the target optical fiber 20 has three position marks 23*a* to 23*c* within an illustrated range, and that the position mark 23*b* among them is partially or entirely hidden by the other optical fiber 20.

In this case, with the position mark 23*a* set as a starting point, a vector with a fixed length is drawn from the starting point in its tangential direction, and an intersection point between the optical fiber 20 and a straight line orthogonal to the tip end of the vector is obtained. Then, a straight line is drawn to connect the starting point and the intersection point, and the optical fiber 20 is replaced with this straight line.

Next, with the intersection point set as a starting point, a vector with the fixed length is drawn from the starting point in its tangential direction, and an intersection point between the optical fiber 20 and a straight line orthogonal to the tip end of the vector is obtained. Then, a straight line is drawn to connect the starting point and the intersection point, and the optical fiber 20 is replaced with this straight line.

If the optical fiber 20 in the rack is standardized by using straight lines as described above, the coordinates (X-Y coordinates) of a certain position on the optical fiber laid in the rack may be calculated from the distance from the position mark (distance in the length direction of the optical fiber). Instead of the method illustrated in FIG. 30, the optical fiber in the installed model may be standardized as a group of a large number of straight lines by using the foregoing method. Although the description herein is provided for the models using installation tools in an arc shape, the installed state of an optical fiber within each installed model and between installed models may be analyzed in similar steps even with use of the optical fiber installation tools with the ring shape illustrated in FIGS. 8A and 8B.

In the meantime, for the optical fiber temperature measurement apparatus 13 (see FIG. 1), measurement points are determined to be located at intervals, determined depending on a sampling frequency, in the length direction of the optical fiber. The interval between the measurement points is in the order of 10 to 50 cm in consideration of a practical measurement time such as a time required to calculate an average in the optical fiber temperature measurement apparatus 13. In order to accurately measure the temperature at a predetermined position in the rack, it is important to arrange the measurement point at the predetermined position.

With use of the foregoing method, the installed state analyzing apparatus 52 may easily analyze which route and which place in the rack the optical fiber 20 drawn out of the cassette 10 is laid in. Thus, if the position of the inlet portion of the cassette 10 and the position as one of the measurement points are previously set to coincide with each other, for example, whether or not a measurement point is arranged at a desired position may be checked easily because the distance from the inlet portion of the cassette 10 to each position mark 23 is already known. Instead of setting the position of the inlet portion of the cassette 10 and the position of one of the measurement points to coincide with each other, the distance (offset amount) from the inlet portion of the cassette 10 to a neighboring measurement point may be obtained as data.

In addition, conditions for correcting measured temperatures (hereinafter, referred to as "prior information") may be inputted from the installed state analyzing apparatus 52 to the optical fiber temperature measurement apparatus 13 when the optical fiber temperature measurement apparatus 13 performs a temperature measurement (temperature distribution measurement) by using the installed state of the optical fiber analyzed by the installed state analyzing apparatus 52. For example, if an optical fiber is wound in the form of a small coil, the temperature at the coil-shaped portion may be regarded as a uniform temperature. In addition, if an optical fiber runs through the same position in a forward route and a return route, the temperatures at the position in the forward route and the return route may be regarded as the same temperature. Moreover, if an optical fiber is arranged at positions symmetric to each other, the temperature distribution may be regarded as being symmetric, in some cases. If such information is inputted as the prior information from the installed state analyzing apparatus 52 to the optical fiber temperature measurement apparatus 13, the optical fiber temperature measurement apparatus 13 may more accurately correct the measured temperatures by using the prior information. Here, the prior information is stored in advance in the data storage unit 62. The data of the installed state analyzed by the installed state analyzing apparatus 52 is outputted through the data output unit 64.

INSTALLATION EXAMPLE 1

Figure 33:
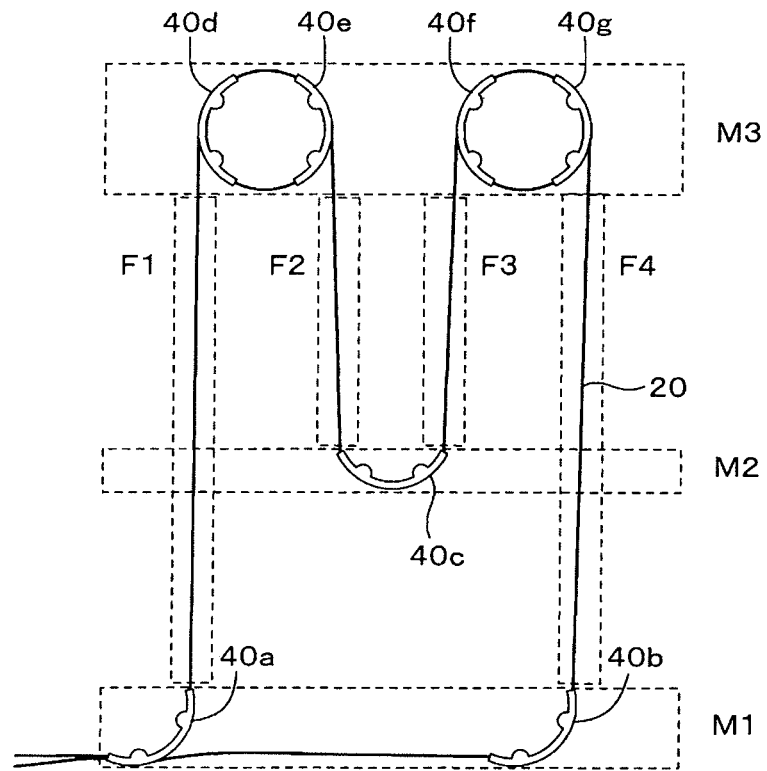
FIG. 33 is a schematic diagram illustrating Installation Example 1 of an optical fiber in a rack.

FIG. 33 is a schematic diagram illustrating Installation Example 1 of an optical fiber in a rack. The installation form illustrated in FIG. 33 is employed, for example, in the case of measuring a temperature distribution on an air inlet side of the rack. Note that the illustration of position marks provided to the optical fiber is omitted in FIG. 33.

In Installation Example 1, as illustrated in FIG. 33, three installed models M1, M2, and M3 starting at the bottom are used. The model M1 includes two optical fiber installation tools 40a and 40b for bending the laying direction of an optical fiber 20 on a forward route and a return route, respectively, at approximately 90° each. The model M2 includes an optical fiber installation tool 40c for bending the laying direction of the optical fiber 20 at approximately 180°. In addition, the model M3 includes two pairs of optical fiber installation tools (optical fiber installation tools 40d and 40e and optical fiber installation tools 40f and 40g) for helically winding the optical fiber 20.

The optical fiber 20 drawn out of the cassette (see FIGS. 1 and 2) runs through the optical fiber installation tool 40a disposed in the lower left portion of the rack, and is helically wound between the pair of optical fiber installation tools 40d and 40e disposed in the upper left portion of the rack. Then, the optical fiber 20 is laid from the optical fiber installation tool 40e, through the optical fiber installation tool 40c, to the pair of optical fiber installation tools 40f and 40g disposed in the upper right portion of the rack, and is helically wound between the optical fiber installation tools 40f and 40g. Thereafter, the optical fiber 20 is laid from the optical fiber installation tool 40g, through the optical fiber installation tool 40b disposed in the lower right portion of the rack, toward the optical fiber installation tool 40a, and is then led to the outside (free access floor) of the rack.

In Installation Example 1, in the model M3, since the optical fiber 20 is laid helically between the optical fiber installation tools 40d and 40e, and between the optical fiber installation tools 40f and 40g, the position marks are hardly detected. On the other hand, the position marks are easily detected in an area F1 between the optical fiber installation tools 40a and 40d, an area F2 between the optical fiber installation tools 40e and 40c, an area F3 between the optical fiber installation tools 40c and 40f, and an area F4 between the optical fiber installation tools 40g and 40b, because the number of optical fibers 20 running through each area is one.

When the installed state of the optical fiber in Installation Example 1 is analyzed (see FIGS. 13 and 15), an image of the optical fiber laid in the rack is first captured by using a camera 51, and the image is inputted to the installed state analyzing apparatus 52.

The installed state analyzing apparatus 52 performs image geometry correction conversion and normalization processing on the inputted image, and thereafter extracts the optical fiber installation tools 40a to 40g from the image after the normalization processing. Then, after determining the position and direction of each of the optical fiber installation tools 40a to 40g, the installed state analyzing apparatus 52 associates the optical fiber installation tools 40a to 40g with basic models. Here, three types of models, M1, M2, and M3 are assumed to be determined as described above.

Thereafter, the installed state analyzing apparatus 52 estimates the installed states of the optical fiber between the models M1, M2, and M3. In this example, the number of optical fibers running upward from the model M1 is 2, the number of optical fibers running upward from the model M2 is 2, and the number of optical fibers running downward from the model M3 is 4. Accordingly, it may be estimated that the two optical fibers running upward from the model M1 are directly connected to the model M3, and the two optical fibers running upward from the model M2 are also directly connected to the model M3. Moreover, the installed states of the optical fibers between the models M1, M2, and M3 may also be detected from the results of image recognition of the optical fiber installation tools 40a to 40g, the optical fiber 20, and the position marks (not illustrated).

Next, the installed state analyzing apparatus corrects and redefines the installed models. In Installation Example 1, the number of turns of the optical fiber 20 wound between each of the set of optical fiber installation tools 40d and 40e and the set of optical fiber installation tools 40f and 40g in the model M3 may need to be determined. Note however that, in the case of the model M3, the number of turns is not arbitrary, but there are 2 to 3 patterns of the number of turns at most, such as 1 turn or 7 turns, from the view point of easiness of signal processing. In addition, the number of turns for the optical fiber installation tools 40d and 40e on the left side and the number of turns for the optical fiber installation tools 40f and 40g on the right side of the model M3 are set to be equal. Accordingly, the number of turns of the optical fiber 20 wound between each of the set of the optical fiber installation tools 40d and 40e and the set of the optical fiber installation tools 40f and 40g may be determined from the position marks detected between the model M1 and the model M3 (areas F1 and F4) or between the model M3 and the model M2 (areas F2 and F3).

Thereafter, the installed state analyzing apparatus 52 standardizes the optical fiber 20 in each of the models M1, M2, and M3 and between each two of the models (areas F1, F2, F3, and F4). This may make it possible to calculate the coordinates (X-Y coordinates) of a certain position on the optical fiber 20 on the basis of a distance from the position mark or the cassette inlet portion.

Subsequently, the installed state analyzing apparatus 52 adds the prior information to these processing results, and outputs the resultant data as data for the optical fiber temperature measurement apparatus. In this way, the analysis and data output of the installed state of the optical fiber in the rack are completed.

INSTALLATION EXAMPLE 2

Figure 34:
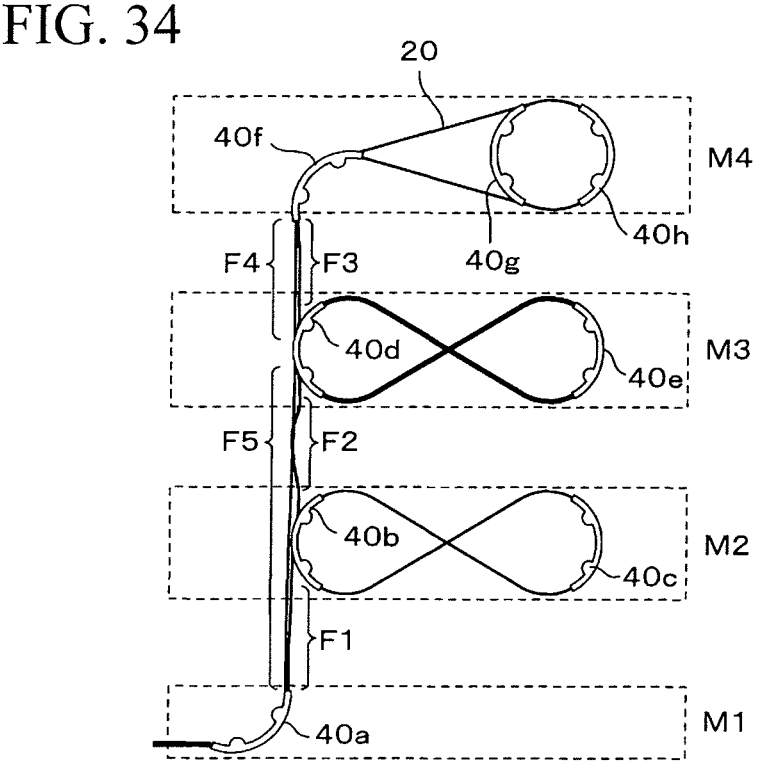
FIG. 34 is a schematic diagram illustrating Installation Example 2 of an optical fiber in a rack.

FIG. 34 is a schematic diagram illustrating Installation Example 2 of an optical fiber in a rack. The installation form illustrated in FIG. 34 is employed, for example, in the case of measuring a temperature distribution on an air outlet side of the rack. Note that the illustration of the position marks provided to the optical fiber is omitted in FIG. 34.

In Installation Example 2, as illustrated in FIG. 34, four installed models M1, M2, M3, and M4 starting at the bottom are used. The model M1 includes an optical fiber installation tool 40a for bending the laying direction of an optical fiber 20 at approximately 90°. In addition, the model M2 includes two optical fiber installation tools 40b and 40c spaced apart from each other in the horizontal direction and facing each other, and the optical fiber 20 is installed in the form of a figure eight between these optical fiber installation tools 40b and 40c. The model M3 also includes two optical fiber installation tools 40d and 40e spaced apart from each other in the horizontal direction and facing each other, and the optical fiber 20 is installed in the form of a figure eight between these optical fiber installation tools 40d and 40e. Note however that, in the model M2, the optical fiber 20 is installed in a single loop while, in the model M3, the optical fiber 20 is installed on each of the forward route and the return route between the optical fiber installation tools 40d and 40e. The model M4 includes an optical fiber installation tool 40f for changing the laying direction of the optical fiber 20 and optical fiber installation tools 40g and 40h for helically winding the optical fiber 20.

The optical fiber 20 drawn out of the cassette (see FIGS. 1 and 2) runs through the optical fiber installation tool 40a disposed in the lower left portion of the rack, and is laid in the form of a figure eight between the optical fiber installation tools 40b and 40c in the model M2. Thereafter, the optical fiber 20 led out of the model M2 is laid in the form of a figure eight between the optical fiber installation tools 40d and 40e in the model M3, and then is led into the model M4. Then, the optical fiber 20 runs through the optical fiber installation tool 40f, is helically wound between the optical fiber installation tools 40g and 40h, runs again through the optical fiber installation tool 40f to be led into the model M3, and is laid in the form of a figure eight between the optical fiber installation tools 40d and 40e. After that, the optical fiber 20 led out of the model M3 runs through the optical fiber installation tool 40a in the model M1 and is led to the outside (free access floor) of the rack.

When the installed state of the optical fiber in Installation Example 2 is analyzed (see FIGS. 13 and 15), an image of the optical fiber laid in the rack is first captured by using the camera 51, and the image is inputted to the installed state analyzing apparatus 52.

The installed state analyzing apparatus 52 performs image geometry correction conversion and normalization processing on the inputted image, and thereafter extracts the optical fiber installation tools 40a to 40h from the image after the normalization processing. Then, after determining the position and direction of each of the optical fiber installation tools 40a to 40h, the installed state analyzing apparatus 52 associates the optical fiber installation tools 40a to 40h with basic models. Here, four types of models, M1, M2, M3, and M4 are assumed to be determined as described above.

Thereafter, the installed state analyzing apparatus 52 estimates the installed states between the models M1, M2, M3, and M4. In this example, the number of optical fibers in each of the input and output sections at two positions in the model M1 is 1, the number of optical fibers in each of the input and output sections at two positions in the model M2 is 1, and the number of optical fibers in each of the input and output sections at two positions in the model M3 is two. Moreover, the number of optical fibers in the input and output section in the model M4 disposed at the highest level is two. The installed state analyzing apparatus 52 detects the number of optical fibers in each input and output section in each model through image recognition processing, and detects the installed states of the optical fiber between the models on the basis of a result of the detection.

Here, as illustrated in FIG. 34, the area on the forward route from the model M1 to the model M2, the area on the forward route from the model M2 to the model M3, and the area on the forward route from the model M3 to the model M4 are represented by F1, F2, and F3, respectively. In addition, the area on the return route from the model M4 to the model M3 and the area on the return route from the model M3 to the model M1 are represented by F4 and F5, respectively.

Next, the installed state analyzing apparatus 52 corrects and redefines the installed models. In Installation Example 2 as well, the number of turns of the optical fiber 20 wound between the optical fiber installation tools 40g and 40f in the model M4 may need to be determined. The installed state analyzing apparatus 52 may determine the number of turns of the optical fiber 20 wound between the optical fiber installation tools 40g and 40f on the basis of the position marks (not illustrated) provided to the optical fiber 20.

Thereafter, the installed state analyzing apparatus 52 standardizes the optical fiber 20 in each of the models M1, M2, M3, and M4 and between the models (areas F1, F2, F3, F4, and F5). This may make it possible to calculate the coordinates of a certain position on the optical fiber 20 on the basis of a distance from the position mark or the cassette inlet portion.

Subsequently, the installed state analyzing apparatus 52 adds identifier information of the cassette 10 and the prior information to these processing results, and outputs the resultant data as data for the optical fiber temperature measurement apparatus. Here, the data for the optical fiber temperature measurement apparatus is assumed to include: a position definition file containing the position (coordinates) of a measurement point set along the length direction of the optical fiber; and a signal processing file containing the prior information.

Figure 35:
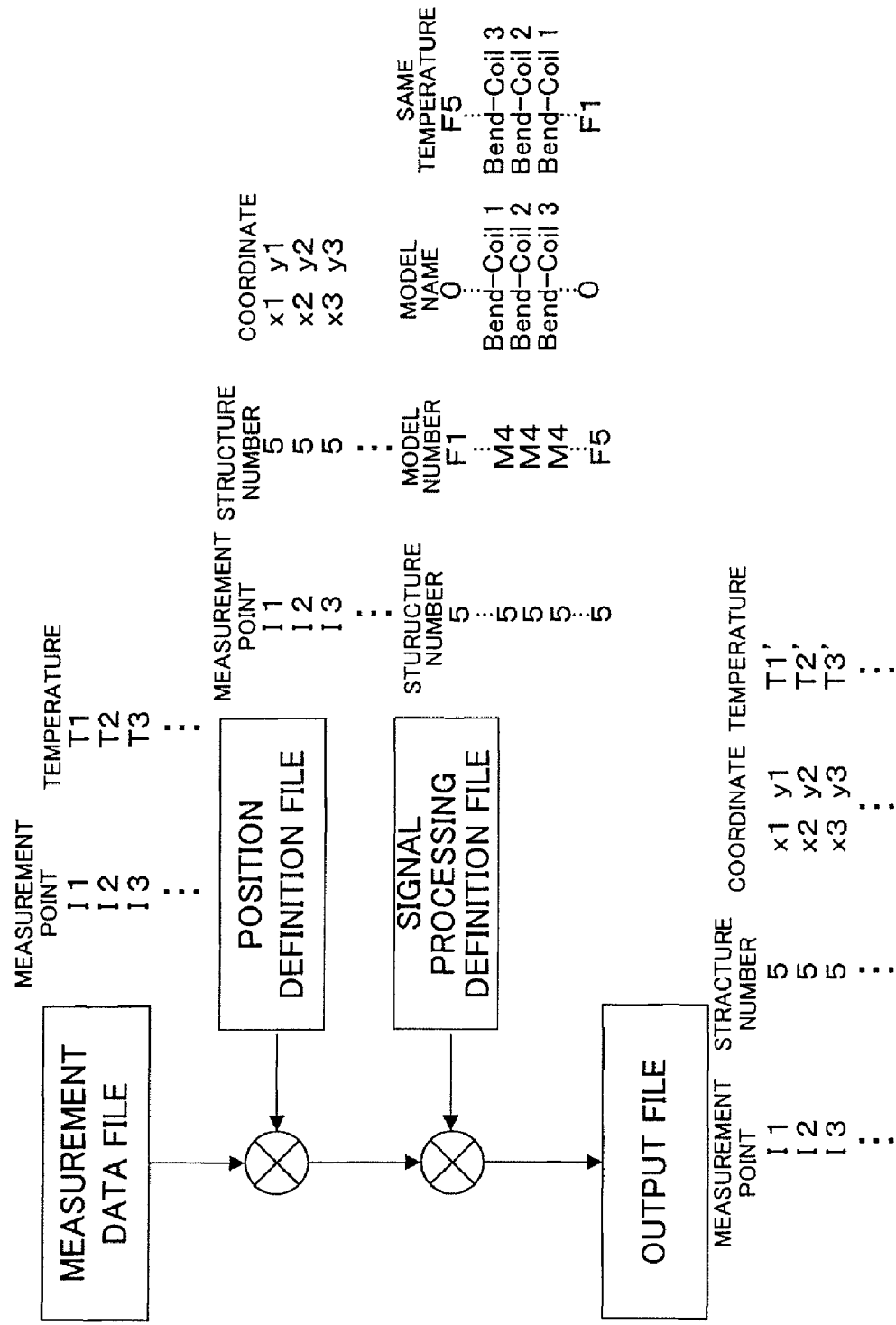
FIG. 35 is a diagram illustrating an example of a method of correcting a temperature detected by an optical fiber temperature measurement apparatus.

FIG. 35 is a diagram illustrating an example of a method of correcting a temperature detected by the optical fiber temperature measurement apparatus. In FIG. 35, a measurement data file is data of a temperature detected by the optical fiber temperature measurement apparatus (temperature data before correction). Moreover, a position definition file and a signal processing definition file are included in the data for the optical fiber temperature measurement apparatus acquired from the installed state analyzing apparatus 52. Further, an output file is a file obtained by correcting temperature data of a temperature data file by using the position definition file and the signal processing definition file.

The optical fiber temperature measurement apparatus may obtain a temperature at each measurement point as illustrated as measurement data in FIG. 35, for example. The optical fiber temperature measurement apparatus associates each measurement point with a structure number and X-Y coordinates by using the position definition file for the temperature at each measurement point. Note that the structure number corresponds to the identifier of the cassette, and the structure number indicates of which rack the measurement point is.

Next, the optical fiber temperature measurement apparatus associates each measurement point with a basic model by using the signal processing definition file. Then, models (or areas) having the same temperature are defined from the prior information. For example, the signal processing definition file in FIG. 35 indicates that a model F1 (the area F1 in FIG. 34) has the same temperature as that of a model F5 (the model F5 in FIG. 34). In addition, it indicates that the temperature of Bend-Coil 1 of the model M4 (from the optical fiber installation tool 40f to the optical fiber installation tools 40g and 40h in FIG. 34) has the same temperature as that of Bend-Coil 3 (from the optical fiber installation tools 40g and 40h to the optical fiber installation tool 40f in FIG. 34). Further, it indicates that Bend-Coil 2 of the model 4 (a portion wound between the optical fiber installation tools 40g and 40h in FIG. 34) has the same temperature.

The optical fiber temperature measurement apparatus corrects the measured temperature at each measurement point by using this information as illustrated as an output file in FIG. 35, and further associates each measurement point with the structure number (rack number) and the X-Y coordinates.

As described above, according to the present embodiment, the installed state in a rack may be easily analyzed by capturing an image of an optical fiber installed in the rack by using a camera and then inputting the image to the installed state analyzing apparatus. This makes it easy to investigate whether or not a measurement point is disposed at a position at which a temperature may need to be measured, and makes it easy to handle modification of a facility.

Moreover, according to the present embodiment, since the prior information is added to data outputted from the installed state analyzing apparatus, the optical fiber temperature measurement apparatus may more accurately correct a temperature distribution in the rack by using the prior information.

INSTALLATION EXAMPLE 3

Figure 36:
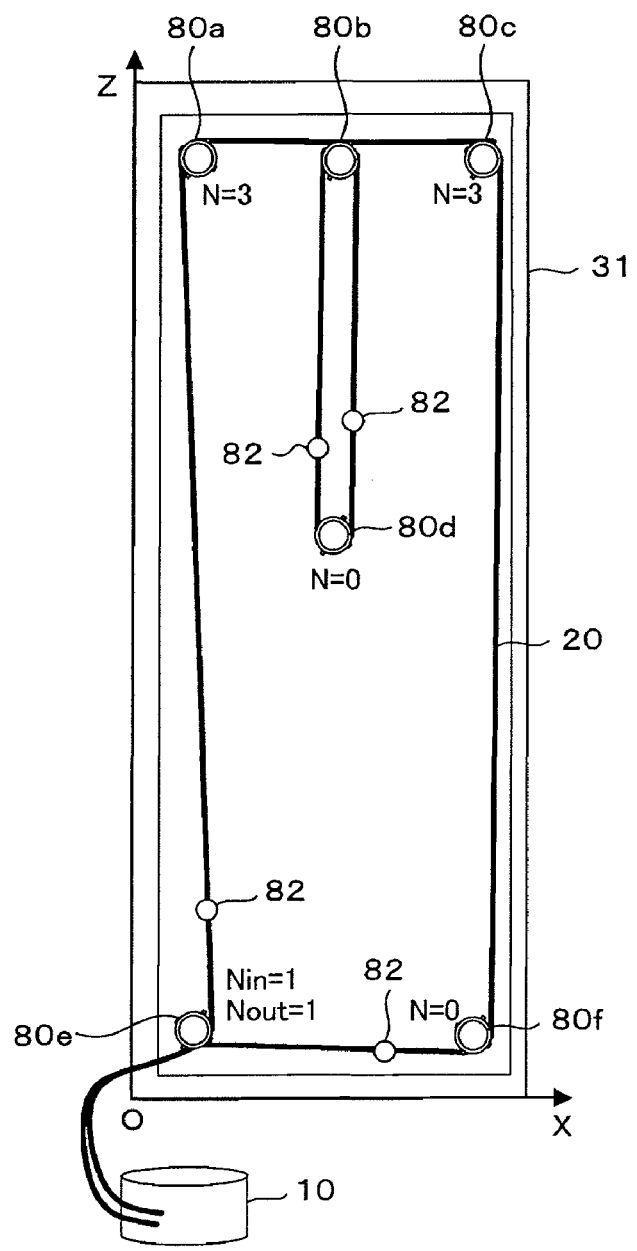
FIG. 36 is a schematic diagram illustrating Installation Example 3 of an optical fiber in a rack.
Figure 37:
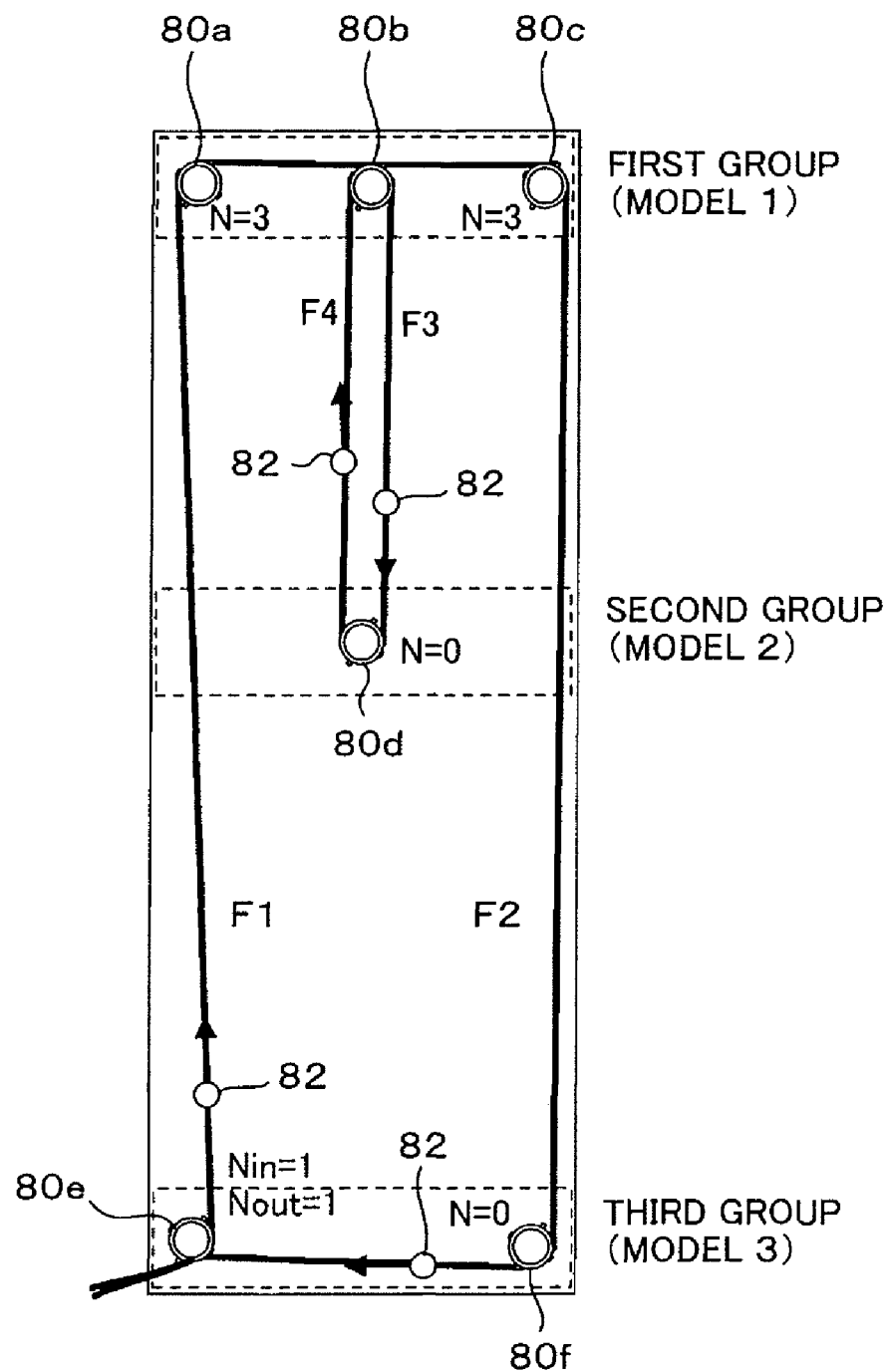
FIG. 37 is a schematic diagram illustrating the grouping of optical fiber installation tools in Installation Example 3.

FIG. 36 is a schematic diagram illustrating

Installation Example 3 of the optical fiber in the rack. In Installation Example 3 as well, the illustration of the position marks provided to the optical fiber is omitted. Here, a width direction and a height direction of the rack are referred to as an X-axis direction and a Z-axis direction, respectively, for the sake of convenience in description.

In this example, description will be given of a method of acquiring X-Y coordinates of a point having a known distance (optical fiber length) from a predetermined position on the optical fiber (for example, the position of an optical connector or the position of the cassette inlet portion: hereinafter referred to as a reference point) in the length direction of the optical fiber.

In Installation Example 3, the optical fiber 20 drawn out of the cassette 10 is laid on a door on the air inlet side of the rack 31 by using optical fiber installation tools with the ring shape (see FIG. 8 to FIG. 12) 80a to 80f, as illustrated in FIG. 36. Here, the optical fiber 20 drawn out of the cassette 10 is laid to run through the optical fiber installation tool 80e on the left side of the lower side of the door, the optical fiber installation tool 80a on the left side of the upper side of the door, the optical fiber installation tool 80b at the center of the upper side of the door, the optical fiber installation tool 80d at the center of the middle side of the door, the optical fiber installation tool 80b at the center of the upper side of the door, the optical fiber installation tool 80c on the right side of the upper side of the door, the optical fiber installation tool 80f on the right side of the lower side of the door, and the optical fiber installation tool 80e on the left side of the lower side of the door, in this order, and then return to the cassette 10. Note that the order in installation may be sometimes opposite to the above-described order, depending on how the optical fiber 20 is laid.

In addition, the optical fiber 20 is wound around the optical fiber installation tool 80e one time on each of the forward route and the return route, and the optical fiber 20 is wound around each of the optical fiber installation tools 80a and 80b three times. Moreover, the optical fiber 20 is in contact with each of the optical fiber installation tools 80b, 80d, and 80f, in a portion thereof necessary for changing the laying direction. In other words, the number of turns of the optical fiber 20 on each of the optical fiber installation tools 80b, 80d, and 80f is less than one. In FIG. 36, N represents the number of turns of the optical fiber on each of the optical fiber installation tools 80a to 80f (note however that the number is rounded down).

When the installed state of the optical fiber in Installation Example 3 is analyzed (see FIGS. 13 and 15), an image of the optical fiber 20 laid in the rack 31, the position marks (color codes: see FIG. 3) 82, and the optical fiber installation tools 80a to 80f is first captured by using the camera 51, and the image is inputted to the installed state analyzing apparatus 52.

The installed state analyzing apparatus 52 performs image geometry correction conversion and normalization processing on the inputted image, and thereafter extracts the optical fiber 20, the optical fiber installation tools 80a to 80f, and the position marks 82 from the image after the normalization processing. Then, after determining the position (X-Z coordinates) of each of the optical fiber installation tools 80a to 80f and the position marks 82, the installed state analyzing apparatus 52 cuts out an image in parallel to the X axis as illustrated in FIG. 20, and associates the optical fiber installation tools 80a to 80f with basic models.

Here, the three optical fiber installation tools 80a, 80b, and 80c arranged side by side in the X-axis direction in the upper side of the door are grouped into a first group, the optical fiber installation tool 80d in the middle of the door is grouped into a second group, and the two optical fiber installation tools 80e and 80f arranged side by side in the X-axis direction in the lower side of the door are grouped into a third group. Note that, in the following description, an area between the optical fiber installation tools 80a and 80e is represented by F1, an area between the optical fiber installation tools 80c and 80f is represented by F2, and an area on the forward route and an area on the return route between the optical fiber installation tools 80b and 80d are represented by F3 and F4, respectively.

After grouping the optical fiber installation tools 80a to 80f as described above, the installed state analyzing apparatus 52 determines the installed model and the installed state of the optical fiber in each group.

Figures 38A, 38B:
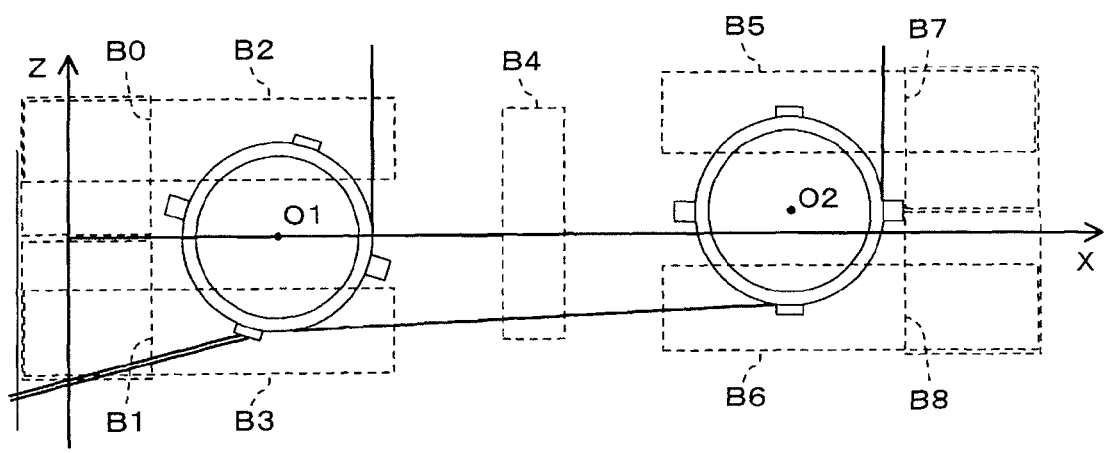
FIGS. 38A and 38B are schematic diagrams illustrating a method of determining a model and an installed state of a third group in Installation Example 3.

FIGS. 38A and 38B are schematic diagrams illustrating a method of determining the installed model and the installed state of the third group. The installed state analyzing apparatus 52 sets areas B0 to B8 around the detected optical fiber installation tools 80e and 80f as illustrated in FIG. 38A, and analyzes the number of optical fibers running through each of the areas B0 to B8, by image processing, with a buffer (counter) provided corresponding to each of the areas B0 to B8. Here, the number of optical fibers running through each of the areas B0 to B8 is assumed to be measured with respect to each of the horizontal direction (less than 45°) and the vertical direction (not less than 45°) separately. Here, it is assumed that the number of optical fibers running through each of the areas B0 to B8 is detected as illustrated in FIG. 38B, and that the installed model and the installed state of the optical fibers of the third group are determined in accordance with the result of the detection. Hereinbelow, the model of the third group is referred to as a model 3.

Figures 39A, 39B:
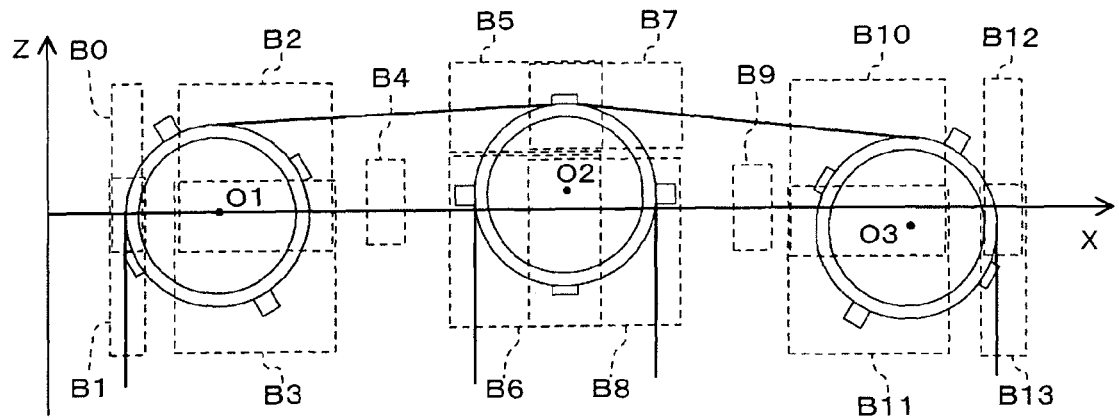
FIGS. 39A and 39B are schematic diagrams illustrating a method of determining a model and an installed state of a first group in Installation Example 3.

FIGS. 39A and 39B are schematic diagrams illustrating a method of determining the installed model and the installed state of the first group. The installed state analyzing apparatus 52 sets areas B0 to B13 around the detected optical fiber installation tools 80a, 80b, and 80c as illustrated in FIG. 39A, and analyzes the number of optical fibers running through each of the areas B0 to B13, by image processing, with a buffer (counter) provided corresponding to each of the areas B0 to B13. Here, it is assumed that the number of optical fibers running through each of the areas B0 to B13 is detected as illustrated in FIG. 39B, and the installed model and the installed state of the optical fibers of the first group are determined in accordance with the result of the detection. Hereinbelow, the model of the first group is referred to as a model 1.

Figures 40A, 40B:
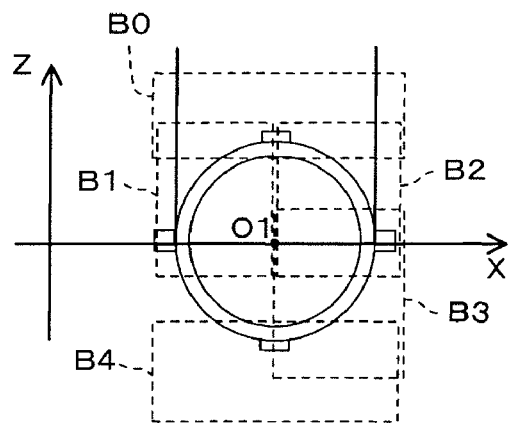
FIGS. 40A and 40B are schematic diagrams illustrating a method of determining a model and an installed state of a second group in Installation Example 3.

FIGS. 40A and 40B are schematic diagrams illustrating a method of determining the installed model and the installed state of the second group. The installed state analyzing apparatus 52 sets areas B0 to B4 around the detected optical fiber installation tool 80d as illustrated in FIG. 40A, and analyzes the number of optical fibers running through each of the areas B0 to B4, by image processing, with a buffer (counter) provided corresponding to each of the areas B0 to B4. Here, it is assumed that the number of optical fibers running through each of the areas B0 to B4 is detected as illustrated in FIG. 40B, and the installed model and the installed state of the optical fibers of the second group are determined in accordance with the result of the detection. Hereinbelow, the model of the second group is referred to as a model 2.

Once the model of each group is determined, the number of turns of the optical fiber on each of the optical fiber installation tools is found because the number of turns of the optical fiber on each optical fiber installation tool has been defined in each model. If two or more kinds of the number of turns are defined, the number of turns N on each of the optical fiber installation tools is determined by analyzing the position marks within the model and between the models.

After the installed model and the installed state of the optical fiber of each group are determined as described above, the installed state analyzing apparatus 52 performs algebra calculation enabling processing.

Figure 41:
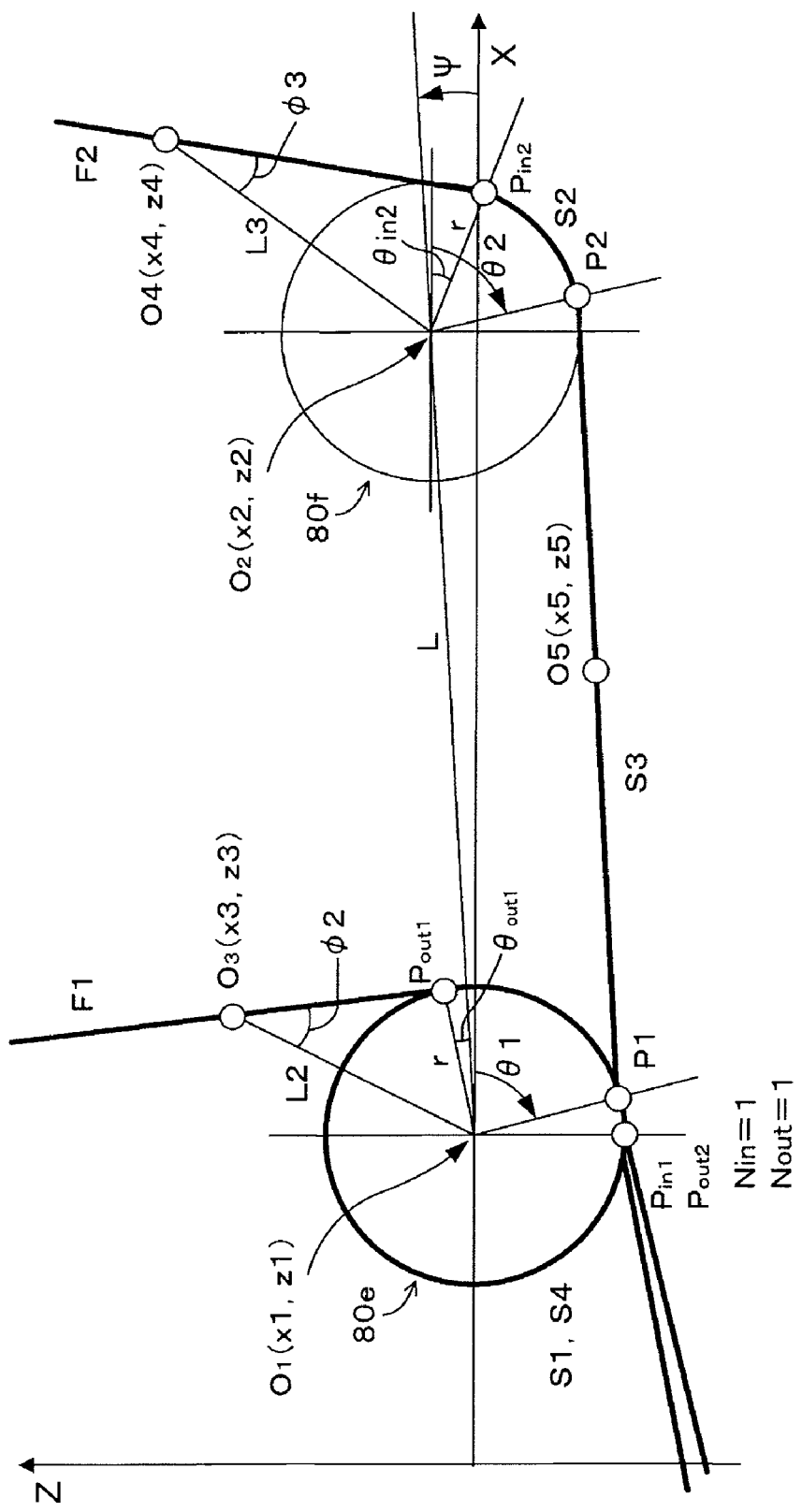
FIG. 41 is a schematic diagram illustrating algebra calculation enabling processing on a model 3 in Installation Example 3.

FIG. 41 is a schematic diagram illustrating the algebra calculation enabling processing on the model 3. In FIG. 41, the coordinates of the center point O1 of the optical fiber installation tool 80e are represented by (x1, z1), and the coordinates of the center point O2 of the optical fiber installation tool 80f are represented by (x2, z2). In addition, points O3 to O5 represent the positions of the position marks (color codes) provided to the optical fiber, respectively. The coordinates of the point O3 are (x3, z3), the coordinates of the point O4 are (x4, z4), and the coordinates of the point O5 are (x5, z5). The coordinates of these points O1 to O5 are assumed to have been known from a result of image processing. In addition, the radii of all the optical fiber installation tools 80a to 80f are assumed to be r (known).

Here, contact points between the optical fiber installation tool 80e and the optical fibers on the rack inlet side and the rack outlet side are represented by Pin1 and Pout2, respectively, and a contact point between the optical fiber installation tool 80e and the optical fiber in the area F1 is represented by Pout1. In addition, a contact point between the optical fiber installation tool 80f and the optical fiber in the area F2 is represented by Pin2, a contact point between the optical fiber between the optical fiber installation tools 80e and 80f and the optical fiber installation tool 80e is represented by P1, and a contact point between the optical fiber between the optical fiber installation tools 80e and 80f and the optical fiber installation tool 80f is represented by P2.

Further, the length of a straight line connecting the center points O1 and O2 of the respective optical fiber installation tools 80e and 80f is represented by L, and the angle made by the straight line with the X axis is represented by Ψ. Furthermore, the angle made by a straight line connecting the center point O1 of the optical fiber installation tool 80e and the point P1 with the X axis is represented by θ1, and the angle made by a straight line connecting the center point O2 of the optical fiber installation tool 80f and the point P2 with the X axis is represented by θ2.

Note that it is assumed that an angle becomes plus in the counterclockwise (CCW) direction and becomes minus in the clockwise (CW) direction. In addition, of the optical fiber on the inlet side, a portion wound around the optical fiber installation tool 80e is referred to as an area S1, a portion wound around the optical fiber installation tool 80f is referred to as an area S2, and a portion between the optical fiber installation tool 80f and the optical fiber installation tool 80e is referred to as an area S3 while, of the optical fiber on the outlet side, a portion wound around the optical fiber installation tool 80e is referred to as an area S4.

In the model 3, the X-Z coordinates (Pin1x, Pin1z) of the point Pin1 is assumed to be expressed by the following formulas. Note that the subscripts x and z in Pin1x and Pin1z indicate the x coordinate and the z coordinate of Pin1, respectively. Hereinafter, in the same manner, the subscript x and the subscript z following each point indicate the x coordinate and the z coordinate of the point, respectively:

$Pin1x = x1$, and $Pin1z = z1 - r$.

On the other hand, the length L of the straight line connecting the center points O1 and O2 of the respective optical fiber installation tools 80e and 80f and the angle Ψ are obtained by the following formulas. Note that, in the following description, sqrt represents a square root symbol (√):

$L = \mathrm{sqrt}((x2-x1)^2 + (z2-z1)^2)$, and $\Psi = \arctan((z2-z1)/(x2-x1))$.

In addition, the angles θ1 and θ2 are expressed by the following formula:

$\theta1 = \theta2 = \Psi - 0.5\pi \leq 0$.

Moreover, the coordinates (P1x, P1z, P2x, P2z) of the points P1 and P2 are expressed by the following formulas:

$P1x = x1 + r\cos(\theta1)$, $P1z = z1 + r\sin(\theta1)$, $P2x = x2 + r\cos(\theta2)$, and $P2z = z2 + r\sin(\theta2)$.

Further, since the coordinates of the center point O1 of the optical fiber installation tool 80e and the point O3 are known, the length L2 of the straight line connecting the center point O1 of the optical fiber installation tool 80e and the point O3 is obtained by the following formula:

$L2 = \mathrm{sqrt}((x3-x1)^2 + (z3-z1)^2)$.

Here, when the angle made by the straight line connecting the center point O1 of the optical fiber installation tool 80e and the point O3 with the straight line connecting the point O3 and the point Pout1 is represented by φ2 and the angle made by the straight line connecting the center point O1 of the optical fiber installation tool 80e and the point Pout1 with the X axis is represented by θout1, the following formulas are obtained:

$\phi2 = \arcsin(r/L2)$, and $L2 \cos(0.5\cdot\pi - \phi2 + \theta out1) = x3 - x1$.

Accordingly, the angle θout1 is obtained by the following formula:

$\theta out1 = \arccos((x3-x1)/L2) + \phi2 - 0.5\cdot\pi$.

The X-Z coordinates (Pout1x, Pout1z) of the point Pout1 are obtained using the angle θout1 by the following formulas:

$Pout1x = x1 + r\cos(\theta out1)$, and $Pout1z = z1 + r\sin(\theta out1)$.

In the same manner as above, when the length of a straight line connecting the center point O2 of the optical fiber installation tool 80f and the point O4 is represented by L3, the following formula is obtained:

$L3 = \mathrm{sqrt}((x4-x2)^2 + (z4-z2)^2)$.

Here, when the angle made by the straight line connecting the center point O2 of the optical fiber installation tool 80f and the point O4 with a straight line connecting the point O4 and the point Pin2 is represented by φ3 and the angle made by a straight line connecting the center point O2 of the optical fiber installation tool 80f and the point Pin2 with the X axis is represented by θin2, the following formulas are obtained:

$\phi3 = \arcsin(r/L3)$, and $L3 \cos(0.5\cdot\pi - \phi3 + \theta in2) = x4 - x2$.

Accordingly, the angle θin2 is obtained by the following formula:

$\theta in2 = \arccos((x4-x2)/L3) + \phi3 - 0.5\cdot\pi$.

The X-Z coordinates (Pin2x, Pin2z) of the point Pin2 are obtained using the angle θin2 by the following formulas:

$Pin2x = x2 + r\cos(\theta in2)$, and $Pin2z = z2 + r\sin(\theta in2)$.

Here, depending on how the optical fiber is laid, there are a case where the position mark at the position of the point O3 faces upward and the position mark at the position of the point O4 faces downward and a case where the position mark at the position of the point O3 faces downward and the position mark at the position of the point O4 faces upward.

The mapping of the areas S1 to S4 (mapping the optical fiber length and the X-Z coordinates) is as described below in the case where the position mark at the position of the point O3 faces upward and the position mark at the position of the point O4 faces downward. Note that, in the following description, SOx and XXs each represent an optical fiber length from the reference point to the corresponding point (Ox or XX). For example, SO3 represents an optical fiber length from the reference point to the point O3, and Pout1s represents an optical fiber length from the reference point to the point Pout1.

Since the optical fiber length SO3 from the reference point to the point O3, the X-Z coordinates (x3, z3) of the point O3, and the X-Z coordinates (Pout1x, Pout1z) of the point Pout1 are known, the optical fiber length Pout1s from the reference point to the point Pout1 is obtained by the following formula:

$Pout1s = SO3 - \mathrm{sqrt}((x3-Pout1x)^2 + (z3-Pout1z)^2)$.

In addition, since the optical fiber on the inlet side is wound around the optical fiber installation tool 80e one time, the optical fiber length Pin1s from the reference point to the point Pin1 is obtained by the following formula:

$Pin1s = Pout1s - r\times1\times2\times\pi - r\cdot(\theta out1 + 0.5\cdot\pi)$.

In the same manner as above, since the optical fiber length SO4 from the reference point to the point O4, the X-Z coordinates (x4, z4) of the point O4 and the X-Z coordinates (Pin2x, Pin2z) of the point Pin2 are known, the optical fiber length Pin2s from the reference point to the point Pin2 is obtained by the following formula:

$Pin2s = SO4 + \mathrm{sqrt}((x4-Pin2x)^2 + (z4-Pin2z)^2)$.

Moreover, the optical fiber lengths P2s, P1s, and Pout2s from the reference point to the points P2, P1, and Pout2 are obtained by the following formulas:

$$P2s = Pin2s + r \cdot (-\theta2 + \theta in2)$$
$$= SO5 - sqrt((x5 - P2x)^2 + (z5 - P2z)^2),$$
$$P1s = P2s + L$$
$$= SO5 + sqrt((P1x - x5)^2 + (P1z - z5)^2),$$

and $$Pout2s = P1s + r \times 1 \times 2 \times \pi\Pi + r \cdot (0.5 \cdot \pi + \theta1).$$

From those described above, the X-Z coordinates (x, z) of a certain point on the optical fiber are obtained by the following formulas, when the optical fiber length from the reference point to the point is represented by s and the point is assumed to be within the area S1:

$$x = x1 + r \cdot \cos(-0.5 \cdot \pi + (s - Pin1s)/r), \text{ and}$$

$$z = z1 + r \cdot \sin(-0.5 \cdot \pi + (s - Pin1s)/r).$$

Moreover, when the point is assumed to be within the area S2, the X-Z coordinates (x, z) of the point are obtained by the following formulas:

$$x = x2 + r \cdot \cos(-(s - Pin2s)/r + \theta in2), \text{ and}$$

$$z = z2 + r \cdot \sin(-(s - Pin2s)/r + \theta in2).$$

Further, when the point is assumed to be within the area S3, the X-Z coordinates (x, z) of the point are obtained by the following formulas:

$$x = P2x - (s - P2s) \cdot \sin(-\theta2), \text{ and}$$

$$z = P2z - (s - P2s)/\cos(-\theta2).$$

Furthermore, when the point is assumed to be within the area S4, the X-Z coordinates (x, z) of the point are obtained by the following formulas:

$$x = x1 + r \cdot \cos(-(s - P1s)/r + \theta2), \text{ and}$$

$$z = z1 + r \cdot \sin(-(s - P1s)/r + \theta2).$$

On the other hand, the mapping of the areas S1 to S4 is as described below in the case where the position mark at the position of the point O3 faces downward and the position mark at the position of the point O4 faces upward. Specifically, the optical fiber length Pout1s from the reference point to the point Pout1 is obtained by the following formula:

$$Pout1s = SO3 + sqrt((x3 - Pout1x)^2 + (z3 - Pout1z)^2).$$

In addition, since the optical fiber on the inlet side is wound around the optical fiber installation tool 80e one time, the optical fiber length Pin1s from the reference point to the point Pin1 is obtained by the following formula:

$$Pin1s = Pout1s + r \times 1 \times 2 \times \pi + r \cdot (\theta out1 + 0.5 \cdot \pi).$$

In the same manner as above, since the optical fiber length SO4 from the reference point to the point O4, the X-Z coordinates (x4, z4) of the point O4, and the X-Z coordinates (Pin2x, Pin2z) of the point Pin2 are known, the optical fiber length Pin2s from the reference point to the point Pin2 is obtained by the following formula:

$$Pin2s = SO4 - sqrt((x4 - Pin2x)^2 + (z4 - Pin2z)^2).$$

Moreover, the optical fiber lengths P2s, P1s, and Pout2s from the reference point to the points P2, P1, and Pout2 are obtained by the following formulas:

$$P2s = Pin2s - r \cdot (-\theta2 + \theta in2)$$
$$= SO5 + sqrt((x5 - P2x)^2 + (z5 - P2z)^2),$$
$$P1s = P2s - L$$
$$= SO5 - sqrt((P1x - x5)^2 + (P1z - z5)^2),$$

and $$Pout2s = P1s - r \times 1 \times 2 \times \pi - r \cdot (0.5 \cdot \pi + \theta1).$$

From those described above, the X-Z coordinates (x, z) of a certain point on the optical fiber are obtained by the following formulas, when the optical fiber length from the reference point to the point is represented by s and the point is assumed to be within the area S1:

$$x = x1 + r \cdot \cos(\theta out1 - (s - Pout1s)/r), \text{ and}$$

$$z = z1 + r \cdot \sin(\theta out1 - (s - Pout1s)/r).$$

In addition, when the point is assumed to be within the area S2, the X-Z coordinates (x, z) of the point are obtained by the following formulas:

$$x = x2 + r \cdot \cos((s - P2s)/r + \theta2), \text{ and}$$

$$z = z2 + r \cdot \sin((s - P2s)/r + \theta2).$$

Further, when the point is assumed to be within the area S3, the X-Z coordinates (x, z) of the point is obtained by the following formulas:

$$x = P1x + (s - P1s) \cdot \sin(-\theta2), \text{ and}$$

$$z = P1z + (s - P1s) \cdot \cos(-\theta2).$$

Furthermore, when the point is assumed to be within the area S4, the X-Z coordinates (x, z) of the point are obtained by the following formulas:

$$x = x1 + r \cdot \cos((s - Pout2s)/r - 0.5 \cdot \pi), \text{ and}$$

$$z = z1 + r \cdot \sin((s - Pout2s)/r - 0.5 \cdot \pi).$$

In this way, the algebra calculation enabling processing for the model 3 is completed.

Figure 42:
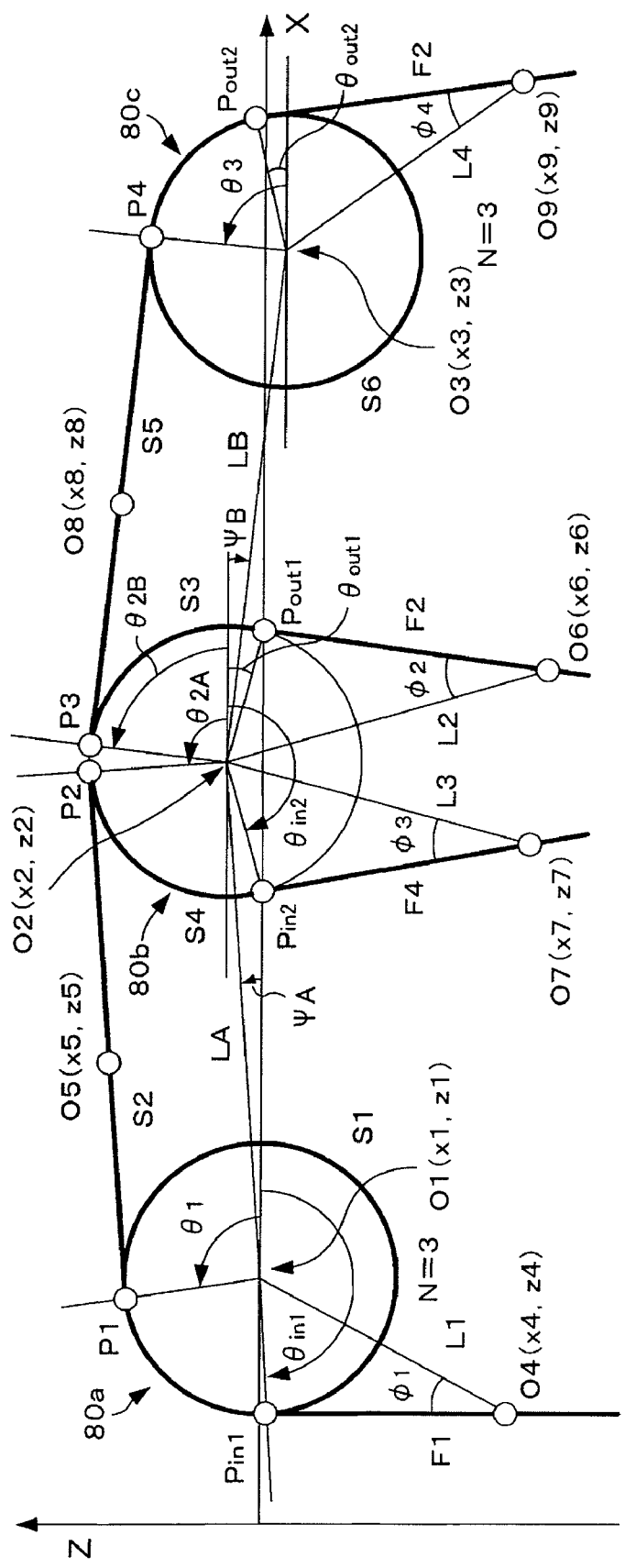
FIG. 42 is a schematic diagram illustrating algebra calculation enabling processing for a model 1 in Installation Example 3.

FIG. 42 is a schematic diagram illustrating algebra calculation enabling processing for the model 1. In FIG. 42, the coordinates of the center point O1 of the optical fiber installation tool 80a are represented by (x1, z1), the coordinates of the center point O2 of the optical fiber installation tool 80b are represented by (x2, z2), and the coordinates of the center point O3 of the optical fiber installation tool 80c are represented by (x3, z3). In addition, points O4 to O9 represent the positions of the position marks (color codes) provided to the optical fiber, respectively. The coordinates of the point O4 are (x4, z4), the coordinates of the point O5 are (x5, z5), the coordinates of the point O6 are (x6, z6), the coordinates of the point O7 are (x7, z7), the coordinates of the point O8 are (x8, z8), and the coordinates of the point O9 are (x9, z9). The coordinates of these points O1 to O9 are assumed to have been known from a result of image processing.

Meanwhile, a contact point between the optical fiber between the optical fiber installation tools 80a and 80b and the optical fiber installation tool 80a is represented by P1, a contact point between the optical fiber between the optical fiber installation tools 80a and 80b and the optical fiber installation tool 80b is represented by P2, a contact point between the optical fiber between the optical fiber installation tools 80b and 80c and the optical fiber installation tools 80b is represented by P3, and a contact point between the optical fiber between the optical fiber installation tools 80b and 80c and the optical fiber installation tool 80c is represented by P4.

In addition, a contact point between the optical fiber installation tool 80a and the optical fiber in the area F1 is represented by Pin1, a contact point between the optical fiber running from the optical fiber installation tool 80b to the optical fiber installation unit 80d (the optical fiber in the area F3) and the optical fiber installation tool 80b is represented by Pout1, a contact point between the optical fiber running from the optical fiber installation tool 80d to the optical fiber installation tool 80b (the optical fiber in the area F4) and the optical fiber installation tool 80b is represented by Pin2, and a contact point between the optical fiber installation tool 80c and the optical fiber in the area F2 is represented by Pout2.

Further, the angle made by a straight line connecting the center point O1 of the optical fiber installation tool 80a and the center point O2 of the optical fiber installation tool 80b with the X axis is represented by ΨA, and the angle made by a straight line connecting the center point O2 of the optical fiber installation tool 80b and the center point O3 of the optical fiber installation tool 80c with the X axis is represented by ΨB.

Furthermore, the angle made by a straight line connecting the center point O1 of the optical fiber installation tool 80a and the point P1 with the X axis is represented by θ1, the angle made by a straight line connecting the center point O1 of the optical fiber installation tool 80a and the point Pin1 with the X axis is represented by θin1, and the angle made by a straight line connecting the center point O2 of the optical fiber installation tool 80b and the point P2 with the X axis is represented by θ2A, the angle made by a straight line connecting the center point O2 of the optical fiber installation tool 80b and the point P3 with the X axis is represented by θ2B, the angle made by a straight line connecting the center point O2 of the optical fiber installation tool 80b and the point Pin2 with the X axis is represented by θin2, and the angle made by a straight line connecting the center point O2 of the optical fiber installation tool 80b and the point Pout1 with the X axis is represented by θout1.

Moreover, the angle made by a straight line connecting the center point O3 of the optical fiber installation tool 80c and the point P4 with the X axis is represented by θ3, and the angle made by a straight line connecting the center point O3 of the optical fiber installation tool 80c and the point Pout2 with the X axis is represented by θout2. Here, it is also assumed that an angle becomes plus in the counterclockwise (CCW) direction and becomes minus in the clockwise (CW) direction.

Further, of the optical fiber, a portion wound around the optical fiber installation tool 80a is referred to as an area S1, a portion between the optical fiber installation tools 80a and 80b is referred to as an area S2, a portion from the point P2 to the point Pout1 is referred to as an area S3, a portion from the point Pin2 to the point P3 is referred to as an area S4, a portion between the optical fiber installation tools 80b and 80c is referred to as an area S5, and a portion wound around the optical fiber installation tool 80c is referred to as an area S6.

The length LA of the straight line connecting the center points O1 and O2 of the optical fiber installation tools 80a and 80b and the angle ΨA are obtained by the following formulas:

$$LA = \text{sqrt}((x2-x1)^2 + (z2-z1)^2), \text{ and}$$

$$\Psi A = \arctan((z2-z1)/(x2-x1)).$$

In addition, the angles θ1 and θ2A are obtained by the following formula:

$$\theta 1 = \theta 2A = \Psi A + 0.5 \cdot \pi.$$

In the same manner as above, the length LB of the straight line connecting the center points O2 and O3 of the optical fiber installation tools 80b and 80c and the angle ΨB are obtained by the following formulas:

$$LB = \text{sqrt}((x3-x2)^2 + (z3-z2)^2), \text{ and}$$

$$\Psi B = \arctan((z3-z2)/(x3-x2)).$$

In addition, the angles θ2B and θ3 are obtained by the following formula:

$$\theta 2B = \theta 3 = \Psi B + 0.5 \cdot \pi.$$

Further, the coordinates of the points P1 to P4 (P1x, P1z, P2x, P2z, P3x, P3z, P4x, P4z) are expressed using θ1 and θ3 (provided that θ2A=θ1 and θ2B=θ3) by the following formulas:

$$P1x = x1 + r \cdot \cos(\theta 1),$$

$$P1z = z1 + r \cdot \sin(\theta 1),$$

$$P2x = x2 + r \cdot \cos(\theta 1),$$

$$P2z = z2 + r \cdot \sin(\theta 1),$$

$$P3x = x2 + r \cdot \cos(\theta 3),$$

$$P3z = z2 + r \cdot \sin(\theta 3),$$

$$P4x = x3 + r \cdot \cos(\theta 3), \text{ and}$$

$$P4z = z3 + r \cdot \sin(\theta 3).$$

Further, since the coordinates of the center point O1 of the optical fiber installation tool 80a and the point O4 are known, the length L1 of a straight line connecting the center point O1 of the optical fiber installation tool 80a and the point O4 is obtained by the following formula:

$$L1 = \text{sqrt}((x4-x1)^2 + (z4-z1)^2).$$

Here, when the angle made by the straight line connecting the center point O1 of the optical fiber installation tool 80a and the point O4 with a straight line connecting the point O4 and the point Pin1 is represented by φ1, the following formulas are obtained:

$$0 < \phi 1 = \arcsin(r/L1) < 0.5 \cdot \pi, \text{ and}$$

$$L1 \cos(-(\theta in1 + 0.5 \cdot \pi - \phi 1)) = x4 - x1.$$

Accordingly, the angle θin1 is obtained by the following formula.

$$\theta in1 = -\arccos((x4-x1)/L1) + \phi 1 - 0.5 \cdot \pi < -0.5 \cdot \pi.$$

The X-Z coordinates (Pin1x, Pin1z) of the point Pin1 are obtained using the angle θin1 by the following formulas:

$$Pin1x = x1 + r \cdot \cos(\theta in1), \text{ and}$$

$$Pin1z = z1 + r \cdot \sin(\theta in1).$$

In the same manner as above, since the coordinates of the center point O2 of the optical fiber installation tool 80b and the point O6 are known, the length L2 of a straight line connecting the center point O2 of the optical fiber installation tool 80b and the point O6 is obtained by the following formula:

$$L2 = \text{sqrt}((x6-x2)^2 + (z6-z2)^2).$$

Here, when the angle made by the straight line connecting the center point O2 of the optical fiber installation tool 80b and the point O6 with a straight line connecting the point O6 and the point Pout1 is represented by $\phi2$, the following formulas are obtained:

$$0<\phi2=\arcsin(r/L2)<0.5\cdot\pi, \text{ and}$$

$$L2\cos(-(\theta\text{out}-0.5\cdot\pi+\phi2))=x6-x2.$$

Accordingly, the angle $\theta$out1 is obtained by the following formula:

$$\theta\text{out1}=-\arccos((x6-x2)/L2)-\phi2+0.5\cdot\pi.$$

The X-Z (Pout1x, Pout1z) coordinates of the point Pout1 are obtained using the angle $\theta$out1 by the following formulas:

$$\text{Pout1}x=x2+r\cdot\cos(\theta\text{out1}), \text{ and}$$

$$\text{Pout1}z=z2+r\cdot\sin(\theta\text{out1}).$$

Further, since the coordinates of the center point O2 of the optical fiber installation tool 80b and the point O7 are known, the length L3 of a straight line connecting the center point O2 of the optical fiber installation tool 80b and the point O7 is obtained by the following formula:

$$L3=\text{sqrt}((x2-x7)^2+(z2-z7)^2).$$

Here, when the angle made by the straight line connecting the center point O2 of the optical fiber installation tool 80b and the point O7 with a straight line connecting the point O7 and the point Pin2 is represented by $\phi3$, the following formulas are obtained:

$$0<\phi3=\arcsin(r/L3)<0.5\cdot\pi, \text{ and}$$

$$L3\cos(-(\theta\text{in2}+0.5\cdot\pi-\phi3))=x7-x2.$$

Accordingly, the angle $\theta$in2 is obtained by the following formula:

$$\theta\text{in2}=-\arccos((x7-x2)/L3)+\phi3-0.5\cdot\pi<-0.5\cdot\pi.$$

The X-Z coordinates (Pin2x, Pin2z) of the point Pin2 are obtained using the angle $\theta$in2 by the following formulas:

$$\text{Pin2}x=x2+r\cdot\cos(\theta\text{in2}), \text{ and}$$

$$\text{Pin2}z=z2+r\cdot\sin(\theta\text{in2}).$$

Furthermore, since the coordinates of the center point O3 of the optical fiber installation tool 80c and the point O9 are known, the length L4 of a straight line connecting the center point O3 of the optical fiber installation tool 80c and the point O9 is obtained by the following formula:

$$L4=\text{sqrt}((x9-x3)^2+(z9-z3)^2).$$

Here, when the angle made by the straight line connecting the center point O3 of the optical fiber installation tool 80c and the point O9 with a straight line connecting the point O9 and the point Pout2 is represented by $\phi4$, the following formulas are obtained:

$$0<\phi4=\arcsin(r/L4)<0.5\cdot\pi, \text{ and}$$

$$L4\cos(-(\theta\text{out2}-0.5\cdot\pi+\phi4))=x9-x3.$$

Accordingly, the angle $\theta$out2 is obtained by the following formula:

$$\theta\text{out2}=-\arccos((x9-x3)/L4)-\phi4+0.5\cdot\pi.$$

The X-Z coordinates (Pout2x, Pout2z) of the point Pout2 are obtained using the angle $\theta$out2 by the following formulas:

$$\text{Pout2}x=x3+r\cdot\cos(\theta\text{out2}), \text{ and}$$

$$\text{Pout2}z=z3+r\cdot\sin(\theta\text{out2}).$$

Here, depending on how the optical fiber is laid, there are a case where the position mark at the point O4 faces upward and the position mark at the point O9 faces downward and a case where the position mark at the point O4 faces downward and the position mark at the point O9 faces upward.

The mapping of the areas S1 to S6 is as described below in the case where the position mark at the point O4 faces upward and the position mark at the point O9 faces downward.

Since the optical fiber length SO4 from the reference point to the point O4, the X-Z coordinates (x4, z4) of the point O4, and the X-Z coordinates (Pin1x, Pin1z) of the point Pin1 are known, the optical fiber length Pin1s from the reference point to the point Pin1 is obtained by the following formula:

$$\text{Pin1}s=SO4+\text{sqrt}((\text{Pin1}x-x4)^2+(\text{Pin1}z-z4)^2).$$

In addition, since the optical fiber is wound around the optical fiber installation tool 80a three times and the optical fiber length from the reference point to the point O5 is known, the optical fiber lengths P1s and P2s from the reference point to the points P1 and P2 are obtained by the following formulas:

$$P1s = \text{Pin1}s + r\times3\times2\times\pi + r\cdot(2\cdot\pi+\theta\text{in1}-\theta1)$$
$$= SO5 - \text{sqrt}((x5-P1x)^2+(z5-P1z)^2),$$

and $$P2s = P1s + LA$$
$$= SO5 + \text{sqrt}((P2x-x5)^2+(P2z-z5)^2).$$

In addition, the optical fiber length from the reference point to the point Pout1 is obtained by the following formula:

$$\text{Pout1}s=P2s+r\cdot(\theta1-\theta\text{out1})=SO6-\text{sqrt}((x6-\text{Pout1}x)^2+(z6-\text{Pout1}z)^2).$$

From those described above, the X-Z coordinates (x, z) of a certain point on the optical fiber are obtained by the following formulas, when the optical fiber length from the reference point to the point is represented by s and the point is assumed to be within the area S1:

$$x=x1+r\cdot\cos(-(s-\text{Pin1}s)/r+\theta\text{in}), \text{ and}$$

$$z=z1+r\cdot\sin(-(s-\text{Pin1}s)/r+\theta\text{in}).$$

Moreover, when the point is assumed to be within the area S2, the X-Z coordinates (x, z) of the point are obtained by the following formulas:

$$x=P1x+(s-P1s)\cdot\sin(\theta1), \text{ and}$$

$$z=P1z-(s-P1s)\cdot\cos(\theta1).$$

Further, when the point is assumed to be within the area S3, the X-Z coordinates (x, z) of the point are obtained by the following formulas:

$$x=x2+r\cdot\cos(-(s-P2S)/r+\theta1), \text{ and}$$

$$z=z2+r\cdot\sin(-(s-P2s)/r+\theta1).$$

In addition, the lengths Pin2s, P3s, P4s, and Pout2s from the reference point to the points Pin2, P3, P4, and Pout2 are obtained by the following formulas:

$$Pin2s = SO7 + sqrt((Pin2x - x7)^2 + (Pin2z - z7)^2),$$

$$P3s = Pin2s + r \cdot (2 \cdot \pi + \theta in2 - \theta 3)$$
$$= SO8 - sqrt((x8 - P3x)^2 + (z8 - P3z)^2),$$

$$P4s = P3s + LB$$
$$= SO8 + sqrt((P4x - x8)^2 + (P4z - z8)^2),$$

and $$Pout2s = P4s + r \times 3 \times 2 \times \pi + r \cdot (\theta 3 - \theta out2)$$
$$= SO9 - sqrt((x9 - Pout2x)^2 + (z9 - Pout2z)^2).$$

In this case, when a certain point on the optical fiber is assumed to be within the area S4, the X-Z coordinates (x, z) of the point are obtained by the following formulas:

$$x = x2 + r \cdot \cos(-(s-Pin2s)/r + \theta in2), \text{ and}$$

$$z = z2 + r \cdot \sin(-(s-Pin2s)/r + \theta in2).$$

Moreover, when the point is assumed to be within the area S5, the X-Z coordinates (x, z) of the point are obtained by the following formulas:

$$x = P3x + (s-P3s) \cdot \sin(\theta 3), \text{ and}$$

$$z = P3z - (s-P3s) \cdot \cos(\theta 3).$$

Further, when the point is assumed to be within the area S6, the X-Z coordinates (x, z) of the point are obtained by the following formulas:

$$x = x3 + r \cdot \cos(-(s-P4s)/r + \theta 3), \text{ and}$$

$$z = z3 + r \cdot \sin(-(s-P4S)/r + \theta 3).$$

On the other hand, the mapping of the areas S1 to S6 is as described below in the case where the position mark at the point O4 faces downward and the position mark at the point O9 faces upward.

Since the optical fiber length SO4 from the reference point to the point O4, the X-Z coordinates (x4, z4) of the point O4, and the X-Z coordinates (Pin1x, Pin1z) of the point Pin1 are known, the optical fiber length Pin1s from the reference point to the point Pin1 is obtained by the following formula:

$$Pin1s = SO4 - sqrt((Pin1x-x4)^2 + (Pin1z-z4)^2).$$

In addition, since the optical fiber is wound around the optical fiber installation tool 80*a* three times and the optical fiber length from the reference point to the point O5 is known, the optical fiber lengths P1s and P2s from the reference point to the points P1 and P2 are obtained by the following formulas:

$$P1s = Pin1s - r \times 3 \times 2 \times \pi + r \cdot (2 \cdot \pi + \theta in1 - \theta 1)$$
$$= SO5 + sqrt((x5 - P1x)^2 + (z5 - P1z)^2),$$

and $$P2s = P1s - LA$$
$$= SO5 - sqrt((P2x - x5)^2 + (P2z - z5)^2).$$

In addition, the optical fiber length from the reference point to the point Pout1 is obtained from the following formula:

$$Pout1s = P2s - r \cdot (\theta 1 - \theta out1) = SO6 + sqrt((x6-Pout1x)^2 + (z6-Pout1z)^2).$$

From those described above, the X-Z coordinates (x, z) of a certain point on the optical fiber are obtained by the following formulas, when the optical fiber length from the reference point to the point is represented by s and the point is assumed to be within the area S1:

$$x = x1 + r \cdot \cos((s-P1s)/r + \theta 1), \text{ and}$$

$$z = z1 + r \cdot \sin((s-P1s)/r + \theta 1).$$

Moreover, when the point is assumed to be within the area S2, the X-Z coordinates (x, z) of the point are obtained by the following formulas:

$$x = P2x - (s-P2s) \cdot \sin(\theta 1), \text{ and}$$

$$z = P2z + (s-P2s) \cdot \cos(\theta 1).$$

Further, when the point is assumed to be within the area S3, the X-Z coordinates (x, z) of the point are obtained by the following formulas:

$$x = x2 + r \cdot \cos((s-Pout1s)/r + \theta out1), \text{ and}$$

$$z = z2 + r \cdot \sin((s-Pout1s)/r + \theta out1).$$

In addition, the lengths Pin2s, P3s, P4s, and Pout2s from the reference point to the points Pin2, P3, P4, and Pout2 are obtained by the following formulas:

$$Pin2s = SO7 + sqrt((Pin2x - x7)^2 + (Pin2z - z7)^2),$$

$$P3s = Pin2s - r \cdot (2 \cdot \pi + \theta in2 - \theta 3)$$
$$= SO8 + sqrt((x8 - P3x)^2 + (z8 - P3z)^2),$$

$$P4s = P3s - LB$$
$$= SO8 + sqrt((P4x - x8)^2 + (P4z - z8)^2),$$

and $$Pout2s = P4s - r \times 3 \times 2 \times \pi + r \cdot (\theta 3 - \theta out2)$$
$$= SO9 + sqrt((x9 - Pout2x)^2 + (z9 - Pout2z)^2).$$

In this case, when a certain point on the optical fiber is assumed to be within the area S4, the X-Z coordinates (x, z) of the point are obtained by the following formulas:

$$x = x2 + \cos((s-P3s)/r + \theta 3), \text{ and}$$

$$z = z2 + \sin((s-P3s)/r + \theta 3).$$

Moreover, when the point is assumed to be within the area S5, the X-Z coordinates (x, z) of the point are obtained by the following formulas:

$$x = P4x - (s-P4s) \cdot \sin(\theta 3), \text{ and}$$

$$z = P4z + (s-P4s) \cdot \cos(\theta 3).$$

Further, when the point is assumed to be within the area S6, the X-Z coordinates (x, z) of the point are obtained by the following formulas:

$$x = x3 + r \cdot \cos((s-Pout2s)/r + \theta out2), \text{ and}$$

$$z = z3 + r \cdot \sin((s-Pout2s)/r + \theta out2).$$

In this way, the algebra calculation enabling processing for the model 1 is completed.

Figure 43:
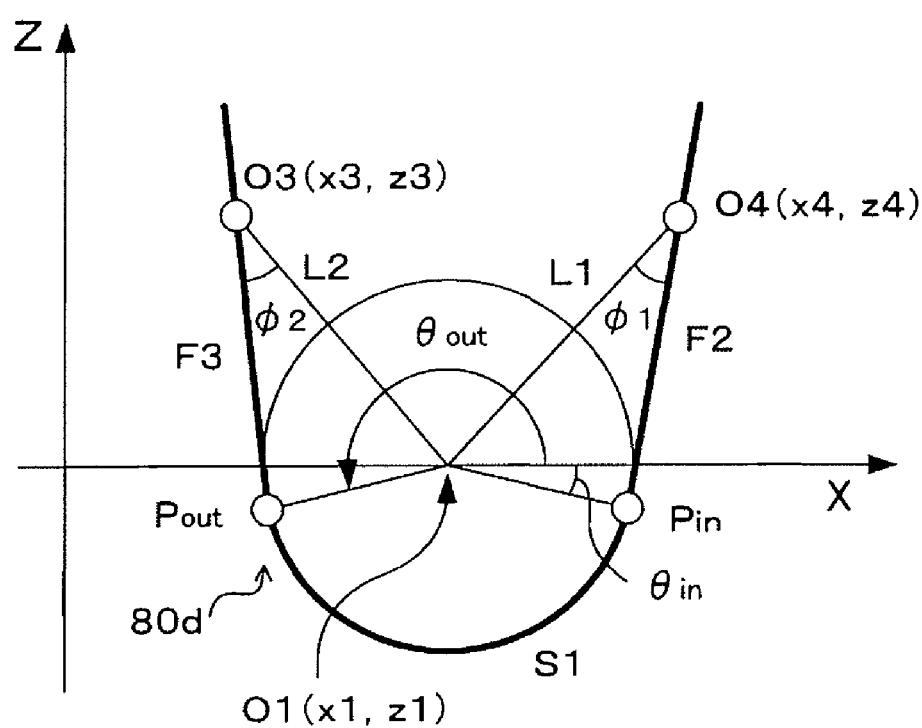
FIG. 43 is a schematic diagram illustrating algebra calculation enabling processing for a model 2 in Installation Example 3.

FIG. 43 is a schematic diagram illustrating algebra calculation enabling processing for the model 2. In FIG. 43, the coordinates of the center point O1 of the optical fiber installation tool 80*d* are represented by (x1, z1). In addition, each of the point O3 and the point O4 represents the position of the position mark (color code) provided to the optical fiber. The coordinates of the point O3 are (x3, z3) and the coordinates of the point O4 are (x4, z4). The coordinates of these points O3 and O4 are assumed to be known from a result of image processing. Note that the coordinates of the points Pout1 and Pin2 in the model 1 may be used instead of the coordinates of these points O3 and O4.

Meanwhile a contact point between the optical fiber F3 and the optical fiber installation tool 80d is represented by Pin while a contact point between the optical fiber F4 and the optical fiber installation tool 80d is represented by Pout. In addition, the angle made by a straight line connecting the center point O1 of the optical fiber installation tool 80d and the point Pin with the x axis is represented by θin while the angle made by a straight line connecting the center point O1 of the optical fiber installation tool 80d and the point Pout with the X axis is represented by θout. Note that, a portion of the optical fiber, which is wound around (in contact with) the optical fiber installation tool 80d, is referred to as an area S1.

Further, the length of a straight line connecting the center point O1 of the optical fiber installation tool 80d and the point O4 is represented by L1, and the angle made by the straight line with a straight line connecting the points O4 and Pin is represented by φ1. The length of a straight line connecting the center point O1 of the optical fiber installation tool 80d and the point O3 is represented by L2, and the angle made by the straight line with a straight line connecting the points O3 and Pout is represented by φ2.

Since the coordinates of the center point O1 of the optical fiber installation tool 80d and the points O3 and O4 are known, the length L1 of the straight line connecting the point O1 and the point O4 and the length L2 of the straight line connecting the point O1 and the point O3 are obtained by the following formulas:

$L1 = \mathrm{sqrt}((x4-x1)^2 + (z4-z1)^2)$, and $L2 = \mathrm{sqrt}((x3-x1)^2 + (z3-z1)^2)$.

In addition, the angles φ1 and φ2 are obtained by the following formulas:

$0 < \varphi1 = \arcsin(r/L1) < 0.5 \cdot \pi$, and $0 < \varphi2 = \arcsin(r/L2) < 0.5\pi$.

The following formula is obtained by using the angle φ1:

$L1 \cos(\theta\mathrm{in} + 0.5 \cdot \pi - 1) = x4 - x1$.

Accordingly, the angle θin is obtained by the following formula:

$\theta\mathrm{in} = \arccos((x4-x1)/L1) + \varphi1 - 0.5 \cdot \pi$.

The X-Z coordinates (Pinx, Pinz) of the point Pin are obtained using the angle θin by the following formulas:

$P\mathrm{in}x = x1 + r \cos(\theta\mathrm{in})$, and $P\mathrm{in}z = z1 + r \sin(\theta\mathrm{in})$.

In the same manner as above, the following formula is obtained using the angle φ2:

$L2 \cos(\theta\mathrm{out} - 0.5 \cdot \pi + \varphi2) = x3 - x1$.

Accordingly, the angle θout is obtained by the following formula:

$\theta\mathrm{out} = \arccos((x3-x1)/L2) - \varphi2 + 0.5 \cdot \pi$.

The X-Z coordinates (Poutx, Poutz) of the point Pout are obtained using the angle θout by the following formulas:

$P\mathrm{out}x = x1 + r \cos(\theta\mathrm{out})$, and $P\mathrm{out}z = z1 + r \sin(\theta\mathrm{out})$.

Here, depending on how the optical fiber is laid, there are a case where the position mark at the point O3 faces upward and the position mark at the point O4 faces downward and a case where the position mark at the point O3 faces downward and the position mark at the point O4 faces upward. The mapping of the area S1 is as described below in the case where the position mark at the point O3 faces upward and the position mark at the point O4 faces downward.

Since the optical fiber length SO3 and the optical fiber length SO4 from the reference point to the point O3 and the point O4 are known, the optical fiber length Pouts and the optical fiber length Pins from the reference point to the point Pout and the point Pin are obtained by the following formulas:

$$\begin{aligned}
Pouts &= SO3 - \mathrm{sqrt}((x3 - Poutx)^2 + (z3 - Poutz)^2) \\
&= SO4 + \mathrm{sqrt}((x4 - Pinx)^2 + (z4 - Pinz)^2) + \\
&\quad 2 \cdot \pi \cdot r \cdot N + r(2 \cdot \pi - \theta out + \theta in),
\end{aligned}$$

and $$\begin{aligned}
Pins &= Pouts - 2 \cdot \pi \cdot r \cdot N - r(2 \cdot \pi - \theta out + \theta in) \\
&= SO4 + PinO4 \\
&= SO4 + \mathrm{sqrt}((x4 - Pinx)^2 + (z4 - Pinz)^2).
\end{aligned}$$

Note, however, that Pins<Pouts. In this case, when a point at a certain position on the optical fiber is assumed to be within the area S1, the X-Z coordinates (x, z) of the point are obtained by the following formulas:

$x = x1 + r \cos(-(s - P\mathrm{ins})/r + \theta\mathrm{in})$, and $z = z1 + r \sin(-(s - P\mathrm{ins})/r + \theta\mathrm{in})$.

On the other hand, the mapping of the area S1 is as described below in the case where the position mark at the point O3 faces downward and the position mark at the point O4 faces upward.

Since the optical fiber length SO3 and the optical fiber length SO4 from the reference point to the point O3 and the point O4 are known, the optical fiber length Pouts and the optical fiber length Pins from the reference point to the point Pout and the point Pin are obtained by the following formulas:

$$\begin{aligned}
Pouts &= SO3 - \mathrm{sqrt}((x3 - Poutx)^2 + (z3 - Poutz)^2) \\
&= SO4 - \mathrm{sqrt}((x4 - Pinx)^2 + (z4 - Pinz)^2) - \\
&\quad 2 \cdot \pi \cdot r \cdot N - r(2 \cdot \pi - \theta out + \theta in),
\end{aligned}$$

and $$\begin{aligned}
Pins &= Pouts + 2 \cdot \pi \cdot r \cdot N - r(2 \cdot \pi - \theta out + \theta in) \\
&= SO4 - PinO4 \\
&= SO4 - \mathrm{sqrt}((x4 - Pinx)^2 + (z4 - Pinz)^2).
\end{aligned}$$

Note, however, that Pins>Pouts. In this case, when a point at a certain position on the optical fiber is assumed to be within the area S1, the X-Z coordinates (x, z) of the point are obtained by the following formulas:

$x = x1 + r \cos((s - P\mathrm{outs})/r + \theta\mathrm{out})$, and $z = z1 + r \sin((s - P\mathrm{outs})/r + \theta\mathrm{out})$.

In this way, the algebra calculation enabling processing for the model 2 is completed.

Figure 44:
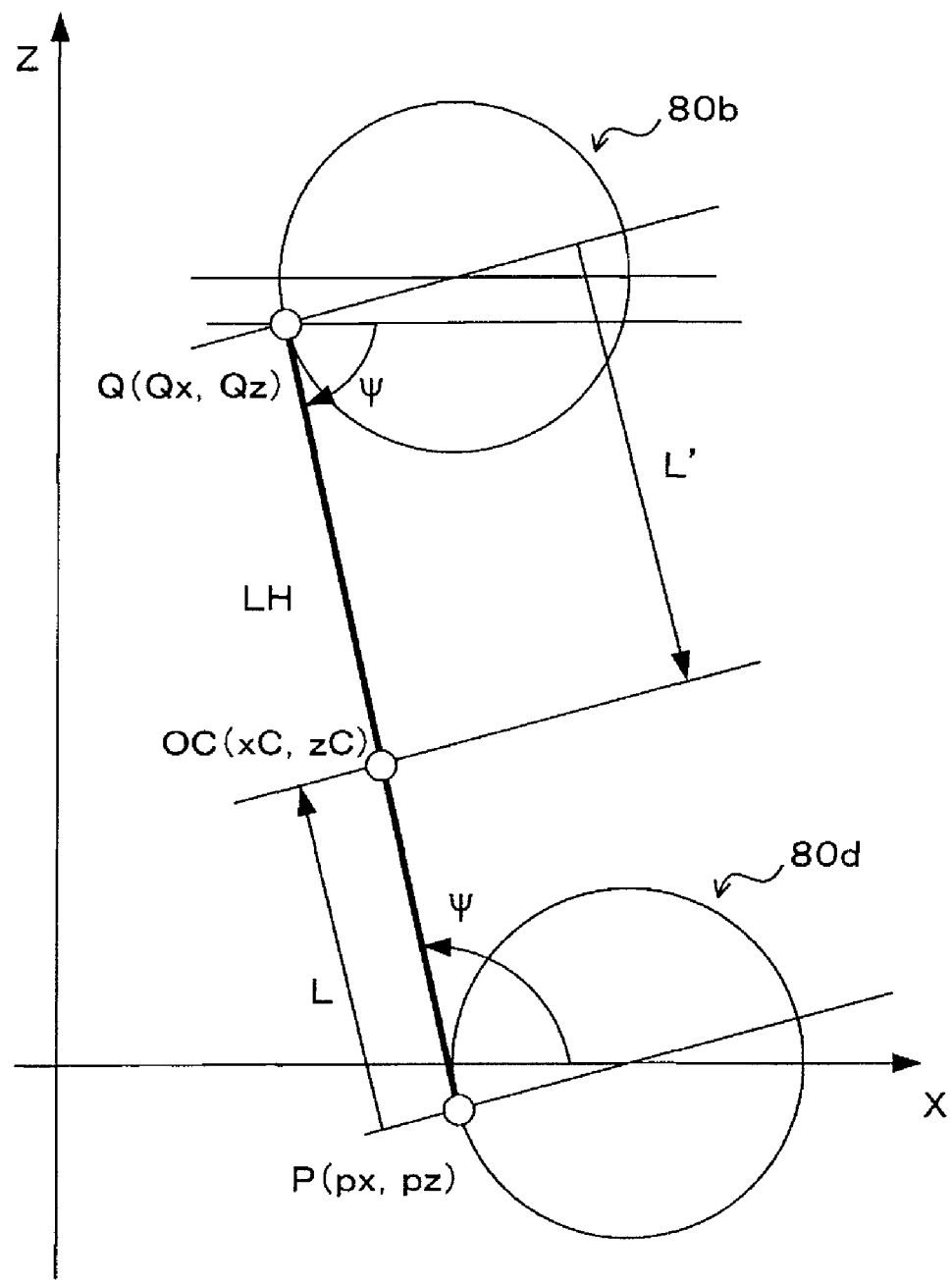
FIG. 44 is a schematic diagram illustrating calculation enabling processing for the optical fiber between models.

After the algebra calculation enabling processing for each model is completed as described above, the algebra calculation enabling processing for the optical fiber between models is performed. FIG. 44 is a schematic diagram illustrating the calculation enabling processing for the optical fiber between models. Here, as an example of the algebra calculation enabling processing for the optical fiber between models, the algebra calculation enabling processing for the optical fiber between the optical fiber installation tools 80*b* and 80*c* (the optical fiber in the area F4) will be described.

Here, a contact point between the optical fiber between the optical fiber installation tools 80*b* and 80*d* and the optical fiber installation tool 80*d* is represented by P, and a contact point between the optical fiber between the optical fiber installation tools 80*b* and 80*d* and the optical fiber installation tool 80*b* is represented by Q. The coordinates (px, pz) of the point P, the coordinates (qx, qz) of the point Q, the optical fiber length SP from the reference point to the point P, and the optical fiber length SQ from the reference point to the point Q are assumed to have been found by the algebra calculation enabling processing performed before.

The optical fiber length LH between the point P and the point Q is obtained by the following formula:

$LH = \text{sqrt}((qx-px)^2+(qz-pz)^2)$.

Here, a certain point on the optical fiber between the optical fiber installation tools 80*b* and 80*d* is represented by OC, the angle made by a straight line connecting the points P and Q with the X axis is represented by $\Psi$, the length from the point P to the point OC is represented by L, and the length from the point Q to the point OC is represented by L'.

In this case, when it is assumed that SQ>SP, the angle $\Psi$ and the X-Z coordinates (xC, zC) of the point OC are expressed by the following formulas:

$\Psi = \arctan((qz-pz)/(qx-px))$, $xC = px + L \cdot \cos \Psi$, and $zC = pz + L \cdot \sin \Psi$.

On the other hand, when it is assumed that SQ<SP, the angle $\Psi$ and the X-Z coordinates (xC, zC) of the point OC are expressed by the following formulas:

$\Psi = \arctan((qz-pz)/(qx-px))$, $xC = px + L' \cdot \cos \Psi$, and $zC = pz + L' \cdot \sin \Psi$.

In this way, association of the fiber length from the reference point to a certain point on the optical fiber with the X-Z coordinates is completed.

Figure 45:
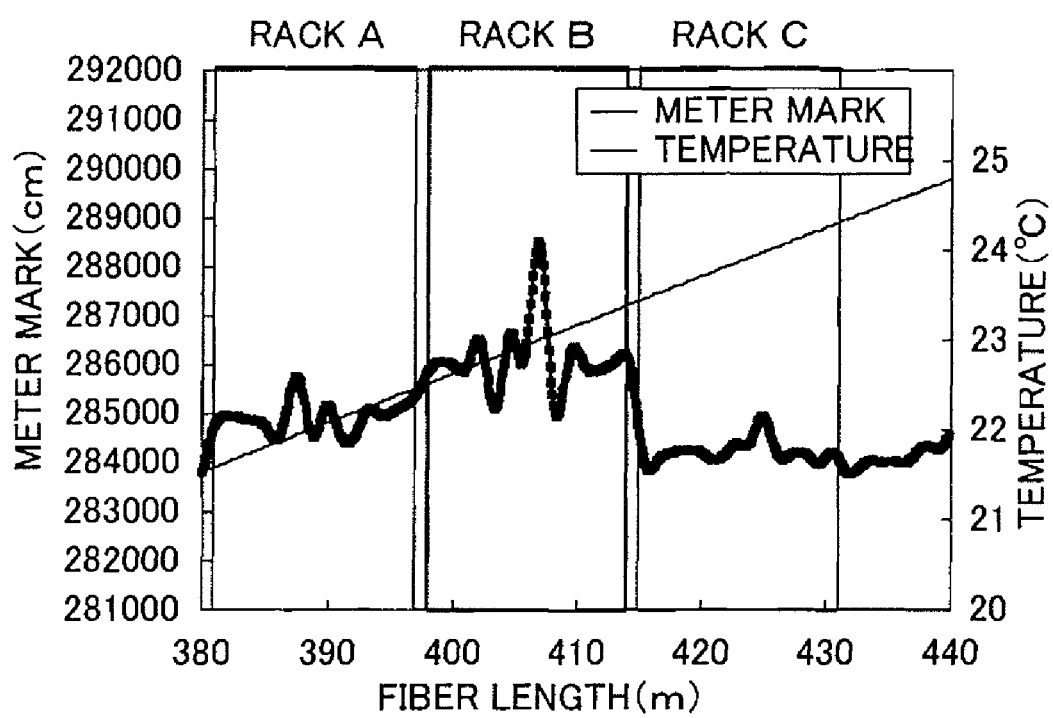
FIG. 45 is a diagram illustrating a temperature distribution in a length direction of the optical fiber, which is measured by using the optical fiber temperature measurement apparatus.

FIG. 45 is a diagram illustrating a temperature distribution in the length direction of the optical fiber, which is measured by using the optical fiber temperature measurement apparatus, where the abscissa axis indicates an optical fiber length from the reference point and the ordinate axis indicates a temperature. Note that, FIG. 45 illustrates a temperature distribution in three racks (racks A, B, and C). In addition, FIG. 45 also illustrates a relation between a meter mark provided to the optical fiber and an optical fiber length from the reference point.

Figure 46:
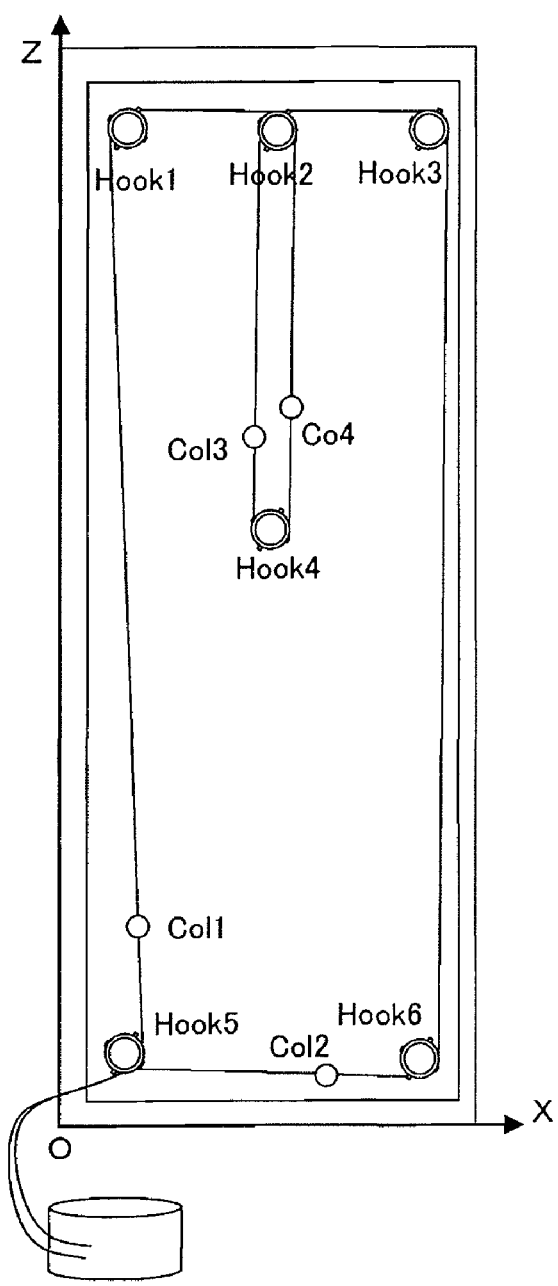
FIG. 46 is a schematic diagram illustrating optical fiber installation tools and position marks (color codes) detected by image processing.

FIG. 46 is a schematic diagram illustrating optical fiber installation tools and position marks (color codes) detected by image processing. In FIG. 46, Hook1 to Hook6 indicate the positions of optical fiber installation tools 80*a* to 80*f,* and Col1 to Col4 indicate the positions of the position marks. In addition, FIG. 47 is a diagram illustrating the optical fiber lengths (calculated value based on the meter marks) and the X-Z coordinates at the inlet portion and the outlet portion of the cassette, the positions of the position marks (Col1, Col2, . . . ), and the positions of the optical fiber installation tools (Hook1, Hook2, . . . ) in the racks A, B, and C.

A method of estimating a temperature distribution in the racks in this case will be described.

First, the installed state analyzing apparatus performs the above-described algebra calculation enabling processing to calculate the optical fiber lengths at the inlet portion and outlet portion of the cassette, the optical fiber lengths (Scol1, Scol2, . . . ) and X-Z coordinates (xcol1, zcol1, xcol2, zcol2, . . . ) at the positions of the respective position marks (color codes), the X-Z coordinates (xhook1, zhook1, xhook2, zhook2, . . . ) of the optical fiber installation tools, and the like. In addition, as illustrated in FIG. 48 for example, the installed state analyzing apparatus 52 calculates the optical fiber length at a starting section of each of regions inside and outside each model in each rack. Note that the optical fiber lengths herein are described with values based on the meter marks.

FIG. 49 is a diagram illustrating the measured temperature at each of measurement points and the X-Z coordinates of the measurement point in association with each other, where the measurement points are set at intervals of 10 cm in the length direction of the optical fiber. As illustrated in FIG. 49, the temperature measurement apparatus 13 detects the temperature at each measurement point. Meanwhile, the installed state analyzing apparatus 52 detects the X-Z coordinates of each measurement point, and detects the installed state of the optical fiber in the rack.

The installed state analyzing apparatus 52 analyzes the installed state of the optical fiber, and adds the prior information for correcting the temperature distribution measured by the temperature measurement apparatus 13. For example, the optical fiber is wound around the optical fiber installation tool 80*a* three times, and the temperatures at the measurement points on the optical fiber wound around the optical fiber installation tool 80*a* may be regarded as the same temperature. For this reason, the installed state analyzing apparatus 52 adds average information as the prior information to the information on the measurement points in the corresponding region. In addition, for example, the optical fibers forwarding and returning between the optical fiber installation tools 80*b* and 80*d* (the optical fibers in the areas F3 and F4) run on substantially the same route. Accordingly, if the positions of the measurement point on the optical fiber in the area F3 and the measurement point on the optical fiber in the area F4 are the same or substantially the same, the temperatures of these respective measurement points can be regarded as the same temperature. For this reason, the installed state analyzing apparatus 52 adds Sort information as the prior information to the information on the measurement points in the corresponding region. The temperature measurement apparatus 13 acquires these pieces of information from the installed state analyzing apparatus 52 and thus corrects the temperature distribution.

Figure 50:
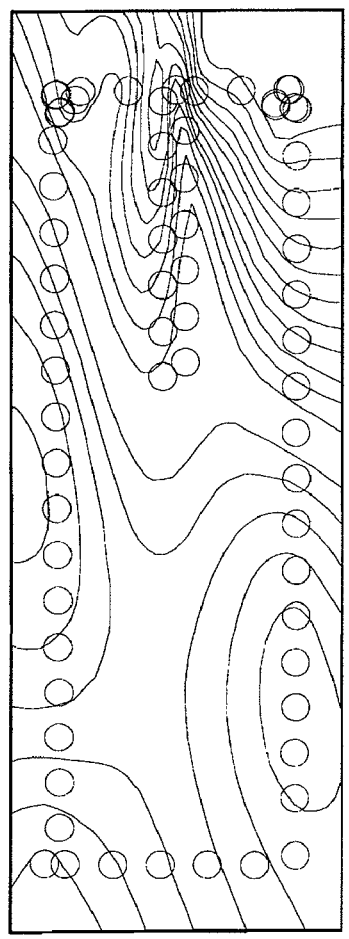
FIG. 50 is a diagram illustrating an example of an in-plane temperature distribution (constant-temperature lines) in the rack, which is obtained by performing interpolation processing.

For example, the temperature measurement apparatus 13 calculates an average value of measured temperatures of measurement points to which the same average information is added, and replaces the measured temperatures of the measurement points with the average value. In addition, for example, the temperature measurement apparatus 13 extracts measurement points having the same or substantially the same X-Z coordinates from measurement point to which the same Sort information is added, and replaces measured temperatures of the extracted measurement points with an average temperature of these measurement points. Moreover, as necessary, the temperature measurement apparatus 13 performs interpolation processing by using a method such as the spline interpolation, from temperature information on each of the measurement points, and calculates an in-plane temperature distribution. FIG. 50 is a diagram illustrating an example of the in-plane temperature distribution (constant-temperature lines) in the rack, which is obtained by performing interpolation processing. In FIG. 50, the circle sign schematically indicates a measurement point. The in-plane temperature distribution in a rack may be obtained in this way.

(Another Embodiment)

In the above-described embodiment, the case has been described in which an image of the installed state of the cable (optical fiber) is captured by using the camera, and is subjected to image processing to analyze the installed state of the cable. However, the installed state of the cable can be analyzed even with no use of image processing.

Figure 51:
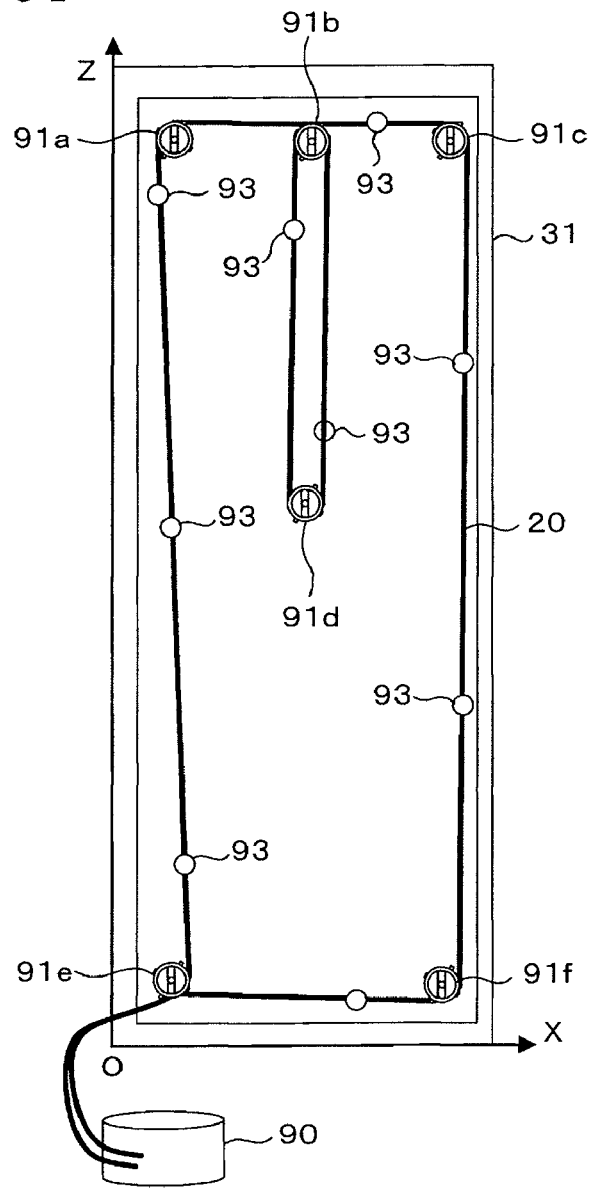
FIG. 51 is a schematic diagram illustrating another embodiment.
Figure 52:
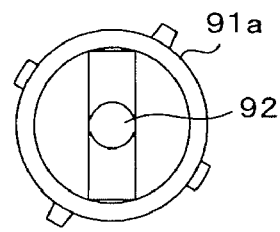
FIG. 52 is a plan view illustrating an RFID tag disposed in a center portion of an optical fiber installation tool.

FIG. 51 is a schematic diagram illustrating another embodiment. In the present embodiment, an optical fiber 20 drawn out of a cassette 90 is laid on a door of a rack 31 by using optical fiber installation tools 91a to 91f with a ring shape as illustrated in FIG. 36. Passive-type RFID (Radio Frequency IDentification) tags 92 having individual ID codes are mounted in center portions of the respective optical fiber installation tools 91a to 91f as illustrated in FIG. 52.

Figure 53:
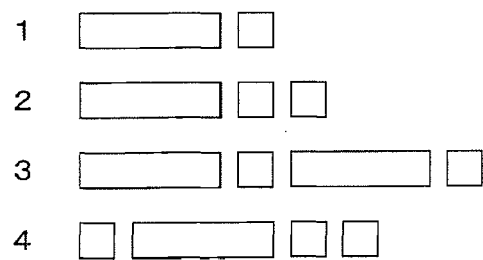
FIG. 53 is a diagram illustrating an example of a position mark (magnetic code)

In addition, position marks 93 formed by applying a magnetic coating are provided to the optical fiber 20 at constant pitches together with meter marks (not illustrated). These position marks 93 are formed in a pattern depending on a distance from an input end of the cassette 90, for example, as illustrated in FIG. 53.

Figure 54:
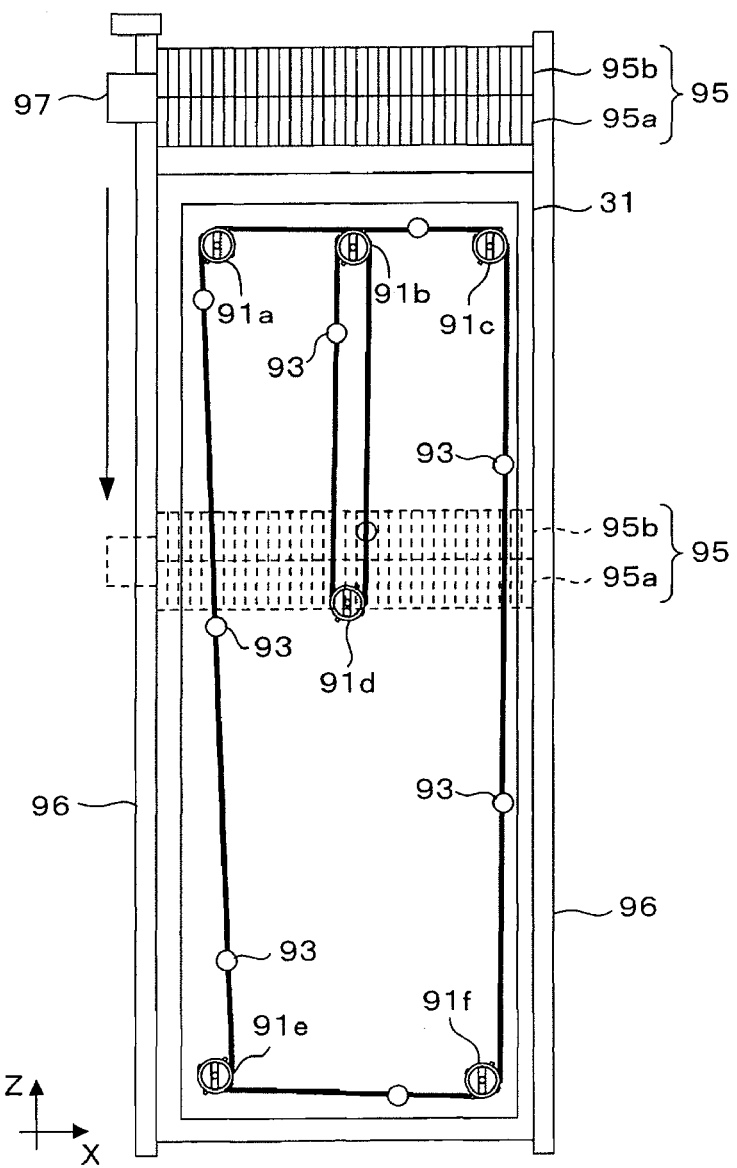
FIG. 54 is a schematic diagram illustrating an installed state detector.

FIG. 54 is a schematic diagram illustrating an installed state detector. The installed state detector 95 includes a Hall element sensor array 95a formed of a large number of Hall elements (magnetic detecting elements) arranged side by side in the width direction of the rack 31 and a proximity-RFID antenna array 95b formed of a large number of proximity-RFID antennas arranged side by side in the width direction of the rack 31. In the present embodiment, the proximity-RFID antenna array 95b is disposed on the Hall element sensor array 95a.

The installed state detector 95 is driven by an unillustrated drive device, and moves vertically along guide rails 96 disposed on the two sides in the width direction of the rack 31. In addition, a linear scale 97 is disposed along the guide rail 96, and the position of the installed state detector 95 in the Z-axis direction is detected by the linear scale 97.

In a case where the installed state of the optical fiber installed in the rack 31 is analyzed, the installed state detector 95 is moved vertically along the guide rails 96. When the proximity-RFID antenna array 95b approaches each of the RFID tags 92 mounted in the respective optical fiber installation tools 91a to 91f, power is supplied by means of an electric wave outputted from the proximity RFID antennas to activate an electronic circuit of the RFID tag 92, so that an electric wave indicating the ID code is outputted from the RFID tag 92. The installed state detector 95 receives the electric wave with one of the proximity-RFID antennas, and determines the position of the corresponding optical fiber installation tool in the X-axis direction in accordance with which antenna has received the electric wave. On the other hand, the position of each of the optical fiber installation tools in the Z-axis direction is determined in accordance with the output of the linear scale 97. In this way, the X-Z coordinates of each of the optical fiber installation tools 91a to 91f are found.

In addition, when the installed state detector 95 passes by the vicinity of each of the position marks 93, one of the Hall element sensor arrays 95a detects the magnetic field generated from the position mark 93. The installed state detector 95 determines the position of the position mark 93 in the X-axis direction in accordance with which Hall element has detected the magnetic field. At this time, since the Hall elements have high resolution, it may be possible to identify the magnetic pattern of each of the position marks 93. Accordingly, the optical fiber length from the cassette inlet portion to the position mark 93 is found. On the other hand, the position of each of the position marks 93 in the Z-axis direction is obtained from the output of the linear scale 97. In this way, the X-Z coordinates of each of the position marks 93 are found.

The output of the installed state detector 95 is inputted to an installed state analyzing apparatus (not illustrated) configured of a computer. The following processing is the same as those in the above-described embodiment, and the detail thereof is omitted here.

Note that, in the present embodiment, since the optical fiber 20 is not directly detected, it is considerable that the direction of the optical fiber 20 may not be determined from the position marks 93 in some cases. However, if the number of position marks 93 is large to some extent, it may be possible to determine the direction of the optical fiber 20 from the position marks 93 in the front and back. Therefore, there is no problem in the identifying of the model and the identifying of the installed state of the optical fiber.

Although, in the above-described embodiments, the case has been described in which the cable is the optical fiber installed in the computer room, the disclosed technique may be applied to analysis of the installed state of an electric cable or another cable. Moreover, while the above-described color codes or magnetic codes of magnetic coating are preferably used as the position marks in the case of analyzing the installed state of a cable installed in a computer room, ultrasonic-wave sensors, GPS (Global Positioning System) or the like may be utilized as the position marks or the position mark detecting means in a case where the installed state of a cable installed in a wide area.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present inventions have been described in detail, it should be understood that the various changes, substitutions, and alterations could be made hereto without departing from the spirit and scope of the invention.

What is claimed is:

1. A cable installed state analyzing method of analyzing an installed state of a cable routed between a plurality of installation tools, the cable including a plurality of position marks at predetermined intervals, the position marks each indicating a distance from a reference point, the cable installed state analyzing method comprising:

acquiring the positions of the position marks and the installation tools;

classifying the plurality of installation tools into a plurality of groups, and determining a basic model matched to each of the groups by comparing an arranged state of the installation tools and an installed state of the cable between the installation tools with a plurality of preset basic models; and analyzing an installed route of the cable by using the basic models and the position marks, wherein each of the position marks entirely surrounds the cable in a circumferential direction.

2. The cable installed state analyzing method according to claim 1, wherein
the acquiring the positions of the position marks and the installation tools comprises:
capturing an image of the installed state of the cable; and
extracting the installation tools, the cable and the position marks by performing image processing on the captured image.

3. The cable installed state analyzing method according to claim 1, further comprising:
mapping the installed state of the cable to orthogonal coordinates after the analyzing the installed route.

4. The cable installed state analyzing method according to claim 1, wherein
in the determining the basic model,
installation tools arranged in one direction are classified into one group.

5. The cable installed state analyzing method according to claim 1, wherein
the plurality of installation tools have the same shape.

6. The cable installed state analyzing method according to claim 1, wherein
each of the position marks indicates a distance from the reference point and a direction in which the reference point is located.

7. The cable installed state analyzing method according to claim 1, wherein
each of the position marks has a combination of multiple colors.

8. The cable installed state analyzing method according to claim 1, wherein
in the determining the basic model, a plurality of areas are set around each of the installation tools and the number of cables running through each of the areas is counted.

9. The cable installed state analyzing method according to claim 1, wherein
the cable is an optical fiber for temperature measurement, the optical fiber connected to an optical fiber temperature measurement apparatus.

10. The cable installed state analyzing method according to claim 1, further comprising:
associating the positions of the position marks with the positions of measurement points set by the optical fiber temperature measurement apparatus after the analyzing the installed route of the cable.

11. The cable installed state analyzing method according to claim 10, wherein
a condition for correcting a temperature is added to an analysis result of the installed route of the cable, the condition determined depending on the basic models.

12. A cable installed state analyzing apparatus of analyzing an installed state of a cable routed between a plurality of installation tools, the cable including a plurality of position marks at predetermined intervals, the position marks each indicating a distance from a reference point, the cable installed state analyzing apparatus comprising:
a position acquisition unit configured to acquire positions of the installation tools and the position marks;
a control unit configured to classify the plurality of installation tools into a plurality of groups on the basis of the positions of the installation tools and the position marks acquired by the position acquisition unit, to determine a basic model matched to each of the groups by comparing an arranged state of the installation tools and an installed state of the cable between the installation tools with a plurality of preset basic models, and to analyze an installed route by using the basic models and the position marks,
wherein each of the position marks entirely surrounds the cable in a circumferential direction.

13. The cable installed state analyzing apparatus according to claim 12, wherein
the position acquisition unit comprises:
an image input unit configured to receive input of a captured image of the installed state of the cable; and
an image processing unit configured to perform image processing on the image inputted to the image input unit.

14. The cable installed state analyzing apparatus according to claim 12, wherein
the cable is an optical fiber for temperature measurement, the optical fiber connected to an optical fiber temperature measurement apparatus.

15. The cable installed state analyzing apparatus according to claim 14, wherein
the control units outputs an analysis result of the installed route of the cable with a preset condition for correcting a temperature added to the analysis result.

* * * * *